(12) United States Patent
Islam et al.

(10) Patent No.: US 10,925,047 B2
(45) Date of Patent: Feb. 16, 2021

(54) SYSTEMS AND METHODS FOR SCHEDULING WIRELESS COMMUNICATIONS

(71) Applicant: Huawei Technologies Co., Ltd., Shenzhen (CN)

(72) Inventors: Toufiqul Islam, Ottawa (CA); Mohammadhadi Baligh, Ottawa (CA); Jianglei Ma, Ottawa (CA); Amine Maaref, Kanata (CA); Kelvin Kar Kin Au, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/890,810

(22) Filed: Feb. 7, 2018

(65) Prior Publication Data

US 2019/0246378 A1   Aug. 8, 2019

(51) Int. Cl.
 *H04W 72/04* (2009.01)
 *H04W 72/12* (2009.01)
 *H04L 1/00* (2006.01)

(52) U.S. Cl.
 CPC ............. *H04W 72/042* (2013.01); *H04L 1/00* (2013.01); *H04W 72/12* (2013.01)

(58) Field of Classification Search
 CPC ...... H04W 72/042; H04W 72/12; H04L 1/00; H04L 1/1819; H04L 1/0028; H04L 1/0031; H04L 1/0003
 IPC ......................................... H04W 72/042,72/12
 See application file for complete search history.

(56) References Cited

U.S. PATENT DOCUMENTS

| | | | | |
|---|---|---|---|---|
| 9,345,044 | B2* | 5/2016 | Tang | H04W 48/12 |
| 2013/0114532 | A1* | 5/2013 | Choi | H04W 72/042 |
| | | | | 370/329 |
| 2014/0105162 | A1* | 4/2014 | Li | H04W 72/042 |
| | | | | 370/329 |
| 2014/0153488 | A1 | 6/2014 | Koivisto et al. | |
| 2015/0304997 | A1* | 10/2015 | Park | H04B 7/024 |
| | | | | 370/330 |
| 2016/0073381 | A1* | 3/2016 | Ratasuk | H04W 4/70 |
| | | | | 370/329 |
| 2016/0100422 | A1* | 4/2016 | Papasakellariou | H04L 1/1861 |
| | | | | 370/329 |
| 2017/0346607 | A1* | 11/2017 | Chen | H04L 1/1896 |
| 2018/0077693 | A1* | 3/2018 | Chen | H04L 5/0053 |
| 2018/0324789 | A1* | 11/2018 | Park | H04W 72/0413 |
| 2018/0359772 | A1* | 12/2018 | Park | H04W 16/14 |

(Continued)

FOREIGN PATENT DOCUMENTS

| | | | |
|---|---|---|---|
| CN | 104753633 A | 7/2015 | |
| WO | WO-2014035301 A1 * | 3/2014 | ......... H04W 28/065 |

(Continued)

*Primary Examiner* — Ivan O Latorre
(74) *Attorney, Agent, or Firm* — Slater Matsil, LLP

(57) ABSTRACT

When a user equipment (UE) is wirelessly communicating with a network, the wireless channel conditions may sometimes result in a low signal-to-noise ratio (SNR). The low SNR may be a result of the UE having poor geometry, e.g. the UE is at a cell edge. It is desired to increase the reliability of wireless communications in low SNR conditions. In some embodiments, less information may be dynamically signaled in the downlink control information (DCI), thereby allowing for a possibly lower effective coding rate.

22 Claims, 29 Drawing Sheets

(56) References Cited

U.S. PATENT DOCUMENTS

2019/0075589 A1* 3/2019 Jeon .................. H04W 72/1278
2019/0132862 A1* 5/2019 Jeon ...................... H04L 5/0092

FOREIGN PATENT DOCUMENTS

| WO | 2014146507 A1 | 9/2014 |
| WO | 2016123393 A1 | 8/2016 |

* cited by examiner

US 10,925,047 B2

SYSTEMS AND METHODS FOR SCHEDULING WIRELESS COMMUNICATIONS

TECHNICAL FIELD

The present disclosure relates generally to wireless communications, and in particular embodiments, to systems and methods for scheduling wireless communications.

BACKGROUND

In some wireless communication systems, user equipments (UEs) wirelessly communicate with one or more transmit/receive points (TRPs) to send data to the TRPs and/or receive data from the TRPs. A wireless communication from a UE to a TRP is referred to as an uplink communication. A wireless communication from a TRP to a UE is referred to as a downlink communication.

A UE may be served by a serving cell that includes one or more TRPs. The UE may communicate with the one or more TRPs to send uplink communications and receive downlink communications.

Resources are required to perform uplink and downlink communications. For example, a TRP may wirelessly transmit data, such as a transport block (TB), to a UE in a downlink communication at a particular frequency and during a particular interval of time. The frequency and time interval used are examples of resources.

Some wireless communication systems may support grant-based uplink transmissions. That is, if a UE wants to transmit data to the network via one or more TRPs, the UE requests uplink resources from the network. Downlink control information (DCI) is transmitted to the UE that schedules the uplink transmission. An example of uplink resources that may be used by the scheduled uplink transmission is a set of time-frequency locations in an uplink orthogonal frequency-division multiple access (OFDMA) frame.

Grant-based downlink transmissions may also be performed. For example, if the network wants to transmit data to the UE via one or more TRPs, DCI is transmitted to the UE that schedules the downlink transmission. The DCI indicates, among other things, the time-frequency region in the downlink data channel at which the downlink data transmission will be sent.

Some wireless communication systems may support grant-free uplink transmissions. That is, a UE may send uplink transmissions using certain uplink resources possibly shared with other UEs, without specifically requesting use of the resources. A grant-free uplink transmission does not need a dynamic and explicit scheduling grant from the network. A region of time-frequency resources may be configured to be used for sending grant-free uplink transmissions.

When a UE is wirelessly communicating with a network, the wireless channel conditions may sometimes result in a low signal-to-noise ratio (SNR) in the downlink. The low SNR may be a result of the UE having poor geometry, e.g. the UE is at the cell edge. In some cases, if the UE is at the cell edge, a handover from a serving cell to a target cell may be performed. The UE may have a low SNR in the downlink and may be awaiting the handover or performing the handover.

SUMMARY

It is desired to increase the reliability of wireless communications in low SNR conditions, e.g. when the UE is at a cell edge.

According to one aspect of the present disclosure, there is provided a method that includes transmitting first higher layer signaling to a UE. The first higher layer signaling indicates a transmission mode. The transmission mode is associated with at least a DCI type. The DCI type has a format that does not explicitly indicate at least one parameter associated with a TB scheduled by the DCI type. The at least one parameter may include at least one of: time resources on which the TB is transmitted, frequency resources on which the TB is transmitted, a modulation and coding scheme (MCS) of the TB; a redundancy version (RV) of the TB; and a transport block size (TBS) of the TB. The method may further include transmitting second higher layer signaling to the UE, where the second higher layer signaling indicates to the UE the at least one parameter associated with the TB. The method may further include transmitting the DCI type to the UE to schedule the TB. An apparatus in the network is also disclosed that is configured to perform the method.

According to another aspect of the present disclosure, there is provided a method that includes receiving first higher layer signaling at a UE. The first higher layer signaling indicates a transmission mode. The transmission mode is associated with at least a DCI type. The DCI type has a format that does not explicitly indicate at least one parameter associated with a TB scheduled by the DCI type. The at least one parameter may include at least one of: time resources on which the TB is transmitted, frequency resources on which the TB is transmitted, an MCS of the TB; an RV of the TB; and a TBS of the TB. The method may further include receiving second higher layer signaling at the UE. The second higher layer signaling indicating to the UE the at least one parameter associated with the TB. The method may further include receiving the DCI type at the UE. A UE is also disclosed that is configured to perform the method.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

It is desired to increase the reliability of wireless communications in low SNR conditions, e.g. when the UE is at a cell edge. Increasing reliability may be especially important when the UE is operating in a mode in which relatively high reliability is required, e.g. if the UE is an ultra-reliable low latency communication (URLLC) UE. To try to increase reliability, URLLC services may use multi-link diversity (e.g. data/control duplication over one or more links) and/or more robust control channel design. For example, a more robust DCI transmission may be enabled via a light DCI format having a small/minimal payload, as described later. The UE may also, or instead, be configured to receive multiple copies of a downlink transmission, e.g. by having multiple TRPs serving the UE send a duplicate copy of a downlink transport block (TB) transmission and/or a duplicate copy of control information. The control information may be UE specific or group-common.

Different mechanisms are disclosed herein that may facilitate increasing the reliability of wireless communications in low SNR conditions. For example, in some embodiments, less information may be dynamically signaled in the DCI, thereby allowing for a possibly lower effective coding rate. A lower effective coding rate results in a codeword having a greater proportion of redundant, error-control bits, as compared to a higher effective coding rate; the lower effective coding typically results in more robust error correction. In some embodiments, in low SNR conditions the UE sends a signal to the network that may trigger the network to engage more resources for subsequent transmissions to the UE, for the same or different transport blocks. In some embodiments, data duplication may be used to try to increase reliability during a handover.

Example Communication System

Figure 1:
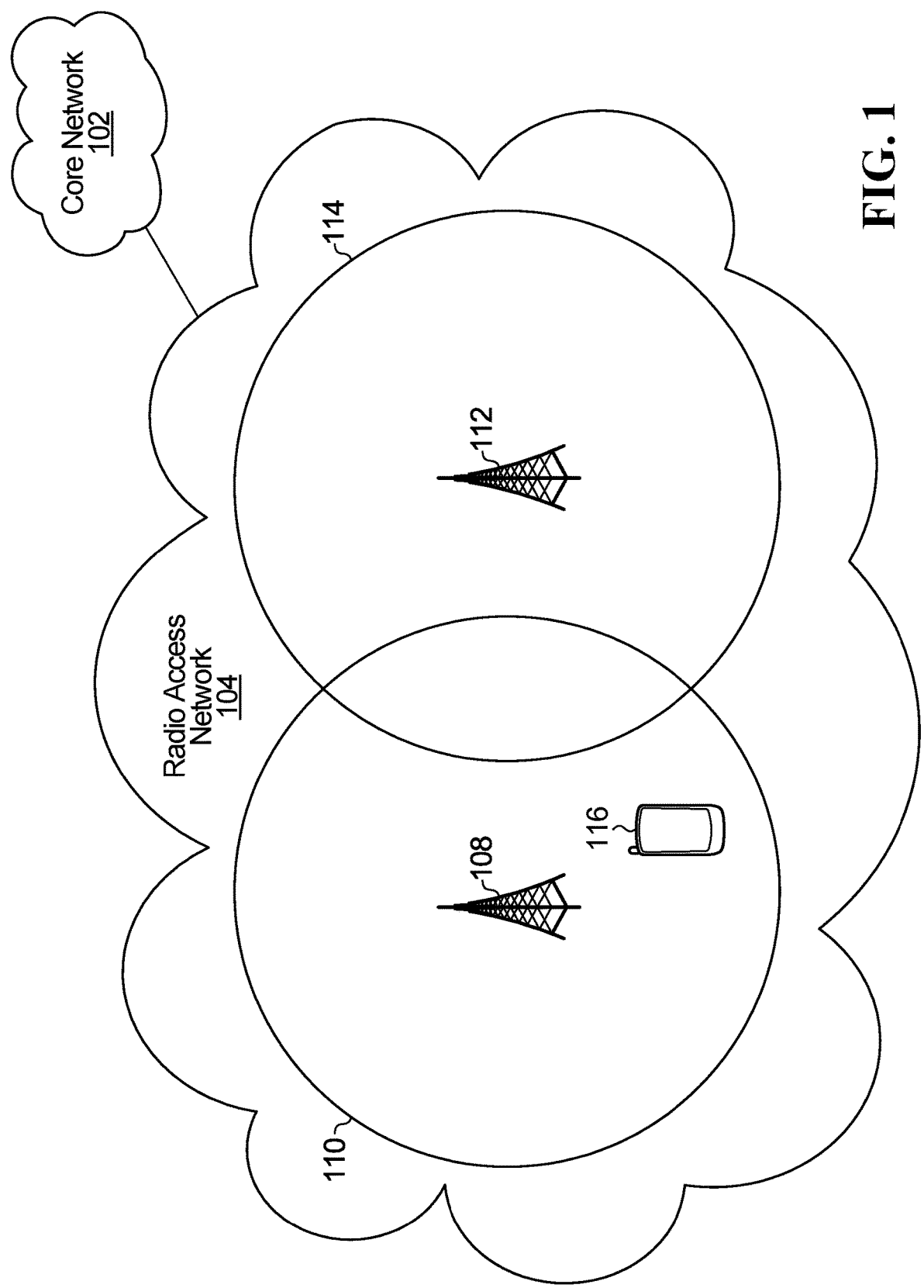
FIG. 1 illustrates an example of a telecommunications network according to one embodiment.

FIG. 1 illustrates an example of a telecommunications network according to one embodiment. The telecommunications network includes a core network 102 and a radio access network 104. The core network 102 is the central part of the telecommunications network and provides various services, e.g. call control/switching and gateways to other networks. The core network 102 comprises network components such as routers, switches, and servers (not shown).

Coupled to the core network 102 is the radio access network 104. The radio access network 104 includes a first TRP 108 providing a wireless coverage area. The wireless coverage area will be referred to as a cell 110. The radio access network 104 further includes a second TRP 112 providing a second wireless coverage area. The second wireless coverage area will be referred to as cell 114.

Each TRP may be implemented using a radio transceiver, one or more antennas, and associated processing circuitry (e.g. antenna RF circuitry, analog-to-digital/digital-to-analog converters, etc.).

Although not shown in FIG. 1, each TRP may be connected to a centralized processing system in the radio access network 104 via a respective communication link. The centralized processing system may be implemented by one or more computational devices (e.g. one or more servers), and the centralized processing system may perform baseband processing of data for/from the UEs. In some embodiments, activities such as scheduling and generating control information may be performed in the centralized processing system.

The expression "the network" is used in embodiments below, and it may refer to the radio access network (e.g. radio access network 104), the core network (e.g. core network 102), or another network, depending upon the implementation.

UEs communicate with the network via one or more TRPs. A UE 116 is illustrated within cell 110. The UE 116 communicates with the network via TRP 108, and the cell 110 may therefore be called the serving cell because it is serving UE 116 via TRP 108.

Although a single TRP 108 is illustrated in FIG. 1, the TRP 108 may instead be a group of TRPs that belong to cell 110 and that work together to communicate with UEs served by the cell 110.

Figure 2:
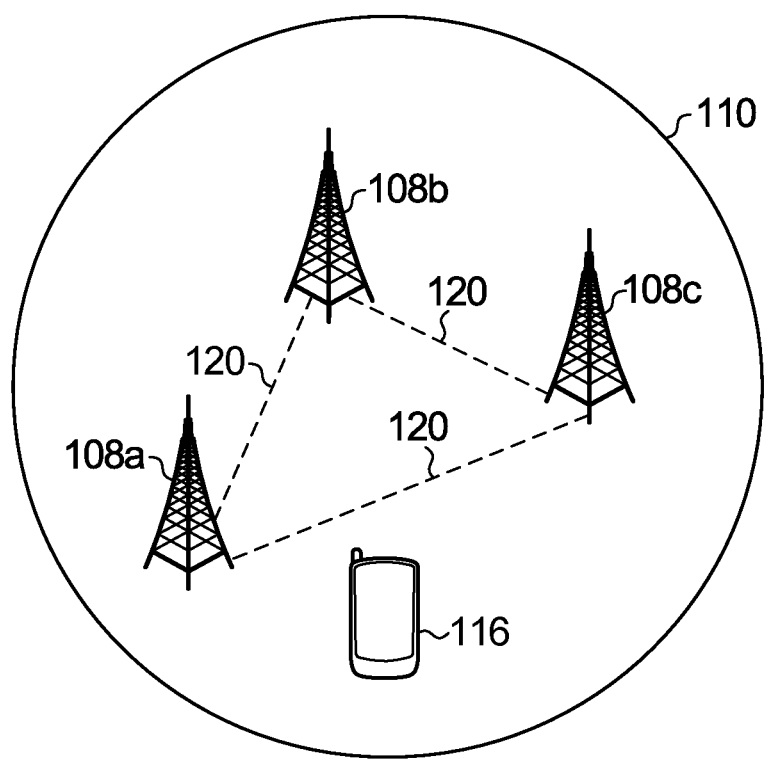
FIG. 2 illustrates the presence of three TRPs cooperating to serve a cell, according to one embodiment.

For example, FIG. 2 illustrates cell 110 for an implementation in which TRP 108 is actually three TRPs 108a-c that operate together to communicate with UE 116. The three TRPs 108a-c communicate with each other over backhaul links 120. Although not illustrated, any of the other TRPs discussed herein, e.g. TRP 112 and/or TRP 124 discussed below, may each represent a group of TRPs that operate together to communicate with UEs.

Figure 3:
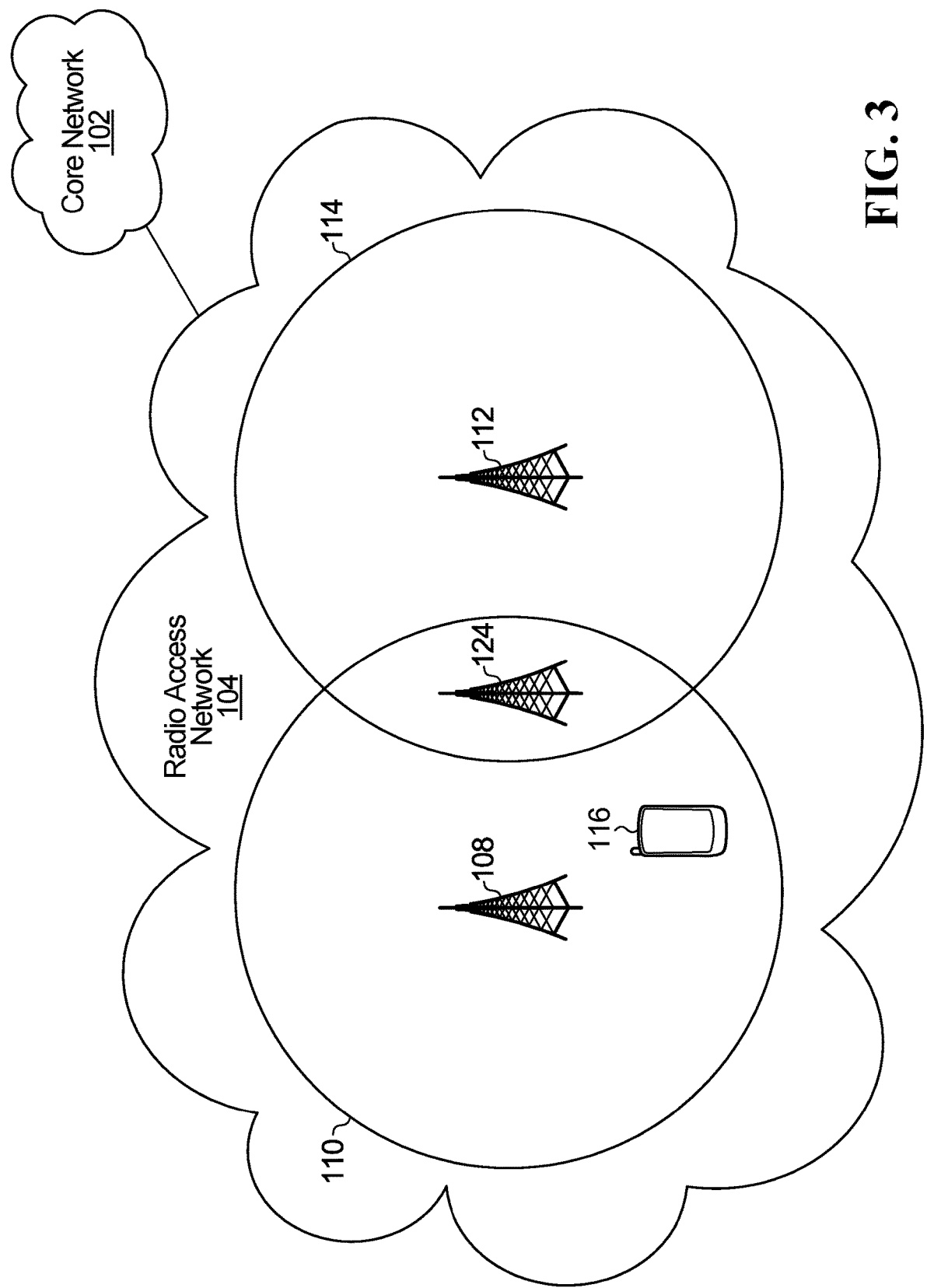
FIG. 3 illustrates a variation of FIG. 1 in which a TRP belongs to two cells.

In some embodiments, a TRP may belong to more than one cell. For example, FIG. 3 illustrates a variation of FIG. 1 in which a TRP 124 is present that belongs to both cell 110 and cell 114. The TRP 124 may communicate with a UE in cell 110 or cell 114.

Figure 4:
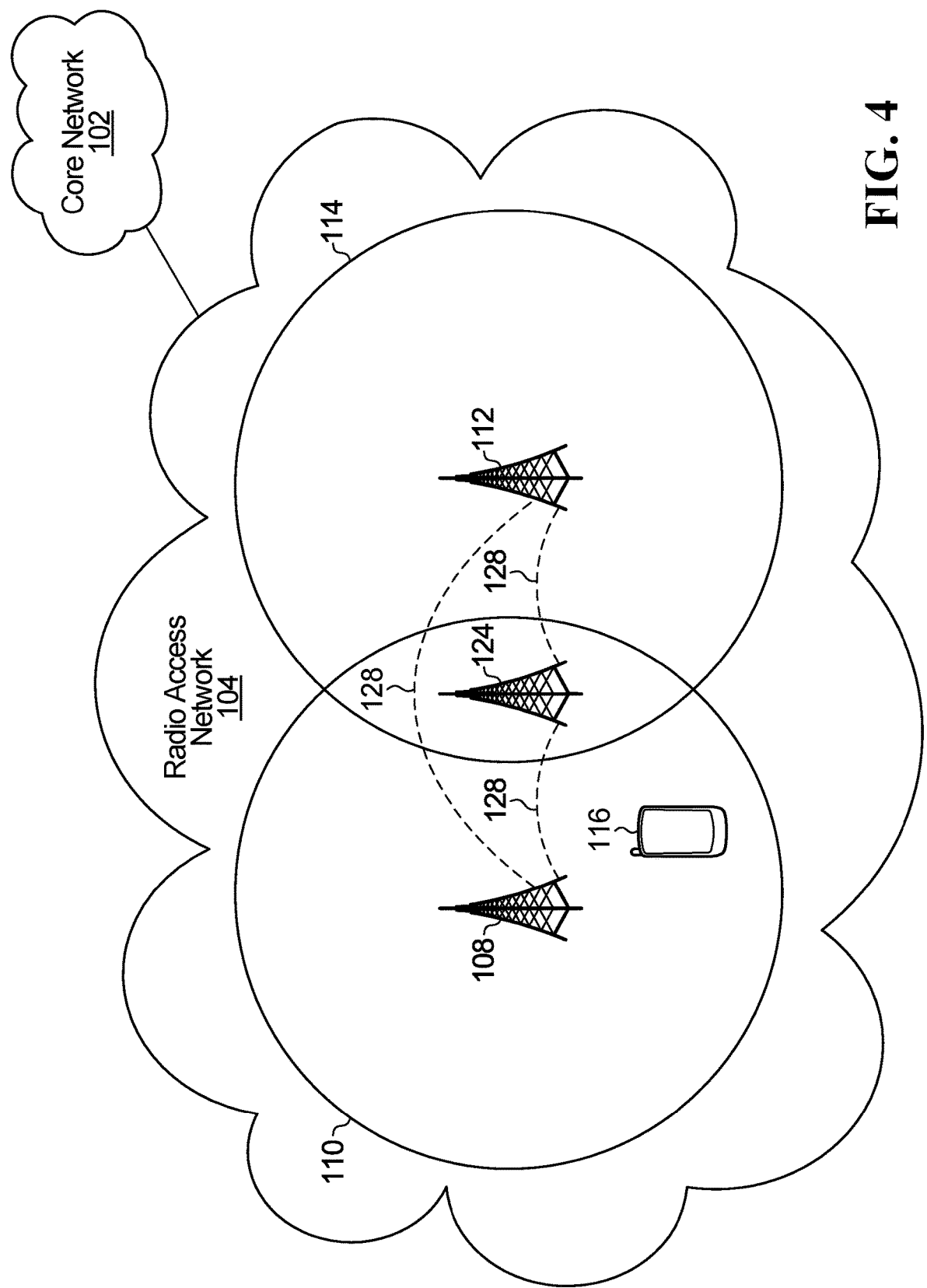
FIG. 4 illustrates a variation of FIG. 3 in which TRPs can communicate with each other over backhaul links.

In some embodiments, TRPs in different cells may communicate with each other over backhaul links. For example, FIG. 4 illustrates a variation of FIG. 3 in which the TRPs can communicate with each other over backhaul links 128.

As UE 116 moves throughout the radio access network 104, the UE 116 may establish multiple active links with different TRPs. Each active link may be used to send and receive data and control information to/from the network.

Figure 5:
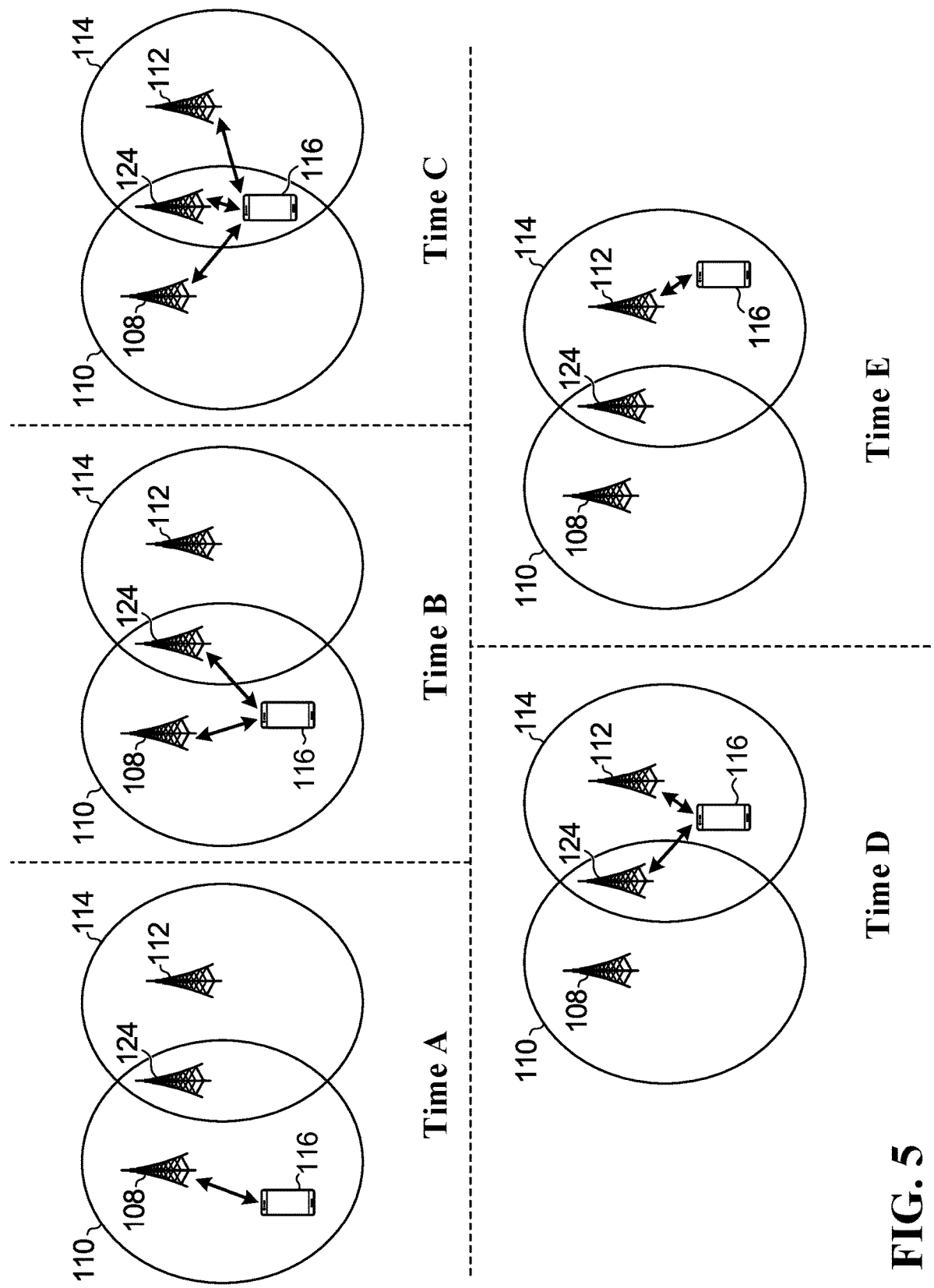
FIG. 5 illustrates an example of simultaneous transmissions, one for each active link.

Multiple simultaneous transmissions may therefore occur, one for each active link. If the UE has multiple active links to different cells (each cell having one or more TRPs), where each cell has its own scheduler, then this scenario is referred to as dual connectivity. For example, FIG. 5 illustrates five consecutive snapshots in time, labelled "time A", "time B", "time C", "time D", and "time E". In time A the UE 116 only has an active link with TRP 108. In time B, the UE 116 has two independent active links: one with TRP 108 and one with TRP 124. There are multiple links within cell 110. In time C, the UE 116 has three independent active links: one with TRP 108, one with TRP 124, and one with TRP 112. There are multiple links from multiple cells. In time D, the UE 116 has two independent active links: one with TRP 124 and one with TRP 112. There are multiple links within cell 114. In time E, the UE 116 has only one active link with TRP 112. Whenever there is more than one active link, the network may use more than one active link to send data and/or control information to/receive data and/or control information from the UE 116. This may increase reliability. For example, at time C data duplication may be performed during handover by having the same data sent to UE 116 from each one of the three TRPs 108, 124, and 112. In FIG. 5 there may be intra frequency (same carrier frequency) and inter frequency (different carrier frequency) dual connectivity (DC). There may be joint scheduling from multiple TRPs in a cell or across different cells. Having a TRP or TRP group at a cell edge (e.g. like TRP 124) may reduce higher layer (e.g. RRC) configuration/reconfiguration messaging.

In some embodiments, overlapping cells or TRPs may reserve a set of UE IDs (e.g. a cell radio network temporary identifier (C-RNTI) pool) for a UE so that the UE may still keep the same UE ID (e.g. keep the same C-RNTI) across the cell, if available. If a conflict is detected, overlapping TRPs may use a C-RNTI from a reserved pool. The UE may have already received the configuration of the reserved pool of IDs. Hence, if the TRPs switch from last used C-RNTI to one of the C-RNTIs from the reserved pool for a given UE, the UE may still receive the control information because it can recognize the switched C-RNTIs. The UE may be re-assigned to another C-RNTI when it switches over to another cell. In some embodiments, a UE may sometimes be connected to multiple TRPs, and the TRPs may handle the connection in a distributed manner. Configured resources for a scheduling request (SR) may be different or common across TRPs. If different, the UE may duplicate the SR onto multiple resources. The UE may receive downlink control information independently for the same TB. Different TRPs/cells upon receiving SRs may generate a grant independently for uplink transmission of the TB.

Figure 6:
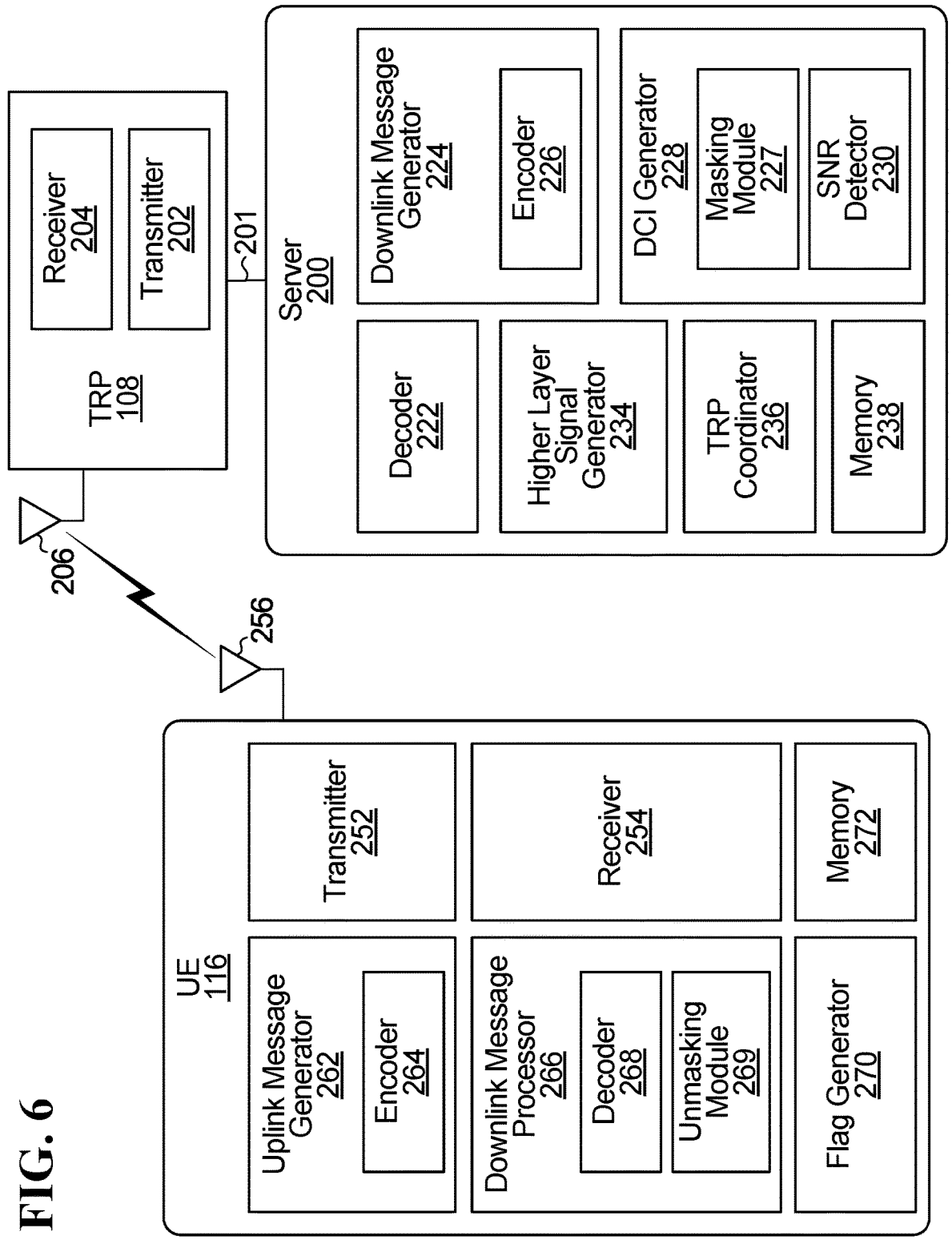
FIG. 6 is a block diagram illustrating an example UE, server, and TRP in more detail.

FIG. 6 is a block diagram illustrating the UE 116 and TRP 108 of FIG. 1 in more detail. The TRP 108 is also coupled to a server 200 (not shown in FIG. 1). The server 200 is part of a network, e.g. the radio access network 104.

The word "TRP" encompasses any device that wirelessly communicates with UEs. Therefore, in some implementations, the TRP 108 may be called other names, such as a base station, a base transceiver station, a radio base station, a network node, a transmit/receive node, a Node B, an eNodeB (eNB), a gNB (sometimes called a "gigabit" Node B), a relay station, or a remote radio head. Also, in some embodiments, the parts of the TRP 108 may be distributed. For example, some of the modules of the TRP 108 may be located remote from the equipment housing the antennas of the TRP 108, and may be coupled to the equipment housing the antennas over a communication link (not shown).

In FIG. 6, the TRP 108 includes a transmitter 202 and a receiver 204, both coupled to one or more antennas 206. Only one antenna 206 is illustrated. The transmitter 202 and receiver 204 may be implemented as a transceiver. Much of the intelligence of the network is not present at the TRP 108, but is instead present at the server 200. For example, physical layer operations such as encoding and decoding, as well as the generation of downlink control information and scheduling is performed at the server 200. The TRP 108 is coupled to the server 200 via a communication link 201. The server 200 may also be coupled to other TRPs (not shown), and the server 200 may also perform equivalent functions for data sent from/received at the other TRPs. In this way, the TRPs may be kept relatively low complexity, with most of the intelligence present on the server 200, and dual connectivity may be more easily implemented. In implementation, the server 200 may instead be a plurality of servers coupled to each other. Also, in implementation, some of the server 200 operations may instead be present at the TRPs, and vice versa. For example, the encoding and decoding may be present at the TRP 108 instead of the server 200.

The server 200 includes a decoder 222 for decoding uplink messages received from the UE 116. The uplink messages are received by the receiver 204 of the TRP 108. The server 200 further includes a downlink message generator 224 for generating messages to be transmitted to the UE 116. The messages are transmitted by the transmitter 202 of the TRP 108. The downlink message generator 224 includes an encoder 226 for encoding messages. The server 200 further includes a DCI generator 228 for generating DCI, e.g. for generating the light DCI discussed herein. The DCI generator 228 includes a masking module 227 to mask the CRC of the DCI, as explained later. The masking module 227 may be part of the downlink message generator 224 instead. The DCI generator 228 also includes an SNR detector 230 for detecting whether the quality of a downlink channel is below a certain threshold, as explained later. The server 200 further includes a higher layer signal generator 234 for generating the higher layer control signaling described later. The server 200 further includes a TRP coordinator 236 for coordinating the transmissions of different TRPs. The server 200 further includes a memory 238.

The decoder 222, the downlink message generator 224, the encoder 226, the DCI generator 228, the masking module 227, the SNR detector 230, the higher layer signal generator 234, the TRP coordinator 236, and/or any signal processing components of the transmitter 202 and receiver 204, may be implemented in the form of circuitry configured to perform the functions of the decoder 222, the downlink message generator 224, the encoder 226, the DCI generator 228, the masking module 227, the SNR detector 230, the higher layer signal generator 234, the TRP coordinator 236, and/or any signal processing components of the transmitter 202 and receiver 204. In some implementations, the circuitry includes a memory and one or more processors that execute instructions that cause the one or more processors to perform the operations of the decoder 222, the downlink message generator 224, the encoder 226, the DCI generator 228, the masking module 227, the SNR detector 230, the higher layer signal generator 234, the TRP coordinator 236, and/or any signal processing components of the transmitter 202 and receiver 204. Alternatively, the decoder 222, the downlink message generator 224, the encoder 226, the DCI generator 228, the masking module 227, the SNR detector 230, the higher layer signal generator 234, the TRP coordinator 236, and/or any signal processing components of the transmitter 202 and receiver 204, may be implemented using integrated circuitry, such as an application specific integrated circuit (ASIC), a graphics processing unit (GPU), or a programmed field programmable gate array (FPGA) for performing the operations of the decoder 222, the downlink message generator 224, the encoder 226, the DCI generator 228, the masking module 227, the SNR detector 230, the higher layer signal generator 234, the TRP coordinator 236, and/or any signal processing components of the transmitter 202 and receiver 204. In some implementations, the functionality of the server 200 and/or TRPs described herein may be fully or partially implemented in software or modules stored in a memory and executed by the one or more processors.

The UE 116 also includes a transmitter 252 and a receiver 254 coupled to one or more antennas 256. Only one antenna 256 is illustrated. The transmitter 252 and the receiver 254 may be integrated as a transceiver. The UE 116 further includes an uplink message generator 262 for generating messages to be transmitted in uplink transmissions. Generating an uplink message may include encoding data to be transmitted in the message in an encoder 264, and modulating the encoded data. The UE 116 further includes a downlink message processor 266 for processing downlink messages received in downlink transmissions. The downlink message processor 266 includes a decoder 268 for decoding downlink messages. Demodulation is also performed by the downlink message processor 266. The downlink message processor 266 may further include an unmasking module 269 for unmasking the CRC of DCI, as discussed later. The UE 116 further includes a flag generator 270 for generating feedback for the network, as explained in more detail later. The UE 116 further includes a memory 272.

The uplink message generator 262, encoder 264, downlink message processor 266, decoder 268, unmasking module 269, and flag generator 270, and/or any signal processing components of the transmitter 252 and receiver 254, may be may be implemented in the form of circuitry configured to perform the functions of the uplink message generator 262, encoder 264, downlink message processor 266, decoder 268, unmasking module 269, and flag generator 270, and/or any signal processing components of the transmitter 252 and receiver 254. In some implementations, the circuitry includes a memory and one or more processors that execute instructions that cause the one or more processors to perform the operations of the uplink message generator 262, encoder 264, downlink message processor 266, decoder 268, unmasking module 269, and flag generator 270, and/or any signal processing components of the transmitter 252 and receiver 254. Alternatively, the uplink message generator 262, encoder 264, downlink message processor 266, decoder 268, unmasking module 269, and flag generator 270, and/or any signal processing components of the transmitter 252 and receiver 254, may be implemented using integrated circuitry, such as an ASIC, a GPU, or a FPGA for performing the operations of the uplink message generator 262, encoder 264, downlink message processor 266, decoder 268, unmasking module 269, and flag generator 270, and/or any signal processing components of the transmitter 252 and receiver 254. In some implementations, the functionality of the UE 116 may be fully or partially implemented in software or modules stored in a memory and executed by the one or more processors.

The TRP 108, server 200, and UE 116 may include other components, but these have been omitted for the sake of clarity.

The TRP 108 and the server 200 form part of a network, e.g. radio access network 104. The UE 116 communicates with the network by sending data to/receiving data from the TRP 108.

Hybrid Automatic Repeat Request (HARQ)

HARQ may be performed for transmissions between a UE and a network. For example, an initial downlink data transmission of a TB may be sent from the network to the UE 116 via TRP 108. If the TB in the initial downlink data transmission is not successfully decoded by the UE 116, then a retransmission may be performed by the network. The word "transmission" as used herein, may refer to an initial transmission or a retransmission. A retransmission may include a copy of the previously transmitted TB and/or further information for decoding the TB. For example, the retransmission data may include some or all of the original data and/or parity information. The UE 116 may perform HARQ combining as follows: instead of discarding unsuccessfully decoded initial data of the TB, the unsuccessfully decoded initial data may be stored at the UE 116 in memory 272 and combined with received retransmission data to try to successfully decode the TB. When HARQ combining is performed, the retransmission data may not need to be a complete retransmission of the initial data. The retransmission may carry less data, such as some or all of the parity bits associated with the initial data. One type of HARQ combining that may be used is soft combining, such as chase combining or incremental redundancy.

Initial transmissions and retransmissions may use different redundancy versions (RVs). Different RVs may also be referred to as different revisions. When data is encoded by the network, e.g. in downlink message generator 224 in the server 200, the encoded bits may be partitioned into different sets that possibly overlap with each other. Each set is a different RV. For example, some RVs may have more parity bits than other RVs. Each RV is identified by an RV index (e.g. RV 0, RV 1, RV 2, . . . etc.). When a transmission is sent using a particular RV, then only the encoded bits corresponding to that RV are transmitted. Different error correction codes may be used to generate the encoded bits, e.g. turbo codes, low-density parity-check (LDPC) codes, polar codes, etc. The encoder 226 in the downlink message generator 224 may perform the error correction coding. In one embodiment, the error correction coding results in an encoded bit stream comprising three bit streams: a systematic bit stream and two parity bit streams. Rate matching may be performed, and a circular buffer (not illustrated) may store the systematic and parity bits. The bits may be read from the circular buffer and modulated for transmission in the downlink message. The circular buffer has different RVs associated with it, e.g. four redundancy versions (RVs): RV0, RV1, RV2, and RV3. Each RV indicates a starting location from which the coded bits are to be read from the circular buffer. Therefore, each RV transmits a different set of the encoded bits. Data may initially be transmitted using RV 0, but a retransmission may sometimes use a higher RV, e.g., RV 1 for the first retransmission, RV 2 for a second retransmission, etc.

The UE 116 uses knowledge of the RV to perform decoding in decoder 268. For chase combining, the RV of the initial and retransmissions may be the same, e.g. RV 0. For incremental redundancy, the retransmissions may use a higher RV that may follow a predetermined pattern, e.g. RV 0 for the initial transmission, RV 2 for the first retransmission, RV 3 for the second retransmission, and RV 1 for the third retransmission.

HARQ feedback may be sent from the UE 116, to the network, as part of the HARQ procedure for downlink transmission. For example, an ACK may be generated by the downlink message processor 266 and sent by the UE 116 when the UE 116 successfully decodes the TB. In some embodiments, a NACK may be sent by the UE 116 when the TB is not successfully decoded. The HARQ feedback may be generated in the downlink message processor 266.

In some embodiments, retransmissions may be performed without waiting a set period of time for an ACK or a NACK for a previous transmission of the TB. Such autonomous retransmissions are sometimes referred to as repetitions. When repetitions of a TB are sent to UE 116 by the network, NACKs are typically not sent by the UE 116 for the TB. In some embodiments, the network terminates the repetitions when an ACK is received from the UE 116 for the TB, or when the maximum number of repetitions has occurred. A repetition of a TB may refer to both initial and subsequent transmissions of the TB, where the subsequent transmissions may autonomously follow the initial transmission, e.g., subsequent transmissions can be sent without waiting for HARQ feedback, as mentioned above. For example, if K≥1 repetitions are configured, it refers to the case where an initial transmission is followed by (K−1) subsequent transmissions of the TB, with same or different RV. K repetitions can be terminated if one or more pre-defined conditions are met, such as a grant is received and/or HARQ feedback is received and/or a timer expires and/or the UE switches bandwidth partitions and/or latency tolerance is exceeded etc. HARQ feedback can be generated based on one or a group of repetitions. It may depend on HARQ timing indicated, either semi-statically or by physical layer (layer 1) signaling.

A network may transmit multiple TBs to the UE 116, and therefore there may be multiple HARQ processes ongoing at any one time for the UE 116. The different HARQ processes may be identified using different HARQ process IDs. For example, when the network sends to UE 116 an initial transmission of a first TB and any retransmissions of that first TB, then the network and UE 116 may associate such initial transmissions/retransmissions with a HARQ process ID #1. When the network sends to UE 116 an initial transmission of a second TB and any retransmissions of that second TB, then the network and UE may associate such initial transmissions/retransmissions with a HARQ process ID #2. Multiple HARQ processes may be ongoing in parallel. Therefore, when a downlink transmission of a TB is sent to the UE 116, the UE 116 needs to know which HARQ process the TB belongs to, i.e. the HARQ process ID of the TB. In some embodiments, the network may explicitly indicate, to the UE 116, the HARQ process ID of a scheduled downlink transmission of a TB by explicitly indicating the HARQ process ID in the DCI that schedules the downlink transmission of the TB. Similarly for a scheduled uplink transmission, the network may explicitly signal the HARQ process ID in the grant.

Layer 1 Signaling (DCI)

Figure 7:
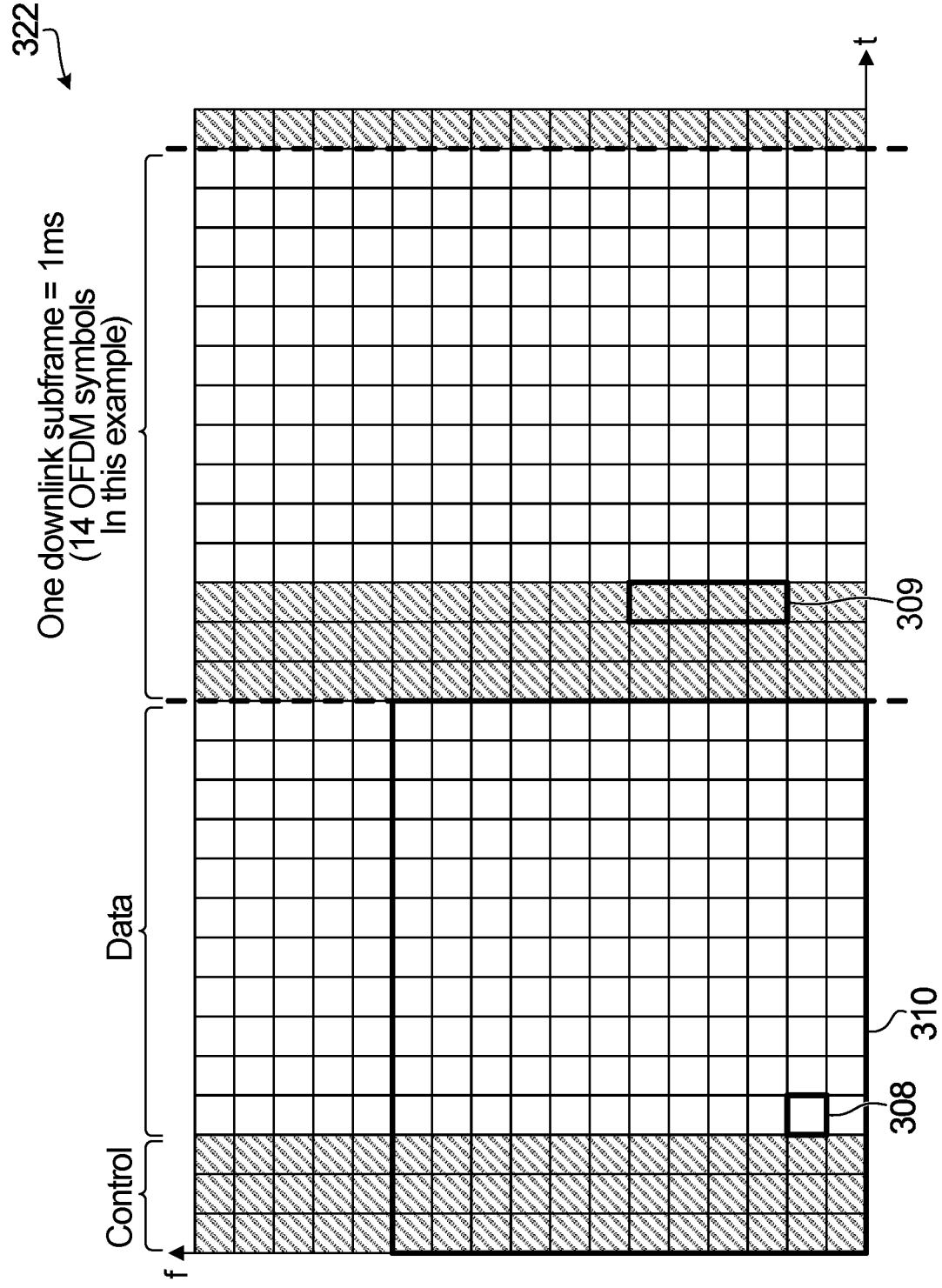
FIG. 7 is a set of downlink time-frequency resources, according to one embodiment.

Wireless transmissions between the network and UEs are performed using resources. FIG. 7 is an example of downlink time-frequency resources 322, according to one embodiment.

The time-frequency resources 322 are partitioned into time intervals, and each time interval is separated by stippled lines in FIG. 7. Each time interval may be called a subframe or slot or mini-slot or scheduling interval, depending upon the implementation. In the examples described below, each time interval will be called a subframe. In the example of FIG. 7, each subframe has a duration of 1 ms, and each subframe comprises 14 OFDM symbols. However, this is only an example. For example, a subframe may be 0.5 ms instead.

In FIG. 7, a 14 OFDM symbol interval is shown, where the first three OFDM symbols are used for control, and the rest of the OFDM symbols in the interval are used for data. Again, this is only an example.

In some embodiments, there may be more or fewer OFDM symbols in a subframe, and the number of OFDM symbols in a subframe may depend upon the subcarrier spacing. The time-frequency resources 322 include a plurality of resource elements (REs). Each RE is 1 subcarrier by 1 symbol, and an example of a RE is shown at 308.

In FIG. 7, a resource block (RB) is the smallest unit of resources that can be allocated for a downlink transmission to a UE. An example of a resource block (RB) is shown at 310. RB 310 happens to be 14 OFDM symbols in time by 12 subcarriers in frequency, but this is only an example. Also, the RB 310 may be distributed over time and frequency in actual implementation, i.e. the 168 REs of the RB 310 may not necessarily be adjacent to each other. Each RB may be associated with an index, which identifies the time-frequency location of the RB. For example, RB 310 may be RB index "14". Alternatively, an RB may be defined in the frequency domain only, e.g., occupying 12 subcarriers by one OFDM symbol. The time domain duration of the RB may be configurable or obtained based on the time duration indicated for the transmission. For example, if a transmission duration or scheduling interval comprises N≥1 OFDM symbols, then the RB in the time domain occupies N OFDM symbols. Alternatively, an RB may span $2^L$ OFDM symbols in time domain, where L≥0, and L={0, 1, 2, . . . }, L being an integer. The value of L may be defined in standards or configurable. L may be configured in a cell specific or UE specific or group specific manner, and configuration signaling may be indicated by higher layer control signaling. In one example, in a transmission duration, RBs with different durations may coexist. For example, if a transmission duration is 7 symbols, a first RB with 4 symbols duration may be followed by a second RB with 3 symbols duration. Resource allocation based on first RB type and second RB type may span different sub-carrier sets.

A transmission time interval (TTI) is the interval of time over which a TB is transmitted to the UE. A TTI is sometimes instead called a transmission time unit (TTU). Different UEs may have TTIs of different lengths. In the specific embodiment described in relation to FIG. 7, a TTI happens to be equal to a duration of one RB. However, in general this need not be the case. For example, the duration of a RB may be less than one TTI. In one example, a TTI can be formed in terms of slot(s) or mini-slot(s) or a combination of slot(s) and mini-slot(s). A mini-slot has fewer OFDM symbols than a slot. For example, if a slot has 14 OFDM symbols, a mini-slot can be from 1 to 13 OFDM symbols. In another example, a TTI may or may not be a collection of continuous symbols.

A partition of the downlink time-frequency resources, shown in hatching, is used for sending downlink control information (DCI) to the UEs. These downlink time-frequency resources may be referred to as the downlink control channel. The other downlink time-frequency resources, not shown in hatching, are used to send data, i.e. TBs, to the UEs. These downlink time-frequency resources form one or more downlink data channels.

The DCI sent in the downlink control channel is sent as part of the physical layer and is therefore also sometimes called other names, such as physical layer downlink control information, physical layer control signaling, physical layer signaling, layer 1 downlink control information, layer 1 control signaling, or layer 1 signaling. The DCI may include a downlink scheduling grant, e.g. informing the UE 116 that a downlink transmission is scheduled for the UE at a particular time-frequency region in the data channel. The data channel then carriers the scheduled data transmission. The DCI is generated at the network, e.g. in DCI generator 228 of the server 200 in FIG. 6.

The portion of the downlink time-frequency resources not illustrated in hatching in FIG. 7 is used for sending data in one or more data channels, such as in a physical downlink shared channel (PDSCH). TBs of data are sent to the UEs in a data channel. The data may include downlink traffic to send to the UEs, but may also sometimes include higher layer control signaling, such as radio resource control (RRC) signaling.

In FIG. 7, every subframe has its first three OFDM symbols used for sending DCI from the network, and the rest of the OFDM symbols are used for sending TBs of data from the network. This is only an example. The portion of a subframe dedicated to sending DCI may be different from that illustrated. More generally, any OFDM symbol can have a control region or control resource set(s) configured in it, not just the first few OFDM symbols in a subframe.

A group of REs in the DCI may form a resource element group (REG). For example, each REG may comprise four REs. An example of a REG 309 is illustrated in FIG. 7, although in actual implementation the REs of the REG 309 may not be adjacent to each other. An integer number of REGs (e.g., nine as in LTE) form a control-channel element (CCE), and the number of CCEs required for a certain DCI depends on the payload. The number of CCEs used to transmit DCI may be referred to as the aggregation level.

In some embodiments, particular DCI may be UE-specific, i.e. only meant for a particular UE. For example, DCI meant for UE 116 may include a cyclic redundancy check (CRC), which may be masked with a UE ID that uniquely identifies UE 116 on the downlink time-frequency resources. The UE ID may be the radio network temporary identification (RNTI) for UE 116 (e.g. the C-RNTI), although this is not a necessity.

In some embodiments, the DCI for UE 116 may be transmitted at a location in the downlink control channel within a search space defined by the UE ID (e.g. defined by the RNTI). The UE 116 may attempt to decode all the possible locations of DCIs within its search space. If decoding is successful and the CRC checks with the assigned UE ID of UE 116, then the control channel is declared as valid and the UE 116 processes the control information inside the DCI. The search space may be referred to as the control resource set (CORESET).

Figure 8:
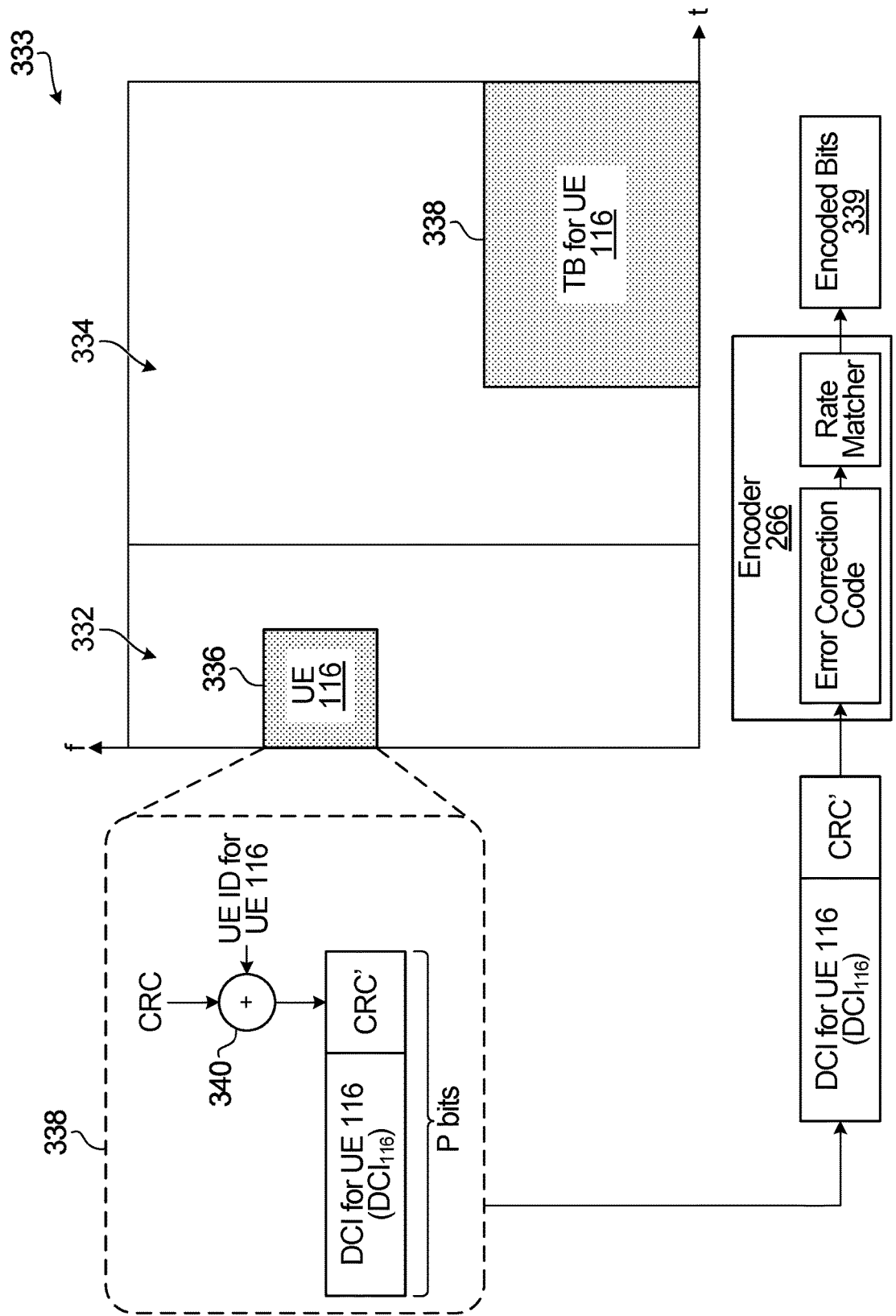
FIG. 8 illustrates an example set of time-frequency resources having a downlink control channel and a downlink data channel, and an example method of encoding DCI.

An example of UE-specific DCI for UE 116 is illustrated in FIG. 8. FIG. 8 illustrates a set of time-frequency resources 333 in which a first logical partition of time-frequency resources forms a downlink control channel 332 and a second logical partition of time-frequency resources forms a downlink data channel 334. OFDM symbols or subframes are not illustrated, and the partition between the downlink control channel 332 and the data channel 334 is a logical partition to emphasize that the specific partition of control channel and data channel shown in FIG. 7 is not necessary. The control channel 332 of FIG. 8 includes encoded control information $DCI_{116}$ for UE 116 within resource partition 336. Generation of the encoded control information is also illustrated in FIG. 8. Specifically, a CRC is appended to the $DCI_{116}$, and the $DCI_{116}$ and CRC together form a payload. At least a portion of the payload is masked, by the network, using the ID of the UE 116. For example, the masking may occur in the masking module 227 in DCI generator 228. In the example illustrated in FIG. 8, the CRC of the payload is masked by scrambling the CRC of the payload with the ID of UE 116, as shown in stippled bubble 338. Specifically, the masking occurs by XORing the CRC with a bitmask comprising the ID of UE 116, as shown at 340. After masking, the payload ($DCI_{116}$ and masked CRC) consists of P bits. The masked CRC is illustrated as CRC'. An error correction code and rate matching is then applied by encoder 226. Different error correction codes may be used, e.g. turbo codes, low-density parity-check (LDPC) codes, polar codes, convolutional codes, etc. In some embodiments, the error correction code may be a 'mother code' having a default code rate, e.g. a default code rate of ⅓. The rate matcher modifies the default code rate to result in an effective code rate that matches the available time-frequency resources for transmitting the encoded payload. For example, the rate matcher may perform puncturing if the code rate needs to be higher, or the rate matcher may select additional parity bits and/or add some other form of redundancy if the code rate can be lowered. The encoded bits 339 output from the encoder 266 is what is transmitted in resource partition 336 of the control channel 332.

During operation, the decoder 268 of UE 116 performs decoding of the encoded bits received on resource partition 336 of the control channel 332. In some embodiments, the decoding may be blind decoding that involves decoding all the possible locations of DCIs within a search space. After the decoding operation, the UE 116 uses the UE ID of UE 116 to unmask the CRC and obtain the $DC_{116}$. The unmasking may comprise unscrambling the CRC using the ID of UE 116 by performing an XOR operation between the masked CRC and the ID of UE 116. The unmasking may be performed by unmasking module 269. When the unmasking using the ID of UE 116 is successful (e.g. the unscrambled CRC results in a correct CRC value match), then the $DC_{116}$ is obtained. The $DC_{116}$ indicates at least some information used for finding and/or decoding a corresponding downlink data transmission in the data channel 334. For example, the $DCI_{116}$ may be a scheduling grant indicating parameters such as a time-frequency location 338 in the data channel 334 of a scheduled downlink data transmission of a TB for UE 116. The scheduling grant may indicate other parameters used by the UE for decoding the TB, e.g. the HARQ process ID of the TB, the modulation and coding scheme (MCS), etc. However, in other embodiments described below, the $DCI_{116}$ only provides some of the parameters used by the UE 116 for locating and decoding the downlink data transmission, e.g. the $DCI_{116}$ may only provide the HARQ process ID, and the rest of the parameters are sent to the UE 116 in advance using higher layer control signaling.

Higher Layer Control Signaling

As explained above, a partition of the downlink time-frequency resources is specifically used for sending DCI. The partition of downlink time-frequency resources used for sending DCI may be referred to as a control channel, which is different from the data channel used for sending the TBs.

The DCI is dynamic control signaling because it is sent in a control channel that is part of the downlink frame structure. The control channel occurs on a periodic basis and enables the network to dynamically schedule downlink transmissions to the UEs on a frame-by-frame basis. However, higher layer control signaling may also be transmitted to the UEs. Higher layer control signaling is not part of the DCI, but is instead encoded in data packets that are sent in the data channel. For example, the TB carried in downlink data transmission 338 in data channel 333 in FIG. 8 may be data traffic, but it could also include (or instead be) higher layer control signaling. Unlike DCI, higher layer control signaling is not dynamic, and so is for semi-statically configuring the UE. An example of higher layer control signaling is RRC signaling. Another example of higher layer control signaling is signaling sent in the medium access control (MAC) layer, such as a MAC control element (CE). Higher layer control signaling may also be referred to as higher layer signaling.

DCI with a Reduced Payload ("Light DCI")

If the network needs to send a downlink transmission of a TB to the UE 116, the network may dynamically schedule the transmission in the downlink data channel, and a downlink scheduling grant may be sent, in DCI, to inform UE 116. For example, the $DCI_{116}$ in FIG. 8 may be a scheduling grant that dynamically schedules the TB for UE 116 in location 338 in the downlink data channel. The DCI informs the UE 116 of the parameters associated with the TB, so that the UE 116 can process the TB, e.g. the parameters may be used by the UE 116 to demodulate and/or decode the TB. The parameters are mapped to one or more information fields in the DCI payload. The downlink scheduling grant sent in DCI in conventional long term evolution (LTE) typically indicates, to the UE, at least some or all of the following parameters:

(1) The time and/or frequency region, i.e., frequency domain and/or time domain resources in the downlink data channel at which the TB transmission will be sent. This is sometimes referred to as the resource block allocation and/or time-domain resource allocation.
(2) The modulation and coding scheme (MCS) used by the TB transmission.
(3) The HARQ process ID of the TB transmission. The HARQ process ID is sometimes called a HARQ ID or a HARQ number or a HARQ process number.
(4) The RV of the TB.
(5) Whether the transmission is a new (initial transmission) of the TB or a retransmission of the TB. This is sometimes referred to as the new data indicator (NDI).
(6) The index of the bandwidth part used for the TB transmission, if the UE does not operate over full carrier bandwidth (optional).
(7) Antenna ports used for transmission, if multiple layers are used for the transmission (optional).
(8) Virtual RB to physical RB mapping, a flag that may be present for contiguous RB allocation (optional).
(9) Bundling size indicator, if the flag in (8) is enabled (optional).
(10) Carrier indicator (optional).

In addition to information fields necessary for processing the downlink data transmission, the DCI may also indicate parameters in information fields that are used for HARQ feedback or taking further actions at the receiver after decoding the TB, such as

(11) HARQ timing indicator.
(12) Physical uplink control channel (PUCCH) resource indicator, or ACK/NACK channel resource index.
(13) Downlink assignment index, which may be necessary for forming the HARQ codebook.
(14) Power control command for PUCCH.

The indication of parameters used for data demodulation, such as (1) to (10) above (including or excluding the optional fields), and/or information fields for feedback processing, results in a DCI format having a payload of a particular number of bits $P_A$.

In one example, a DCI format has a given payload size that includes one or more fields carrying a dynamic indication of assignments of different parameters for uplink and/or downlink transmission and CRC bits. This example is sometimes adopted in standards for defining DCI payload sizes. In another example, a payload of DCI format size may exclude CRC bits. In the examples below, the DCI payload size is assumed to include the CRC bits. The number of CRC bits in different DCI formats can be the same or different. Higher layer signaling (e.g., RRC) may notify the UE if the number of CRC bits is reconfigured for a given DCI format. For example, there can be a set of supported/defined values for number of CRC bits, for example, 16, 24, 32, 40, 48 bits. This set may be pre-defined in standards or configurable by RRC signaling. Higher layer signaling notifies the UE which value is being used in the DCI format. It implies that a given DCI format may have different payloads depending on how many CRC bits are used. A higher number of bits for CRC indicates higher detection probability for a given DCI format. In some cases, a DCI payload includes flag(s) or identifier(s) for differentiation between DCI formats with identical sizes and/or padding bits to obtain a certain payload size.

In low SNR conditions, e.g. when a downlink channel between the network and the UE 116 has a low SNR, such when the UE 116 is at a cell edge, it may be desirable to increase the reliability of the DCI transmission. Therefore, in some embodiments, the network tries to increase the reliability of the DCI transmission by using a new "light" or "compact" DCI type having a format with reduced payload content. The payload of the DCI type is specifically reduced by moving, into higher-layer signaling, some of the parameters normally indicated in a standard DCI type payload.

Depending on the channel condition, a DCI payload can be encoded with appropriate error correction coding and rate matching and/or appropriate number of CCE aggregation level. Having a reduced payload may allow for a lower code rate to be used to map the encoded and rate matched bits to a given number of CCEs. In some cases, the number of CCEs available for transmitting downlink control information (e.g. for transmitting a physical downlink control channel (PDCCH) message) may be limited, and a higher aggregation level may not be achievable. In this case, a DCI type having a reduced payload ("light DCI") facilitates using a lower code rate to try to ensure a higher reliability in low SNR conditions.

Figure 9:
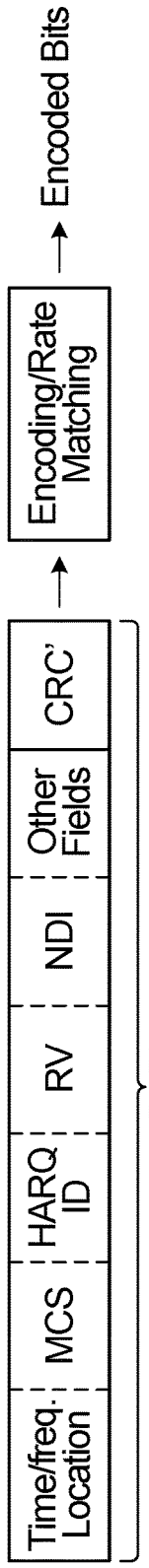
FIG. 9 illustrates an example of a standard DCI format and three example light DCI formats.
Figure 9:
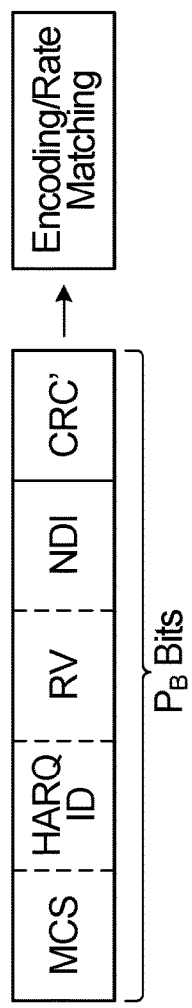
Figure 9:
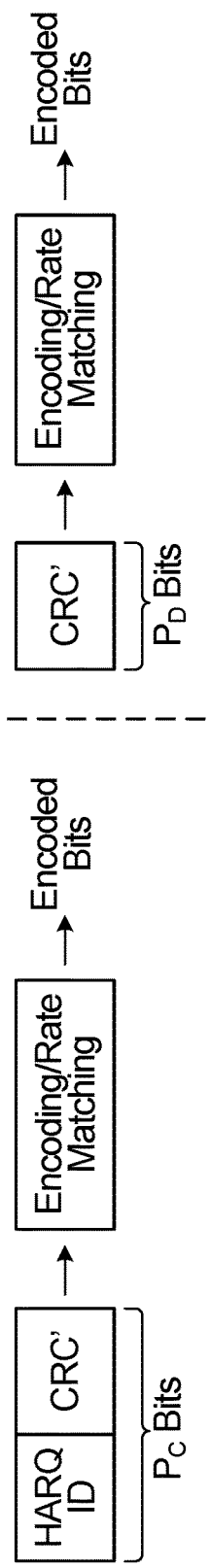
Figure 9:

FIG. 9 illustrates an example of a standard DCI type format and three example light DCI type formats. In the examples, the payload is shown to include CRC bits. The CRC bits are assumed to be masked by an ID and so are illustrated as CRC'. "Other fields" shown for the standard DCI may include one or more of the other parameters in the list (1) to (14) mentioned above, or any other parameters such as flag/identifier or zero padding bits.

A standard DCI type may have a format having a payload of $P_A$ bits. The $P_A$ bits are encoded using an error correction code followed by a rate matching operation to obtain a desired overall code rate. The overall code rate is referred to as the effective code rate, and may be obtained by error correction encoding with a default/mother code rate followed by rate matching. The payload of $P_A$ bits includes fields that indicate parameters such as time-frequency location, MCS, HARQ ID/process number, RV, NDI, possible other fields, and masked CRC bits.

An example light DCI format may instead have a payload of $P_B < P_A$ bits. $P_B$ is less than $P_A$ by eliminating some of the information sent in the DCI, e.g. by eliminating the parameter indicating the time-frequency region in the downlink data channel at which the TB transmission will be sent. Instead, the eliminated parameter is configured in higher-layer signaling on a semi-static basis, and when the UE 116 receives the DCI format with payload $P_B$, the UE knows from the previous higher-layer signaling the time-frequency region at which a TB will be sent. For example, frequency domain resources can be configured in higher layer signaling to be a certain group of $X \geq 1$ RBs for a given numerology within the carrier bandwidth or within a bandwidth part. Alternatively, frequency domain resources can be configured in higher layer signaling to be X % of a configured bandwidth part of a UE, where $1 \leq X \leq 100$. When, X<100, additional information may be provided to the UE in the light DCI indicating where within the bandwidth part the configured frequency domain resource is located, such as a starting position in terms of index of an RB and/or range/span in terms of group/number of RBs. Time domain resources can be configured in higher layer signaling or in the light DCI to be Y symbol(s) or slot(s).

Because $P_B$ is fewer bits than $P_A$, more redundancy may be used in encoding/rate matching $P_B$ to map the DCI to given number of CCEs. That is, the effective code rate of a light DCI format in FIG. 9 may be more robust (i.e., lower) than the chosen code rate of payload $P_A$. The light DCI may therefore be more reliably decoded.

Although not shown, the light DCI format with payload of $P_B$ bits may include other fields as well, such as one or more parameters from the list (1) to (14) above (if not configured by higher layer signaling) or a flag/identifier (e.g., to distinguish between same payload DCI formats) or zero padding bits. In addition to a configured time-frequency region, one or more parameters related to HARQ feedback and/or PUCCH may be configured by higher layer signaling for the DCI format with payload of $P_B$ bits.

Another example light DCI format may instead have a payload of $P_C < P_B < P_A$ bits. $P_C$ is less than $P_A$ and $P_B$ by eliminating some of the information sent in the DCI, e.g. by eliminating all of the parameters indicated in the standard DCI grant, except for the HARQ process ID of the TB. The parameters not indicated in the DCI are instead configured in higher-layer signaling on a semi-static basis, and when the UE 116 receives the payload $P_C$, the UE knows from the previous higher-layer signaling the other parameters (e.g. time-frequency resources, MCS, RV). The DCI payload of $P_C$ bits may optionally indicate NDI bit (not shown). Also, although not shown, the light DCI format with payload of $P_C$ bits may include other fields as well, such as one or more parameters from the list (1) to (14) above (if not configured by higher layer signaling) or a flag/identifier (e.g., to distinguish between same payload DCI formats) or zero padding bits. In addition to a configured time-frequency region, MCS, RV, one or more parameters related to HARQ feedback and/or PUCCH may be configured by higher layer signaling for the DCI format with payload of $P_C$ bits. Because $P_C$ is fewer bits than $P_A$ and $P_B$, more redundancy may be used in encoding/rate matching $P_C$. That is, the effective code rate for payload with $P_c$ in FIG. 9 may be more robust than the code rate for $P_A$ and $P_B$. The light DCI may therefore be more reliably decoded. In some embodiments, $P_C$ may only be one bit.

In the last example in FIG. 9, the light DCI format only includes CRC bit(s) with a payload of $P_D$ bit(s). This may be useful when only one active HARQ process is supported. All other parameters required by the UE for processing (e.g. demodulating and/or decoding) a TB scheduled by the light DCI format of the last example are configured in higher layer signaling. Although not shown, the light DCI format with payload of $P_D$ bits may include other fields as well, such as one or more parameters (1) to (14) from the list above (if not configured by higher layer signaling) or a flag/identifier (e.g., to distinguish between same payload DCI formats) or zero padding bits.

The UE 116 will have a higher probability of correctly decoding the payload $P_B$ or $P_C$ or $P_D$ compared to payload $P_A$ because payloads $P_B$ and $P_C$ and $P_D$ each have fewer bits than $P_A$ and can therefore be encoded with a more robust error correction code and/or be rate matched to have a lower effective code rate. The light DCI transmission may therefore be more reliable.

FIG. 9 only illustrates examples. The standard DCI in FIG. 9 may include different parameter indications. The example light DCI formats in FIG. 9 are only possibilities. Any DCI type in which parameters normally dynamically and explicitly indicated in a DCI are instead omitted and sent in higher layer signaling may be called a light DCI type. The actual parameters dynamically and explicitly indicated in the light DCI may vary depending upon the implementation and/or DCI format payload size. Also, it is not necessary for the encoded light DCI to be the same number of encoded bits as the encoded standard DCI. The encoded light DCI may have less, the same, or more bits than the encoded standard DCI. Also note that even if MCS, RV etc. are indicated in a light DCI format, the number of bits used to indicate those parameters may be the same or less than what is used in a standard DCI format. For example, a standard DCI format may have 5 bits for MCS and 2 bits for RV, whereas a light DCI format may have 1/2/3/4 bits for MCS and 1 bit for RV.

In general, the light DCI trades off flexibility in dynamic parameter assignment for possible increased reliability. The parameters removed from the standard DCI to allow for more robust encoding results in less flexibility in dynamic assignment of those parameters. Instead of dynamically indicating a complete set of parameters to be used by the UE for the dynamically scheduled downlink data transmission, an indication of some of the parameters is offloaded to higher layer signaling, such as RRC signaling or the MAC CE. A similar concept can be applied for a scheduled uplink transmission.

In some embodiments, the UE 116 may be configured to operate in different transmissions modes. Each transmission mode may be associated with one or more DCI types that the UE 116 may receive when operating in that transmission mode. For example, a particular transmission mode may be associated with a standard DCI type and a particular light DCI type. When operating in that transmission mode, the base station may send either of the DCI types. The transmission mode may be transmitted to the UE 116 in higher layer signaling, such as RRC signaling. Higher layer signaling may also be used to indicate (i.e. preconfigure) the at least one parameter that is not explicitly indicted in the light DCI type. For example, if the light DCI type has a format that does not explicitly indicate the time-frequency region in which a TB scheduled by the light DCI type is sent, then the time-frequency region is indicated in the higher layer signaling. The higher layer signaling may be generated by higher layer signal generator 234 and sent in a TB in the downlink data channel before data transmission is scheduled for which light DCI is used. The higher layer signaling used to indicate the transmission mode, and the higher layer signaling used to indicate the at least one parameter not explicitly indicated in the light DCI, may be transmitted to the UE 116 at the same time (e.g. in a same downlink data burst) or at different times.

Applications/use cases for light DCI include transmissions requiring high reliability and/or low SNR environments, such as when the UE is at a cell edge. For example, standard DCI may be used by default, except for when the UE 116 is operating in a low SNR environment (e.g. when the UE 116 travels near a cell edge), in which case the network may switch to a light DCI format instead. The UE may be configured/notified by higher layer (e.g. RRC) signaling to switch to a different transmission mode before light DCI is used. For example, a transmission mode may be configured in which the UE expects to receive one or more of N DCI types which constitute the given transmission mode. For example, if N=2, the UE expects or blindly detects for two DCI types for the given transmission mode. When the transmission of a light DCI may be useful, the network can configure the UE for a suitable transmission mode that includes the light DCI type, so that the UE looks for the light DCI format. In one example, a special transmission mode can be configured which only includes the light DCI type for data transmission. Optionally, DCI types which are used for scheduling system information and/or triggering random access or other transmitting common control information such as group-common PDCCHs can be received by the UE in any transmission mode.

In general, a light DCI type that schedules a transmission of a TB will have a format that may dynamically indicate one or some of the following parameters (with the others instead being preconfigured in advance, as needed, in higher layer signaling or fixed in standards or set to a default value or not configured for the UE):

(A) The HARQ process ID of the TB transmission (e.g. which may be 1 or 2 or 3 or 4 bits).
(B) Whether the transmission is a new (initial transmission) of the TB or a retransmission of the TB, e.g. a NDI flag. (e.g. which may be 1 bit).
(C) The frequency domain resource (e.g. RB) and/or time domain resource allocation, e.g. the time-frequency region in the data channel on which the TB will be transmitted. The number of bits to indicate this parameter may be a function of carrier BW or bandwidth part. For example, 20 bits or less. Frequency and time domain resource allocation can be in separate fields. Both can be indicated in DCI, or one can be configured in higher layer signaling while the other is dynamically indicated in DCI.
(D) The MCS of the TB (e.g. which may be 1 or 2 or 3 or 4 or 5 bits).
(E) The transport block size (TBS) of the TB (e.g. which may be 1 or 2 or 3 or 4 bits).
(F) The RV of the TB transmission (e.g. which may be 1 or 2 bits).
(G) A carrier indication. In some embodiments, a transmission of a TB may be sent using different carriers, and an indication of the carrier used may be sent to the UE (e.g. which may be 1 or 2 or 3 or 4 bits).
(H) A flag that differentiates the light DCI from other DCI formats (e.g. which may be 1 or 2 bits).
(I) Padding, as needed, to match a standardized DCI format length.
(J) Virtual RB (VRB) to physical RB (PRB) mapping flag (e.g. which may be 1 bit).
(K) Downlink data channel, e.g. physical downlink shared channel (PDSCH), bundling size indicator (e.g. which may be 1 or 2 or 3 bits).
(L) Repetition number (e.g. which may be 1 or 2 or 3 bits). This can be indicated if the network allocates resources for repeating the TB a given number of times, regardless of any HARQ feedback. For example, K=2 implies the TB is autonomously repeated after an initial transmission.
(M) Power control command for an uplink control channel, e.g. a physical uplink control channel (PUCCH) (e.g. which may be 1 or 2 bits).
(N) Downlink assignment index (e.g. which may be 1 or 2 or 3 or 4 bits).
(O) Antenna ports (e.g. which may be 1 or 2 or 3 or 4 or 5 bits).
(P) Bandwidth part indicator (e.g. which may be 1 or 2 or 3 bits).

Any of parameters (A) to (P) above that are not explicitly and dynamically indicated in the light DCI type and that are required for processing (e.g. demodulating and/or decoding the TB) are instead indicated (i.e. preconfigured) in higher layer signaling or configured or set in advance via another method. In some embodiments, if any parameters above are not included in the light DCI type, then they are not configured for the UE. For example, a light DCI type may not support HARQ retransmission. In this case, HARQ feedback and uplink control channel related parameters are not configured. The light DCI type may instead indicate a repetition number, or the UE may be configured with a repetition number so that target data decoding reliability is reached. If a repetition number is configured by higher layer signaling or indicated in the DCI, the UE may receive the same or different RVs of a given TB consecutively N≥1 times, where N is the repetition number. Consecutive transmission occasions of a TB related to a repetition pattern may occur contiguously or non-contiguously in time.

In one example, the light DCI only indicates the HARQ process ID of the TB, with all other required parameters associated with the TB for processing the TB (e.g. demodulating and/or decoding the TB) being preconfigured via higher layer signaling. In another example, the light DCI only indicates the HARQ process ID and whether the transmission is a new transmission or a retransmission (e.g. via an NDI flag), with all other required parameters associated with the TB for processing the TB being preconfigured via higher layer signaling. In another example, the light DCI only indicates the HARQ process ID, and an NDI flag. In some embodiments, the light DCI includes the minimum required information decided upon dynamically, and needed for the UE to process (e.g. demodulate and/or decode) the downlink transmission.

In some embodiments, the light DCI carries an index that maps to different possible preconfigured parameter sets, where each index value indicates the use of a respective preconfigured parameter set. The preconfigured parameter sets may be established in advance via higher layer signaling and/or in a table which may be UE specific or group-specific. In one example, a light DCI format only comprises CRC bits (masked or unmasked). This may imply that the light DCI may only serve the purpose of activating a pre-configured parameter set. This may be useful when only one HARQ process is supported so that an explicit HARQ process ID indication is not needed. In one example, receiving this light DCI first may activate a parameter set, and receiving it again may de-activate the parameter set. Alternatively, there may not be any subsequent light DCI to deactivate the parameter set, and the parameter set is de-activated based on a timer. The timer may be triggered once an activation light DCI is received, or with respect to another pre-defined/configured reference point or sub-frame/slot/mini-slot.

In general, the light DCI may explicitly indicate any one or some of the parameters discussed herein, with the other parameters not indicated in the light DCI either being indicated in higher-layer signaling or otherwise inherent or obtainable by the UE by other means or not configured for the mode of transmission.

In some embodiments, the network decides when to switch to the light DCI type. For example, the DCI generator 228 in FIG. 6 may include a SNR detector 230 that periodically computes/monitors the SNR of the downlink channel based on feedback on channel state information from the UE. The SNR of the downlink channel may be computed based on a channel state information reference sequence (CSI-RS) transmitted periodically to the UE, or based on a demodulation reference sequence (DMRS) received along with control information and/or downlink data transmission. The computed SNR is then compared to a threshold. When the SNR is below the threshold, the wireless communication link to the UE has a low SNR, and the network switches to using a light DCI type. When the SNR is above the threshold, the communication link to the UE does not have a low SNR, and the standard DCI type or other transmission modes which do not include the light DCI type is/are used. In one example, the SNR may be estimated from (or may be based on) one or more channel quality indicator (CQI) reports from the UE and used as follows: if a CQI measurement reported by the UE is below a certain threshold (or if a moving average of the k previous CQI measurements are below the threshold), then the network switches to a light DCI type or to the transmission mode that includes the light DCI type.

An indicator may be used to indicate to the UE whether the DCI being transmitted has reduced payload content, i.e. whether the DCI is a light DCI type. In one example, a UE can be configured with one or multiple transmission modes, where each transmission mode includes one or more DCI types. At a given time, the UE operates based on one of the configured transmission modes, i.e., monitors for the DCI types supported for the active transmission mode. Higher layer (e.g. RRC) signaling may notify to the UE which transmission mode is active or to be assumed by the UE for monitoring DCI types. For example, if RRC signaling notifies the UE to operate based on transmission mode X, which includes a light DCI type, then the UE will start monitoring for the light DCI type. In another example, dynamic downlink control information (e.g. dynamic layer 1 signaling) can be used to notify the UE of a transmission mode switch. The dynamic downlink control information can be UE specific or group specific. The dynamic downlink control information can be transmitted in a PDCCH. Alternatively, a DMRS received may identify a transmission mode or DCI format. In particular, if same size DCI formats are used, instead of a flag in the DCI, different DMRS sequences can be used to distinguish between different DCI types.

In some embodiments, the light DCI does not indicate the downlink time-frequency region in the data channel at which the scheduled downlink transmission will be sent. The network instead preconfigures this parameter for the UE 116 in higher layer signaling, e.g. to use downlink time-frequency region "A" to receive the downlink transmission of the TB. Then, whenever a downlink transmission of a TB is scheduled to be sent to the UE 116 in the downlink data channel, and the light DCI type is used to schedule the TB, the network will always transmit the TB transmission on downlink time-frequency region "A" in the data channel. The time-frequency region may include or exclude the symbols where the light DCI was received. For example, the time-frequency region may be subsequent to the time-frequency resource or search space where the light DCI was received. The time-frequency region may be in another bandwidth part that is different from the bandwidth part where the DCI was received. The UE 116 then uses downlink time-frequency region "A" in the data channel to receive a granted downlink TB transmission when the light DCI type is used. If a standard DCI is used, the UE 116 will instead use the time-frequency region in the data channel granted in the standard DCI.

Figure 10:
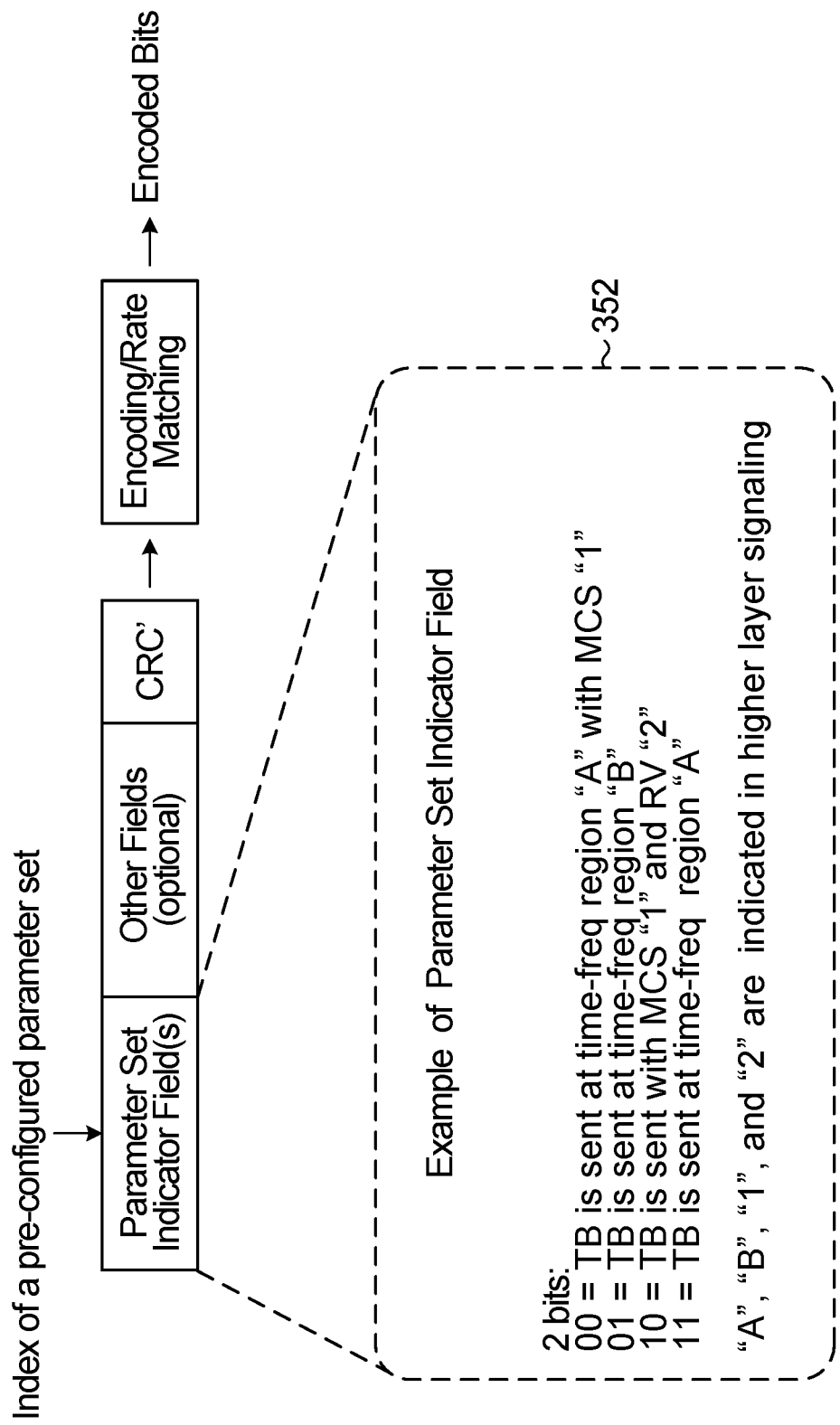
FIG. 10 illustrates another example DCI format.

In some embodiments, a light DCI type may have a format that includes at least a field which indicates an index. Each index value is associated with a respective corresponding preconfigured set of one or more parameters or time-frequency resources. For example, a UE may be configured with N pre-configured time-frequency regions (e.g., N pre-configured pairs of time and frequency resources sets) by higher layer signaling, N≥1. The DCI may have a field with $\log_2 N$ bits to identify one of the configured time-frequency regions or parameter sets. Alternatively, N time resources (frequency resources) are pre-configured and an index indicates the time (frequency) resource in the DCI, and the frequency (time) resource is dynamically indicated in the DCI. More generally, in one embodiment, the DCI may have a field among other fields which indicates an index of one of the pre-configured parameter sets, where each parameter set may comprise one or more of: MCS, RB allocation, multi-antenna information, TBS information, RV information, ACK/NACK timing information, carrier indicator, BW part indicator etc. For example, each parameter set may include one or more of parameters (A) to (P) listed above. In one example, the HARQ ID field and/or NDI field may be separate fields other than the field that indicates the index of the used resource set. In FIG. 10, an example DCI type is shown in which at least one field is used to indicate the index of one of multiple pre-configured parameter sets. There may be more than one field that comprises an indication of a corresponding preconfigured parameter set. For example, there can be one field which indicates an index corresponding to a pre-configured time and/or frequency resource set among candidate resource sets, and another field may indicate an index which corresponds to an MCS and/or RV from pre-configured candidate sets. In one example, a DCI may have one or more fields, where each field indicates an index corresponding to a parameter set, and the parameter sets indicated in the different fields may or may not have any common parameter, and each parameter set may comprise one or more parameters from the list (A) to (P) listed above. Having one or more fields, each indicating an index of a preconfigured parameter set, instead of explicitly indicating the parameters in the DCI, may decrease DCI payload size at the cost of some flexibility loss. The "other fields" may include parameters that are explicitly indicated in the DCI (e.g. HARQ process ID), and/or reserved bits, and/or other information required to be included in a DCI. The "other fields" portion of the DCI is optional. An example of pre-configured parameter sets are shown in stippled box 352. In this specific example, the parameter set indicator field includes a 2-bit index, with each bit combination of the index mapped to a corresponding preconfigured set of parameters that are preconfigured by being indicated in higher layer signaling. Index value '00' indicates that pre-configured time-frequency region "A" and MCS "1" are to be used for a TB scheduled using the DCI type. Index value '01' indicates that preconfigured time-frequency region "B" is to be used for a TB scheduled using the DCI type. Index value '10' indicates that MCS "1" and RV "2" are to be used for a TB scheduled using the DCI type. Index value '11' indicates that preconfigured time-frequency region "A" is to be used for a TB scheduled using the DCI type. Other parameters that may be needed to be indicated for the TB, e.g. the HARQ process ID if needed, would be indicated in the "other fields" section of the DCI format.

The light DCI format may be used as a switch: particular parameters associated with a transmission of a TB (e.g. parameters used to process a TB, such as demodulate and/or decode the TB, or modulate and/or encode the TB) are indicated in advance using higher layer signaling; then, if the DCI is identified to be a light DCI type by the UE 116, the UE 116 knows that the transmission uses the particular parameters; otherwise, the UE 116 follows the parameter indication in the standard DCI grant if received. In this way, the light DCI format switches on or activates the use of preconfigured parameters.

Figure 11:
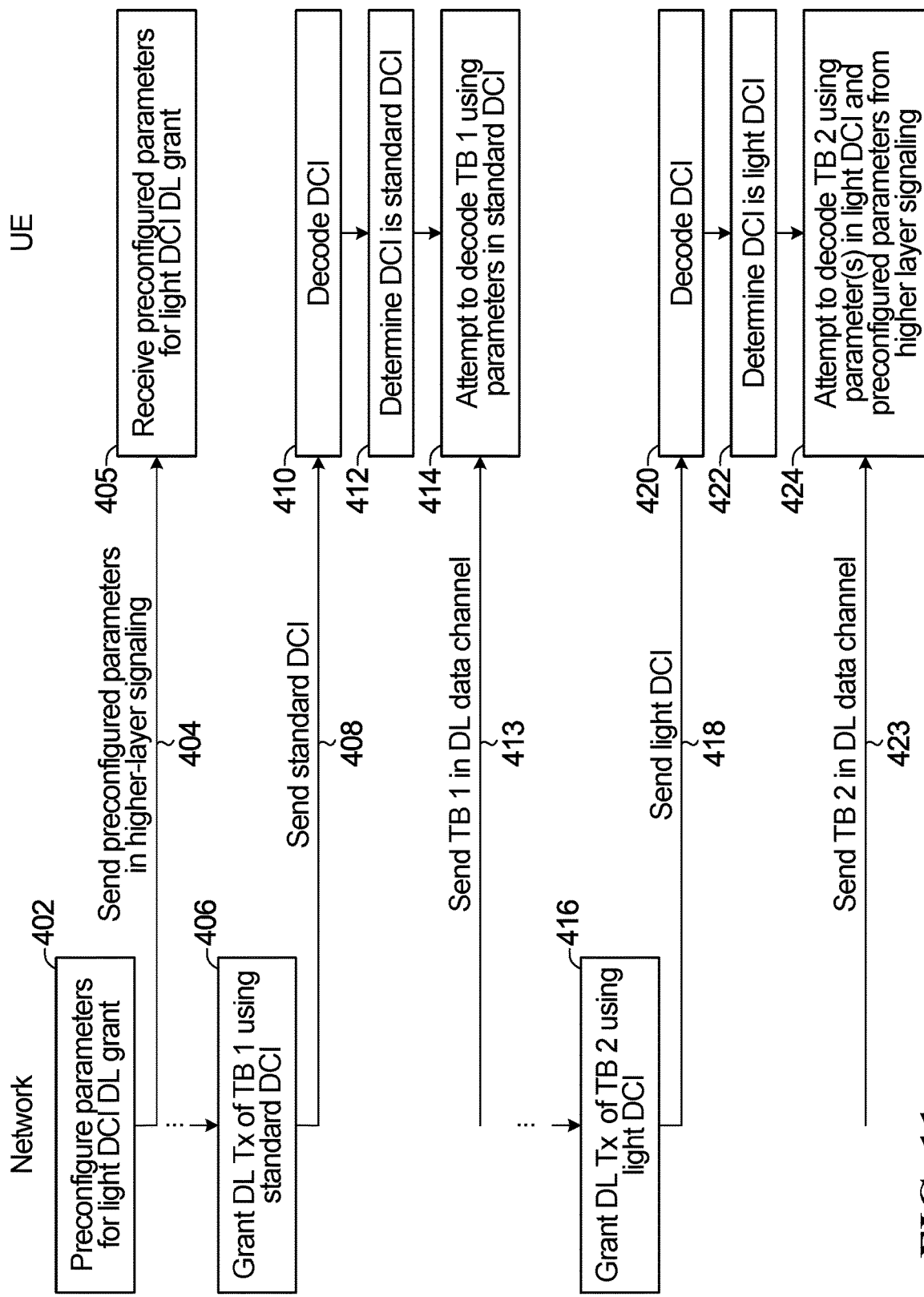
FIGS. 11 and 12 each illustrate a method performed by the network and UE, according to one embodiment.

FIG. 11 illustrates a method performed by the network and UE 116, according to one embodiment. In step 402, the higher layer signal generator 234 in server 200 generates higher layer signaling that indicates (i.e. preconfigures) at least one parameter relating to light DCI grants. For example, in this method it will be assumed that the light DCI format omits both the time-frequency region on which the granted TB is transmitted and the MCS of the TB. Therefore, the UE 116 (e.g. as part of the higher layer signal generator 234) selects an MCS "A" to be used for a light DCI format grant and a downlink time-frequency region "B" to be used for a light DCI format grant. In step 404, the network transmits an indication of MCS "A" and downlink time-frequency region "B" to UE 116 via higher layer signaling. For example, the indication of MCS "A" and time-frequency region "B" is sent in a payload of a TB and is transmitted in a downlink data channel in the form of higher layer (e.g. RRC) signaling. The TB carrying the higher layer signaling may be scheduled in the downlink data channel using DCI. The TB carrying the higher layer signaling may be generated at the server 200 and sent to TRP 108, which transmits the TB via transmitter 202. In step 405, the receiver 254 of UE 116 receives the TB. The TB is decoded in decoder 268 to obtain the higher layer signaling. The preconfigured resource (i.e. MCS "A" and time-frequency region "B") is stored in memory 272 in the UE 116.

Upon completion of steps 402 to 405, the MCS and downlink time-frequency region for a light DCI grant is preconfigured and known by both the network and the UE 116.

At some point later in time, at step 406, the network generates a scheduling grant that schedules a downlink transmission of a first TB ("TB 1") for UE 116. For example, step 406 may be triggered by the arrival of traffic at the network that is destined for UE 116. The network has determined that the UE 116 is not operating in a low SNR condition, and so the network sends a standard DCI grant to the UE 116 in step 408. The standard DCI grant schedules TB 1 in the downlink data channel.

In step 410, the UE 116 decodes the standard DCI in decoder 268, and in step 412 the UE 116 determines that the DCI is a standard DCI, e.g. by the presence of an indicator flag in the DCI. Steps 410 and 412 may be reversed.

In step 413, TB 1 is sent in the downlink data channel, and in step 414 the UE attempts to demodulate and decode TB 1. UE 116 knows the time-frequency location of TB 1 in the downlink data channel, as well as the MCS and HARQ process ID of TB 1, because this was sent in the standard DCI.

At some point later in time, UE 116 is operating in a low SNR condition, e.g. because UE 116 is at the edge of a serving cell. The network has another TB ("TB 2") to send to the UE 116. Therefore, in step 416, the network generates a scheduling grant that schedules a downlink transmission of TB 2 for UE 116. However, a light DCI format is used, which is sent to the UE 116 in step 418. In step 420, the UE 116 decodes the light DCI in decoder 222, and in step 422 the UE 116 determines that the DCI is a light DCI, e.g. by the presence of an indicator flag in the DCI or based on the size of the DCI. Steps 420 and 422 may be reversed.

In step 423, TB 2 is sent in the downlink data channel. However, TB 2 is specifically sent in time-frequency region "B" and using "MCS A", as per the preconfiguration of steps 402 to 405. In step 424, the UE attempts to demodulate and decode TB 1. The light DCI does not include an indication of the time-frequency region of the downlink data transmission or the MCS, but this was preconfigured in higher layer signaling, and so the UE 116 knows that because light DCI format is being used, the TB 2 will be sent in time-frequency region "B" using "MCS A". The other required resources, e.g. the HARQ process ID of TB 2, are taken from the grant in the light DCI.

Figure 12:
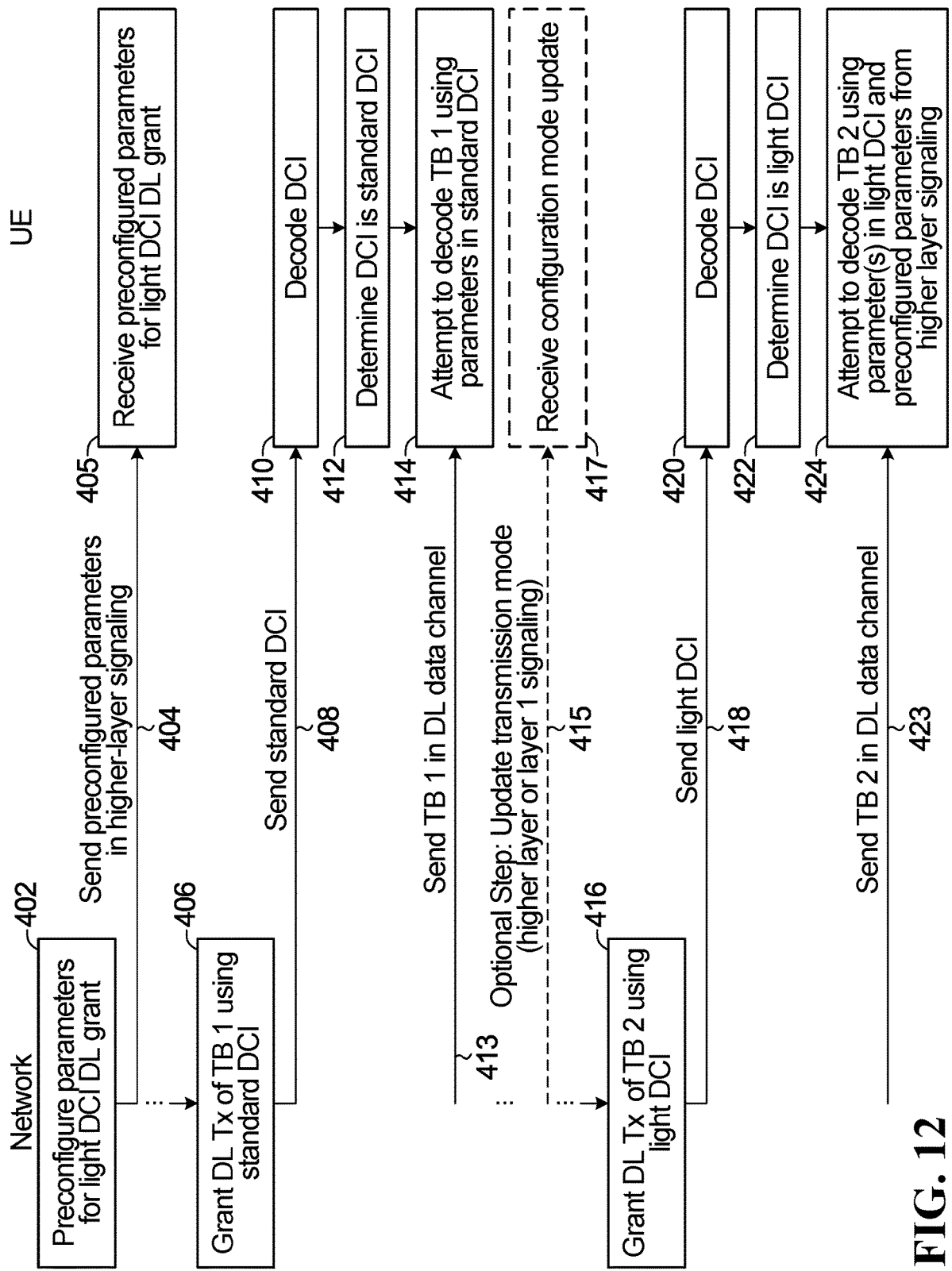

In some embodiments, the network may update the transmission mode (e.g. via higher layer signaling) before sending the light DCI type. For example, the light DCI type may not be supported in the current transmission mode, and the network may need to re-configure the UE with another transmission mode that includes the light DCI type. FIG. 12 illustrates FIG. 11 modified to have optional step 415 in which the network provides a transmission mode update before the UE can be start monitoring for light DCI format. The transmission mode update is received in step 417.

Figure 13:
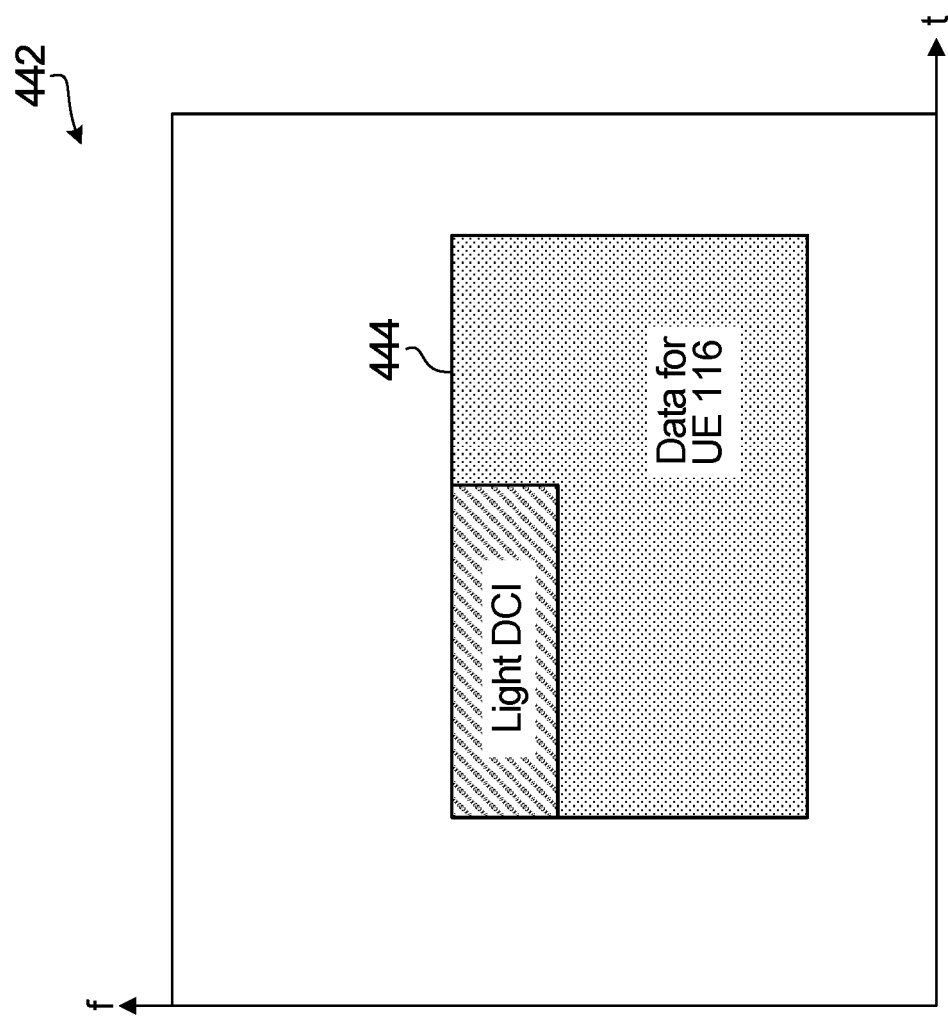
FIG. 13 illustrates a set of downlink time-frequency resources, according to another embodiment.

In some embodiments, if the time-frequency region in which a TB may be received by a UE in the downlink is preconfigured, then the light DCI may be part of the data transmission itself in the downlink data channel. For example, FIG. 13 illustrates a set of downlink time-frequency resources 442, according to one embodiment. A region 444 of the time-frequency resources 442 carries downlink data for UE 116. The location of region 444 is preconfigured in that the UE 116 is informed (e.g. via higher layer signaling) that downlink data for UE 116 may be present at region 444. In FIG. 13, downlink data is present in region 444, and the light DCI is present at the start of the downlink data. A portion of the time-frequency resources can be configured to communicate the light DCI. The area of 444 may be pre-configured including the resource at which the UE finds the light DCI. The UE 116 is preconfigured (e.g. via higher layer signaling) to first decode the light DCI to determine the dynamically indicated resource parameters, so that the UE 116 can decode the data. For example, the light DCI may indicate the MCS of the data and the HARQ process ID of the data. The search space defined by the UE ID, i.e. the control resource set (CORESET), is included in the region 444. Variations of FIG. 13 are discussed later.

Light DCI to Activate Preconfigured Parameters

The light DCI type may be used to activate one or more preconfigured parameters, where the preconfigured parameters are preconfigured via higher layer signaling and are used by the downlink transmission of a TB in the downlink data channel (e.g. in the PDSCH). One or multiple TRPs (in the same or different cells) may transmit using the activated preconfigured parameters in the data channel.

For example, the light DCI may omit indicating a time-frequency region in the downlink data channel, and instead the downlink time-frequency region is a preconfigured parameter that is set in higher layer signaling and that is activated by receipt of the light DCI.

In some embodiments, the preconfigured parameters are used only once per light DCI grant. In some embodiments, the preconfigured parameters may indicate contiguous downlink time-frequency resources. A subsequent downlink data transmission of the same HARQ process may need an additional downlink grant via another light or standard DCI. The light DCI may be sent in a separate control channel (e.g. FIG. 8) or time-frequency resource set, or the preconfigured time-frequency resources may include the control resource set (CORESET) having the light DCI (e.g. FIG. 13). The time-frequency resource set where light DCI is monitored by the UE can be in a UE specific search space or a common search space.

Figure 14:
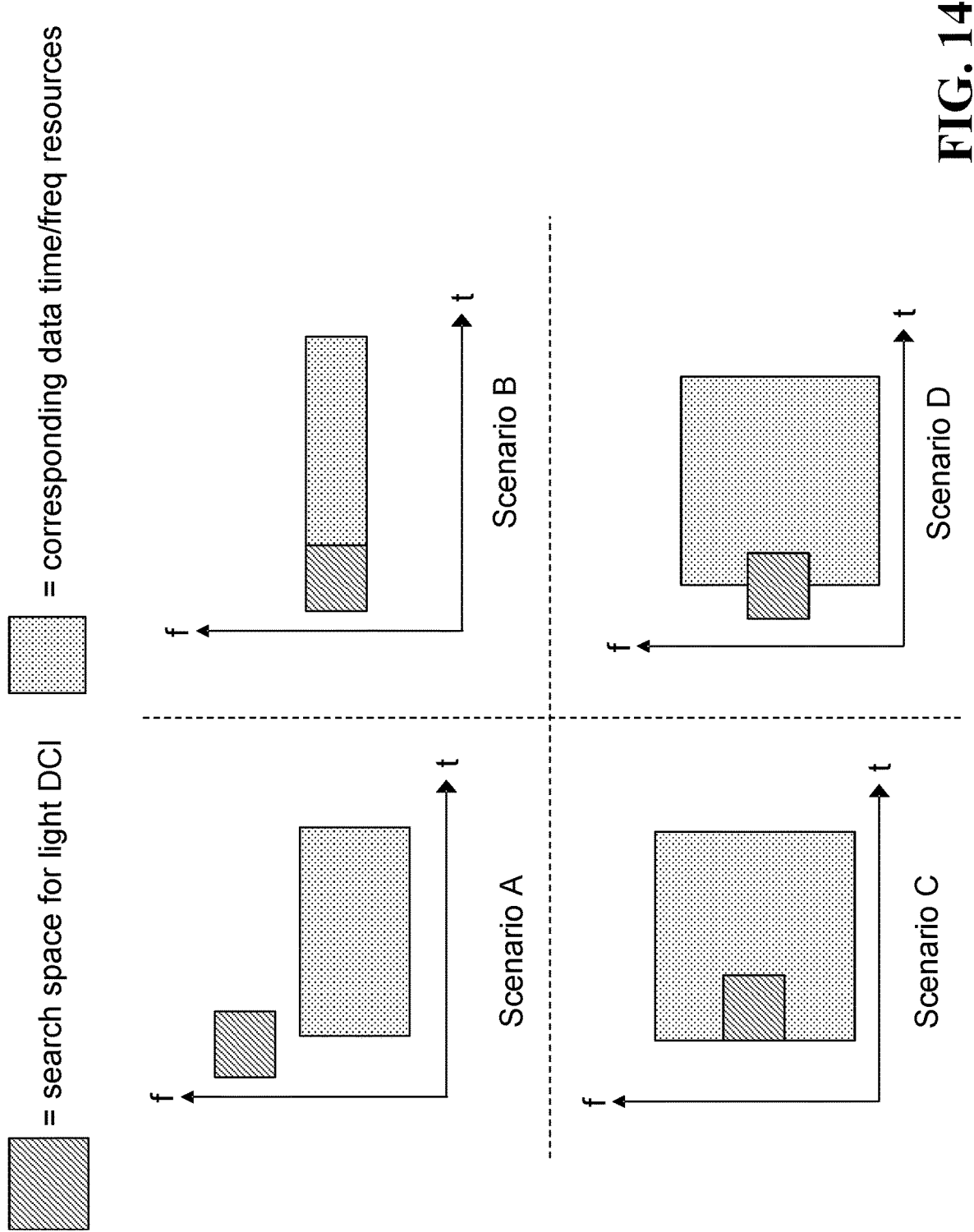
FIG. 14 illustrates some example relationships between light DCI time-frequency resources and corresponding data time-frequency resources.

FIG. 14 illustrates, more generally, some example relationships between the light DCI time-frequency resources (i.e. the downlink time-frequency resources or search spaces on which a light DCI may be sent), and the corresponding data time-frequency resources (i.e. the preconfigured downlink time-frequency region that is activated by the light DCI and on which the downlink data is sent to the UE). In scenario A, the data time-frequency region does not overlap with the light DCI time-frequency resources, and the data time-frequency region is offset in time from the light DCI time-frequency resources. For example, the data time-frequency region may start a few OFDM symbols later in time than the light DCI time-frequency resources. The offset allows for the UE to first process enough of the light DCI to recognize that a light DCI is present, so that the UE knows that the data time-frequency region is activated. In one example, the time-frequency region is used after the DCI is received (not overlapping in time) and the time-frequency region may be in a separate bandwidth part. In scenarios B and C, the light DCI time-frequency resources are adjacent to or overlap with the data time-frequency region. The information sent on the first few OFDM symbols of the hatched time-frequency resources may need to be buffered to ensure data is not lost when determining whether a light DCI is even present, i.e. when determining whether the region is even activated and needs to be decoded. For example, the higher-layer signaling may configure the UE to buffer the received data and discard it if it turns out that there is no light DCI present. Scenario D is a combination of scenarios A and C: the light DCI time-frequency resources are adjacent to or partially overlap the data time-frequency region, but the data time-frequency region is offset in time and starts later than the light DCI time-frequency resources so that the UE can first process enough of the light DCI to recognize that a light DCI is present and that the data time-frequency region is activated.

A preconfigured downlink time-frequency region may or may not be in the same bandwidth part as the CORESET having the light DCI. A "bandwith (BW) part" as used herein refers to a range of frequencies or contiguous RBs for a given numerology over which the receiver of the UE can tune into or receive a transmission. A UE may be configured to receive downlink transmissions on multiple BW parts, but may only be able to actually tune into one BW part at a time. In some embodiments, at least one BW part may be used for transmission based on a light DCI. For example, a light DCI sent in BW part "A" may activate a preconfigured time-frequency region in a downlink data channel in BW part "B". The UE may therefore need to switch to BW part B, which may take a configurable or UE-dependent re-tuning time. The UE may remain in the switched BW part B, or after the downlink data transmission is complete the UE may autonomously switch back to a previous BW part (e.g. BW part A). In some embodiments, to reduce excessive blind detection by a UE, the UE may be limited to monitoring only for a set of DCI formats depending on which BW part is active. For example, BW part A may require the UE to monitor for a light DCI format, whereas BW part B may not. Alternatively, a light DCI format may be received in any BW part, but only one of the configured BW parts is used for the data transmission based on the light DCI. The UE may need to switch to a different BW part, based on assignment or configuration. Alternatively, the light DCI format may have a field to indicate one of multiple configured resources or BW parts. For example, there may be four BW parts, each having a respective preconfigured time-frequency region. The light DCI indicates which preconfigured time-frequency region to use. The indicated or configured time-frequency resource may comprise one or multiple bandwidth parts. For example, reception of a light DCI may imply transmission by bandwidth part aggregation.

In some embodiments, the preconfigured time-frequency resources may be collocated or distributed in the downlink data channel. In some embodiments, the preconfigured time-frequency resources may be associated with a particular pattern or periodicity. For example, particular downlink time-frequency resources may be preconfigured to be used in a periodic manner for downlink data transmission to UE 116 after a light DCI is received. The periodic downlink time-frequency resources may continue to be used until another DCI (e.g. a "de-activating" DCI) is received, or for up to n≥1 occurrences in the downlink data channel or n repetitions. The particular preconfigured time-frequency resource pattern may or may not hop. The "de-activating" DCI may be a light DCI.

Figure 15:
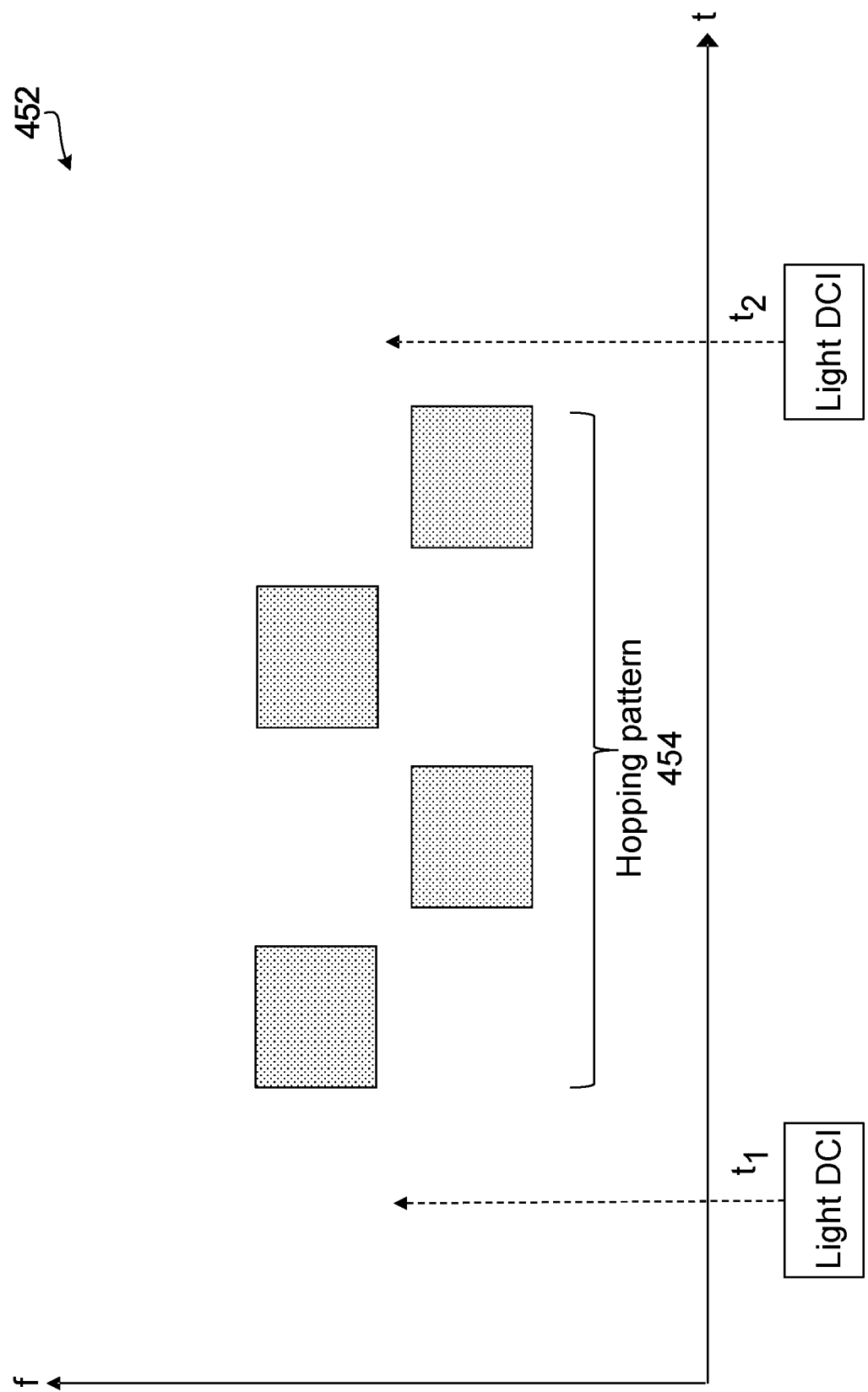
FIG. 15 illustrates a set of downlink time-frequency resources, according to another embodiment.

For example, FIG. 15 illustrates a set of downlink time-frequency resources 452, according to one embodiment. Control channels (if present in implementation) are omitted for clarity. The arrival of a DCI is indicated by stippled lines instead.

At time $t_1$, a light DCI is received. The light DCI only indicates the HARQ process ID of the granted downlink data transmission, e.g. "HARQ process ID 4". It is preconfigured in higher layer signaling that when the light DCI is received, the UE will begin to monitor a preconfigured time-frequency resource hopping pattern (shown at 454) for a downlink data transmission having a particular preconfigured MCS and RV hopping pattern. For example, downlink repetitions of a TB may be sent to the UE via the preconfigured time-frequency resource hopping pattern 454. Upon receipt of a subsequent light DCI at time $t_2$, the UE terminates monitoring the preconfigured time-frequency resource hopping pattern. At the pre-configured locations, UE receives the PDSCH or downlink data.

Figure 16:
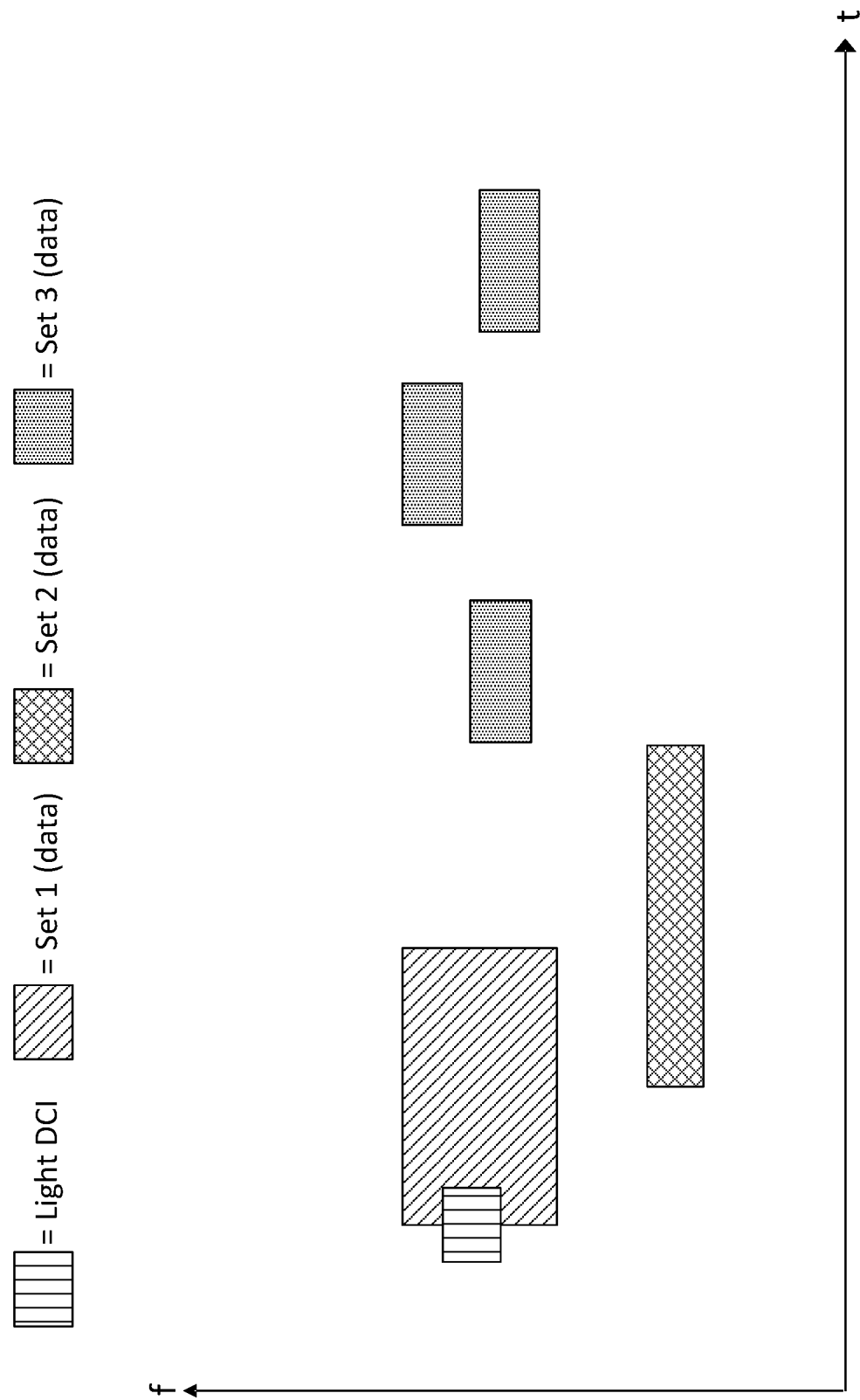
FIG. 16 illustrates an example of three different sets of preconfigured downlink time-frequency resources that could possibly be activated by a light DCI.

FIG. 16 illustrates an example of three different sets of preconfigured downlink time-frequency resources that could possibly be activated by a light DCI. In general, a light DCI may include a field that indicates which parameter set of a plurality of preconfigured parameter sets to use. For example, one, some, or all of the three sets of preconfigured downlink time-frequency resources in FIG. 16 may be activated by the light DCI.

The light DCI in FIG. 16 is adjacent to or partially overlaps with the preconfigured downlink time-frequency resources in set 1. The light DCI does not overlap and is not adjacent to the preconfigured downlink time-frequency resources in set 2. The light DCI also does not overlap and is not adjacent to the preconfigured downlink time-frequency resources in set 3. Set 3 is a time-frequency hopping pattern. For example, the first time-frequency block in set 3 may carry an initial downlink transmission of a TB, the second time-frequency block in set 3 may carry a first repetition of the TB, and the third time-frequency block in set 3 may carry a second repetition of the TB.

Light DCI During Handover

A UE at a cell edge or awaiting handover may experience poor link quality with the serving cell, and use of a light DCI may be beneficial in such applications. There may be preconfigured parameters that are activated by the light DCI and utilized to help ensure high reliability, even at poor geometry. For example, with reference to FIG. 5, a light DCI may be used to activate preconfigured time-frequency resources during times B, C, and D.

Figure 17:
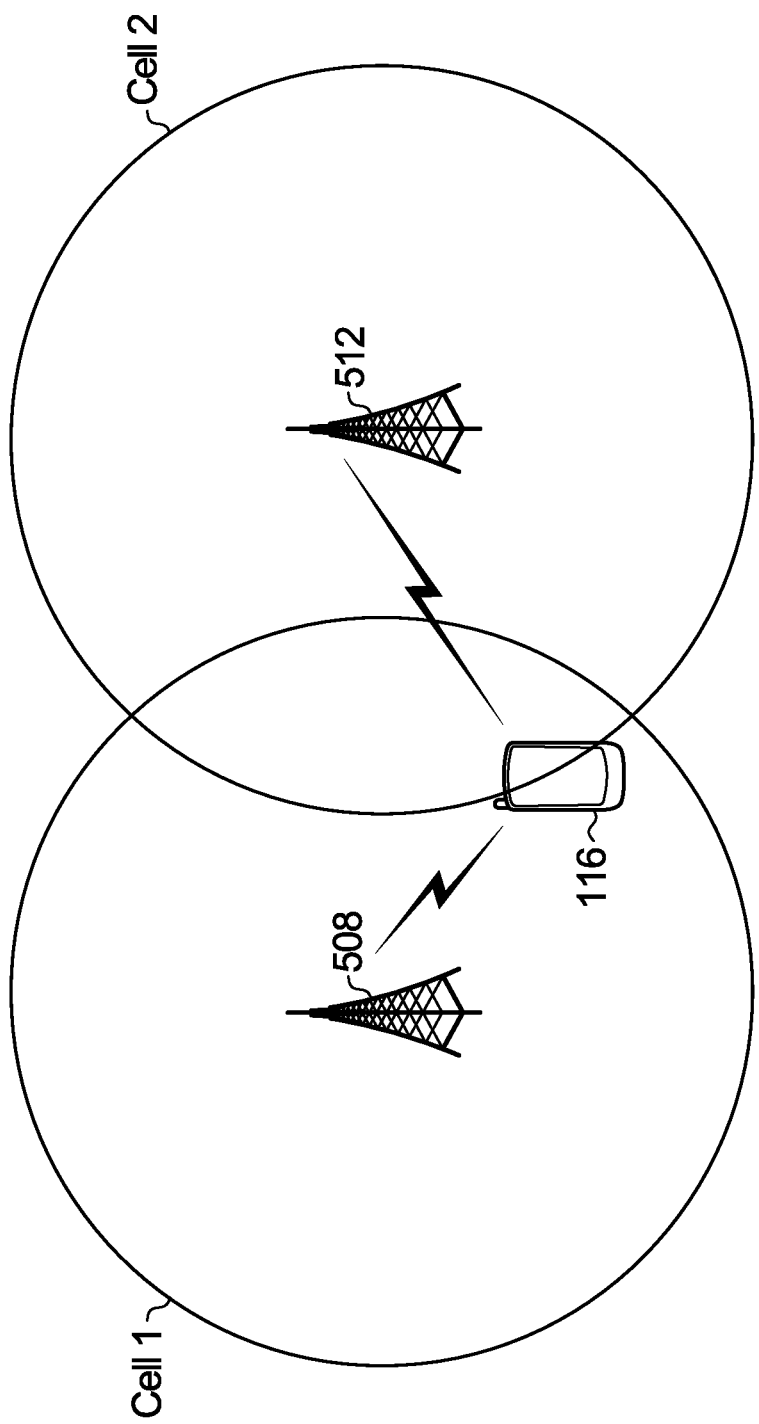
FIG. 17 illustrates an example of handover between two cells.

FIG. 17 illustrates two cells, labelled "cell 1" and "cell 2". UE 116 is handing over from TRP 508 in cell 1 to TRP 512 in cell 2 and has an active link to both TRPs. A parameter is preconfigured using higher layer signaling and is activated by use of a light DCI. For example, the parameter activated may be a downlink time-frequency region "A" on which a TB from the network will be sent when the light DCI scheduling the TB is received. The downlink time-frequency region "A" is preconfigured in higher layer signaling. TRP 508 in cell 1 may dynamically schedule downlink transmissions to UE 116, using standard DCI, whenever UE 116 has an active link with TRP 508. Similarly, TRP 512 in cell 2 may dynamically schedule downlink transmissions to UE 116, using standard DCI, whenever UE 116 has an active link with TRP 512. However, additionally, the transmission of a light DCI to UE 116 (from TRP 508 and/or TRP 512) will activate the preconfigured time-frequency region "A" to allow for additional or duplicated data to be sent to UE 116, which may increase reliability during the handover.

Figure 18:
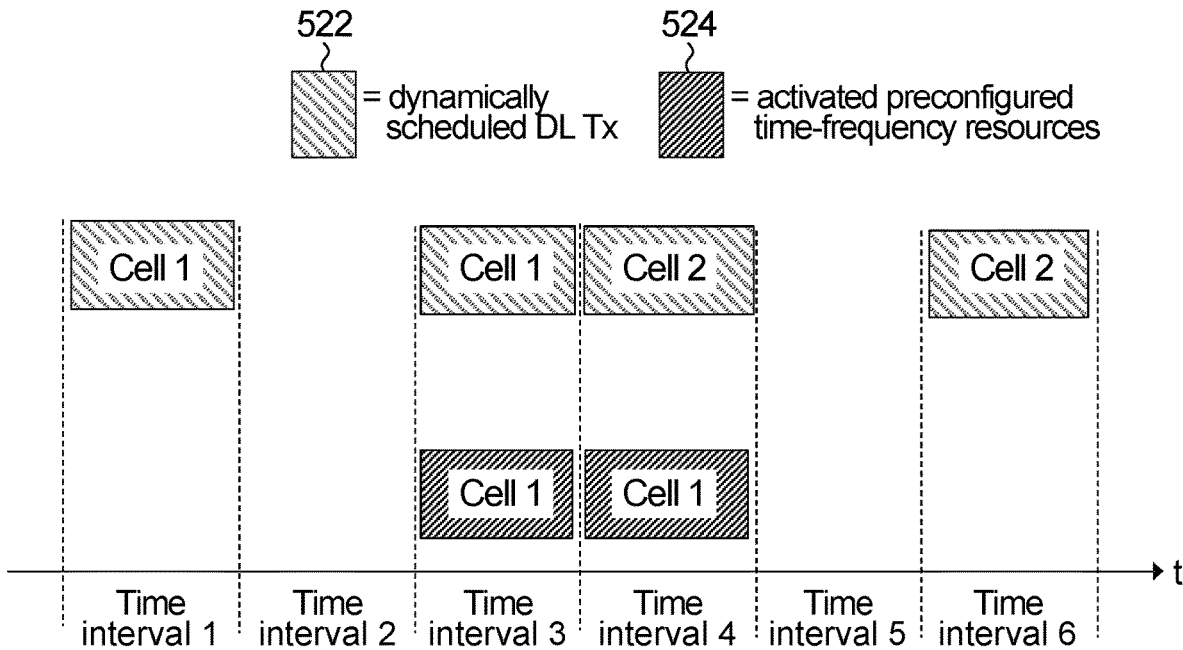
FIGS. 18 and 19 illustrate example time lines of activation of a preconfigured resource during handover.

For example, FIG. 18 illustrates one example time line of activation of a preconfigured time-frequency resource during handover. Vertical lines separate the time axis into intervals, e.g. subframes. The time intervals are labelled "1" to "6" to assist in referencing the time intervals. Hatching 522 indicates a downlink transmission from cell 1 (i.e. TRP 508) or cell 2 (i.e. TRP 512) that is dynamically scheduled by standard DCI. Hatching 524 indicates a downlink transmission on a preconfigured time-frequency resource that is activated by a light DCI from either TRP 508 or 512.

In time interval 1, a downlink data transmission from cell 1 (i.e. from TRP 508) is dynamically scheduled. In time interval 2, no downlink data transmission is scheduled. Handover overlaps with time intervals 3 and 4. During time interval 3, a downlink data transmission from cell 1 (i.e. from TRP 508) is dynamically scheduled, but a light DCI from cell 1 has also activated preconfigured downlink time-frequency resources, on which additional data from cell 1 is sent. The additional data may be a repeat of the data dynamically scheduled in time interval 3, just in case the standard DCI dynamically scheduling the data in time interval 3 is not properly decoded by UE 116 due to the low SNR conditions. Alternatively, a transmission mode can be configured for UE 116, where UE 116 only monitors for light DCI when handover is triggered. This may ensure that UE 116 may keep receiving data from the serving cell and not lose connection. UE 116 may keep connection with both the serving and target cell during and/or after handover, so that high reliability may be maintained or data may be duplicated over both links. Although the example refers to the case where light DCI activates a pre-configured time-frequency resource, the mechanism can be applicable to other examples of light DCI described above, e.g., where light DCI can indicate one or more of the parameters from the list or indicate an index of a parameter set.

During time interval 4, a downlink data transmission from cell 2 (i.e. from TRP 512) is dynamically scheduled, but the light DCI previously sent from cell 1 has still activated preconfigured downlink time-frequency resources, on which additional data from cell 1 is sent. The additional data may be a repeat of the data dynamically scheduled in time interval 4, just in case the standard DCI dynamically scheduling the data in time interval 4 is not properly decoded by UE 116 due to the low SNR conditions. In some embodiments, whether or not the additional data sent on the preconfigured time-frequency resources in time interval 4 is a repeat of the data dynamically scheduled in cell 2 in time interval 4 depends on whether cell 2 is transmitting the same or independent data in interval 4. In one example, a light DCI is received during interval 3 and activates the preconfigured time-frequency resources for N≥1 intervals, where N=2 in the illustrated example. Alternatively, the light DCI can be received for each of interval 3 and 4. The UE may be configured to receive control information from both cells during handover or if at the cell edge. The two cells may independently or jointly schedule data to the UE. The search spaces to receive control information from the two cells may be the same or different. Scheduled data during interval 4 may be independent from the data scheduled by the light DCI in the preconfigured time-frequency resources. Although not shown, it is assumed that during interval 3 and 4, the UE 116 performs an access procedure and synchronization with the target cell.

In FIG. 18, the preconfigured time-frequency resources are deactivated after time interval 4, either automatically or by the receipt of another "deactivating" light DCI. In time interval 5, no downlink data transmission is scheduled. In time interval 6, a downlink data transmission from cell 2 (i.e. from TRP 512) is dynamically scheduled.

Figure 19:
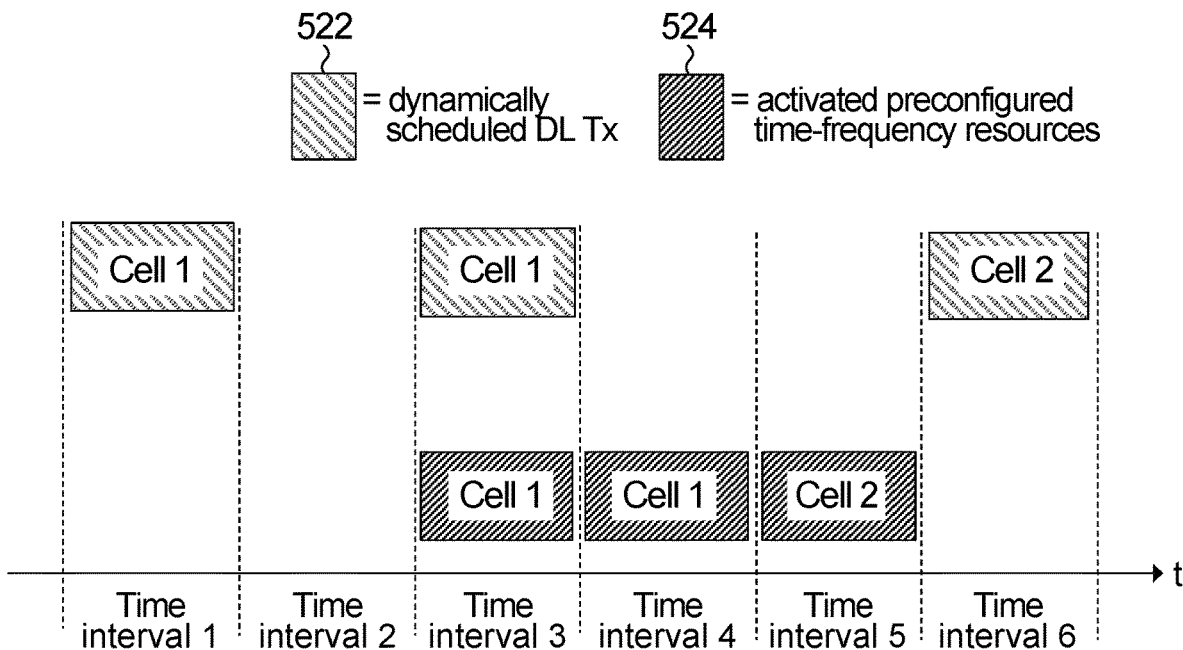

FIG. 19 is a variation of FIG. 18. In time interval 4 of FIG. 19, there is no dynamically scheduled downlink transmission, and instead a downlink transmission is sent, from cell 1, on the preconfigured time-frequency resources activated by the light DCI from cell 1. In time interval 5, there is also no dynamically scheduled downlink transmission, and instead a downlink transmission is sent from cell 2, on preconfigured time-frequency resources activated by a light DCI from cell 2. Alternatively, another light DCI may not be transmitted from cell 2, and instead cell 2 may obtain scheduling information from cell 1, or by other means, and continue transmission on preconfigured resources. The C-RNTI may be kept in cell 2 as well during/after handover procedure. This may ensure that transmission is transparent to the UE, as the UE would not be interrupted in receiving the transmission. The UE may not recognize whether the transmission is sent from cell 1 or 2, as one or more of the necessary layer1 and layer 2 parameters related to transmission may be shared or common. In this example, it is assumed that the pre-configured time-frequency resources used by the light DCI from both cells are the same. Alternatively, the pre-configured time-frequency resources for transmission from different cells can be different.

In one example, a serving cell may send a light DCI activating a pre-configured parameter set, and the UE may continue receiving a transmission according to the indicated and/or pre-configured parameters during and/or after handover. Cell 1 and cell 2 may exchange over backhaul the interface necessary layer 1 and layer 2 parameters so that cell 2 may take over transmission while the UE may still be receiving transmission from cell 1. In one example, cell 2 may transmit in same or different configured resources and may duplicate the data the UE is receiving from cell 1. The UE may have multiple configured resource sets active from one or both cells for a given interval during and/or after the handover process.

Although in the example, two cells are discussed, the mechanism can be extended when a cell group is present, and/or when a UE may be preparing handover with more than one cell.

In one example, the RNTI and access preamble can be notified to the UE (e.g., by RRC signaling) before synchronization takes place with the target cell group. The RNTI and/or access preamble can be used in one or more of the target cell group. This may allow early transmission in an asynchronous manner from TRP(s) of the target cell group. The RNTI can be the same as the serving cell before or different. The UE would have to detect asynchronous transmission from the target cell group because synchronization is not achieved yet. The TRPs of the target cell group may repeat transmission on multiple occasions, which may or may not be known to the UE, so that UE could detect the transmission. The UE may combine the transmissions from a target cell group with the synchronous transmission from cell 1 if data is duplicated.

In one example, the UE may be configured with a pool of RNTIs, and that pool may be maintained in the TRPs of the target cell group. For synchronous transmission, one or more TRPs of the target cell group may schedule transmission to the UE with a RNTI from the pool right after synchronization is achieved, i.e., UE would not have to wait to obtain RNTI from the target cell group.

In FIGS. 18 and 19, the preconfigured time-frequency resources may be activated before handover begins. The preconfigured time-frequency resources may be different from other dynamically scheduled resources (if any). When the preconfigured time-frequency resources are activated, the network may puncture or postpone any ongoing transmissions over the activated preconfigured time-frequency resources.

The UE in FIGS. 18 and 19 may still receive/monitor for other DCI types that dynamically indicate resource assignment. The transmissions received in parallel in time interval 3 may have the same or different HARQ process IDs, e.g. they may be transmissions of the same or different transport blocks. The same remark applies to time interval 4 in FIG. 18. The activated preconfigured time-frequency resources in FIGS. 18 and 19 may be used in a TRP-transparent manner for downlink transmissions to UE 116. For example, the activated preconfigured time-frequency resources may be used for transmission from different cells/TRPs (that are associated with UE 116) at different times. The quasi co-location (QCL) may be notified to the UE if the QCL of the two TRPs is different.

Also, although a light DCI is described as activating the preconfigured time-frequency resources in FIGS. 17 to 19, in other embodiments the activation signal may be provided by other UE specific DCI (not necessarily light DCI), or group DCI, or higher layer signaling such as RRC signaling or a MAC CE.

Some Example Light DCI Formats

As discussed above, a light DCI type may have a format that omits explicitly indicating one or more parameters associated with a TB scheduled by the light DCI, e.g. the light DCI may omit one or more of parameters (A) to (P) described earlier. The parameters needed for processing the TB (e.g. demodulating and/or decoding the TB or modulating and/or encoding the TB), and that are omitted from being explicitly indicated in the light DCI, are instead indicated in higher layer signaling.

In the specific examples below, the parameter indications omitted from the light DCI are indicated (i.e. preconfigured) using higher layer signaling, e.g. RRC signaling, and are activated by virtue of the use of a light DCI. In some embodiments, the higher layer signaling may provide location information of preconfigured time-frequency resources based on numerology. In some embodiments, the preconfigured parameters may be one of the BW parts configured for the UE. If the whole BW part is not needed for transmission, a time-frequency region inside a UE's active BW part may be notified using RRC signaling. In some embodiments, the higher layer signaling may configure the aggregation level for the UE. For example, for robustness, the UE may occasionally be configured with an aggregation level of 16 or 32. At some point in time (e.g., before handover or when at cell-edge) the UE receives DCI (e.g. a light DCI), which activates the preconfigured parameters.

One Example of Light DCI:

The presence and detection of the light DCI format itself serves as activation of the preconfigured parameters. Activated time-frequency resources are based on a numerology and are preconfigured. The MCS/TBS is also preconfigured. Therefore, the light DCI format does not include an indication of the time-frequency resources or the MCS/TBS. Upon receipt of the light DCI, the UE expects the assignment to start from the pre-configured time-frequency location and for a pre-configured range/duration in time-frequency. In some implementations, the time-frequency location may be configured with an offset from a reference point. The reference point may be the CORESET location of DCI or the edge of a BW part/carrier BW, or a location of a synchronization signal block (SSB). The number of resource blocks and duration (i.e. time location) based on the numerology may be pre-configured for a given MCS. The light DCI itself indicates one or more of: HARQ ID, NDI, carrier indicator, flag for differentiation from other DCI, padding if needed, UE ID/RNTI. The UE may be configured with a repetition number to be used when the light DCI is received. In one example, HARQ feedback may not be configured for a UE when the light DCI is received, and hence, HARQ feedback and/or uplink control channel related parameters are omitted from light DCI. In some implementations, start location in time-frequency is dynamically indicated and range of frequency resources (e.g., number of RBs for a given numerology) and/or duration of time resources (number of symbols/slots) may be pre-configured. There may be a pre-configured set of possible start locations, and one is dynamically indicated in the DCI.

Another Example of Light DCI:

The presence and detection of the light DCI format itself serves as activation of the preconfigured parameters. Activated time-frequency resources are preconfigured. The preconfigured time-frequency resources may be BW part or a resource within a BW part or a carrier based on a numerology. Upon receipt of the light DCI, the UE expects the assignment to start from the pre-configured time-frequency location and for a pre-configured range/duration in time-frequency. The time-frequency location of a PDSCH assignment may be configured with an offset from a reference point in time/frequency. The light DCI may indicate one or more of: HARQ ID, NDI, carrier indicator, flag for differentiation with other DCI, padding if needed, UE ID/RNTI. In some implementations, the light DCI has a configurable reduced payload ("light") field to indicate selected physical layer parameters, and in particular one or more of: TBS indication via MCS, RV, RBs and time duration assignment mapped to which TBS indicated, spreading factor (applicable if a transmission symbol is spread over a sub-carrier set). One set of parameters from multiple candidate sets may be indicated. For example, in one implementation: Index i→{MCS "a", RV "b", RB configuration "c", duration "d"}. For each index i, set {a, b, c, d} may be configured. For example, $\log_2 N$ bits may indicate N possible set of parameters, and each index indicated may refer to a pre-configured set. In some implementations, if only the number of RBs is preconfigured (e.g., in a contiguous allocation), then the starting position may be indicated dynamically in DCI or pre-configured as well. More generally, the index i may indicate a set of preconfigured parameters, where the pre-configured parameters indicated by index i are any set or subset of the parameters discussed herein (e.g. any of parameters (A) to (P) described earlier). Depending on which index is indicated, UE obtains TBS. The indices may be listed in a UE specific RRC configured table, and each index may refer to a TBS. Note that multiple indices may refer to same TBS.

Another Example of Light DCI:

The presence and detection of the light DCI format itself serves as activation of the preconfigured parameters. One preconfigured time-frequency resource from a set of pre-configured time frequency resources can be indicated, e.g. one BW part from multiple BW parts may be indicated in the light DCI. The light DCI indicates one or more of: HARQ ID, NDI, carrier indicator, flag for differentiation with other DCI, padding if needed, UE ID/RNTI. One or more configurable reduced payload ("light") fields in the light DCI are used to indicate selected physical layer parameters, and in particular may: (1) indicate a set of parameters in which: a time-frequency resource is indicated from multiple candidate resources (this may include RB assignment and/or time duration of transmission as well), a MCS is indicated from a supported or configured set of MCS values, and an RV can be indicated from a set; and/or (2) indicate a TBS obtained via MCS, a RV, and RBs and time duration assignment. For example, in one implementation: Index i→{MCS "a", RV "b", time-frequency resource "c"}. For each index i, set {a, b, c} may be configured. For example, $\log_2 N$ bits may indicate N possible preconfigured set of parameters, and each index refers to one of the preconfigured sets. In one example, RV may be omitted from the parameter set. More generally, the index i may indicate a set of preconfigured parameters, where the preconfigured parameters indicated by index i are any set or subset of the parameters discussed herein (e.g. any of the parameters (A) to (P) described earlier)

Another Example of Light DCI:

The light DCI indicates the frequency or time-frequency resources of the granted downlink data transmission. The MCS and/or RV and/or duration is preconfigured using higher layer signaling and is therefore not explicitly indicated in the light DCI.

Figure 20:
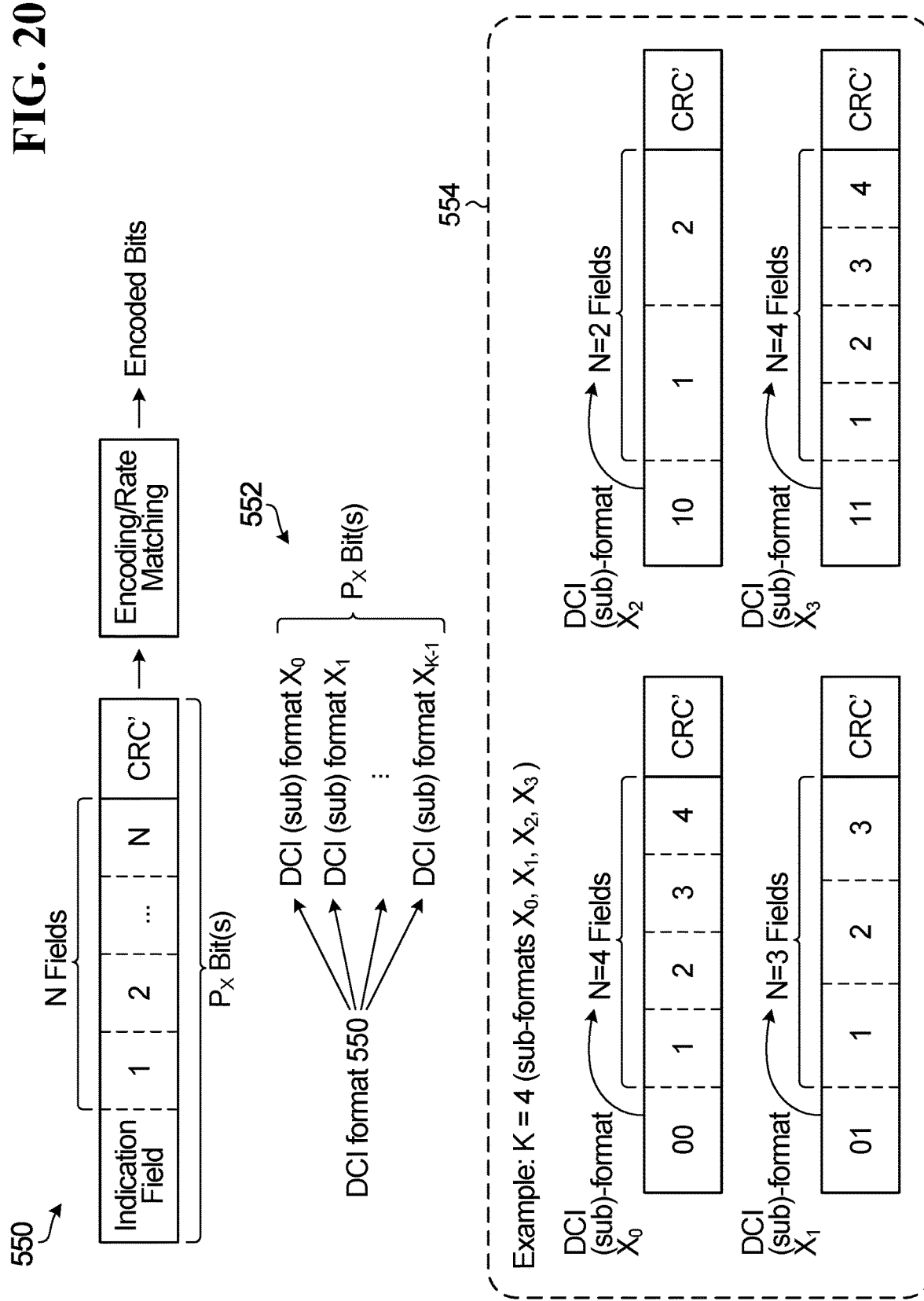
FIGS. 20 and 21 illustrate other example DCI formats.

Another Example of Light DCI:

FIG. 20 illustrates a DCI type format 550 that may be configured for a UE, where the DCI format has payload size $P_x$ bits. A UE may not be able to blindly detect too many DCI formats at a given time. In one example, the UE may be restricted to blindly monitor for at most two DCI formats at a given time. Hence, if more flexibility is needed for signaling parameter assignment targeting different scenarios, the DCI format 550 may be used, which can indicate multiple types of assignment. For example, DCI format 550 can support K sub-DCI formats, all of which have a same payload size. However, the different sub-DCI formats may have a different total number of fields N, depending on the application. An indication field can be used in the DCI format 550 to indicate which one of the K sub-DCI formats is being signaled. There may be N fields for conveying parameter assignment, where the value of N depends on which one of the K sub-DCI formats is indicated by the indication field. The K sub-DCI formats are illustrated at 552. An example for K=4 is illustrated in stippled box 554. Since K=4, there are four possible sub-DCI formats that can be indicated in the indication field. The indication field is therefore two bits, thus carrying one of four possible index values. Index value '00' indicates sub-DCI format $X_0$, which has N=4 fields, e.g. to dynamically indicate four different parameters. Index value '01' indicates sub-DCI format $X_1$, which has N=3 fields, e.g. to dynamically indicate three different parameters. Index value '10' indicates sub-DCI format $X_2$, which has N=2 fields, e.g. to dynamically indicate two different parameters. Index value '11' indicates sub-DCI format $X_3$, which has N=4 fields, e.g. to dynamically indicate four different parameters. The parameters and total number of parameters indicated can be different for each sub-DCI format, but the total payload of $P_x$ bits always remains the same. The parameter indicated in each field may be any one of the parameters discussed herein (e.g. any of the parameters (A) to (P) described earlier). In some cases, if a sub-DCI format does not require all the bits for assignment, some bits can be reserved, excluding the CRC bits.

Figure 21:
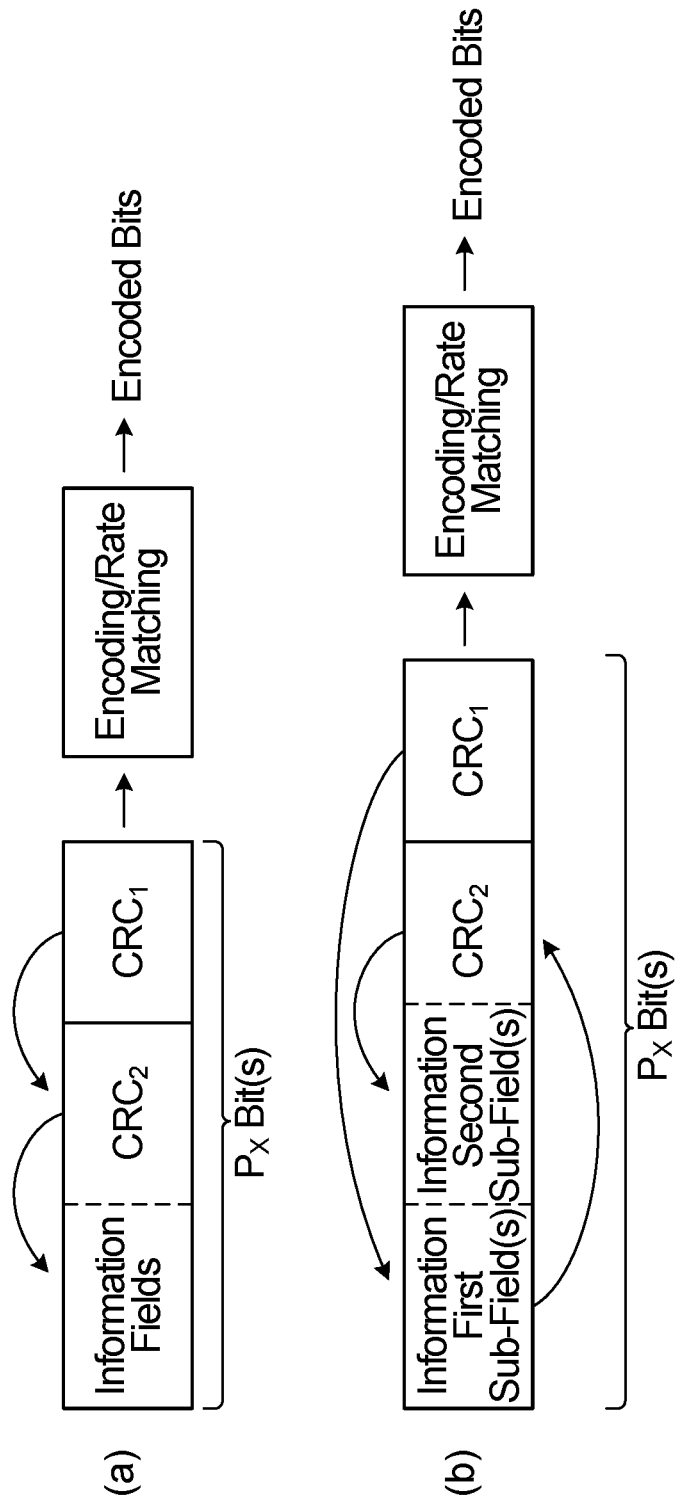

A "false-alarm" occurs when the DCI is decoded by the UE as a valid DCI, but it was not intended for the UE. In some embodiments, a false-alarm rate of the DCI may be reduced by applying more CRC protection. FIG. 21 illustrates two examples (a) and (b) for CRC detection that may reduce the occurrence of false alarms. In example (a), a UE may perform a first level of CRC detection, which may be masked by C-RNTI. The first level of CRC detection may be followed by a second level of CRC detection, which may be masked by C-RNTI or any other sequence or configurable ID. If both levels pass, the UE processes the information conveyed in the DCI fields. In example (b), after checking the first level of CRC, the UE may read a first set of information sub-fields, such as DCI format 550 in FIG. 20. Configuration of a second set of sub-fields may depend on the indication of the first set of sub-fields. The UE may then perform the second level of CRC check, which may be masked by C-RNTI of UE ID or C-RNTI related to a sub-DCI format index indicated in the first set of sub-fields. After the second level CRC detection passes, the UE then proceeds to obtain the information from second set of sub-fields. In some embodiments, the first set of sub-fields may indicate whether or not there is a second level of CRC detection. If there is not a second level of CRC detection, then $CRC_2$ is omitted.

Light DCI for Scheduling Uplink Transmissions

Although light DCI is primarily described above in the context of scheduling a downlink data transmission from the network to a UE 116, a light DCI format may also, or instead, be used for scheduling uplink transmissions from the UE 116 to the network. For example, an uplink grant sent in a downlink control channel may be a light DCI type that omits some of the uplink parameters associated with the TB scheduled by the light DCI (e.g. the light DCI format may omit the uplink time-frequency resources to use). Any omitted parameter indication that is needed to process and/or transmit the TB is instead indicated (i.e. preconfigured) in advance using higher layer signaling. When the UE 116 receives an uplink grant, for a TB, having the light DCI format, the uplink message generator 262 of the UE 116 uses the preconfigured parameters omitted from the light DCI, as well as the parameters dynamically indicated in the light DCI, in order to prepare and send (via the transmitter 252) the granted TB. Any of the parameters and embodiments discussed above in relation to transmission modes, light DCI, and scheduling a downlink transmission of a TB via DCI can also apply to uplink transmission of a TB scheduled via DCI.

Example Methods

Figure 22:
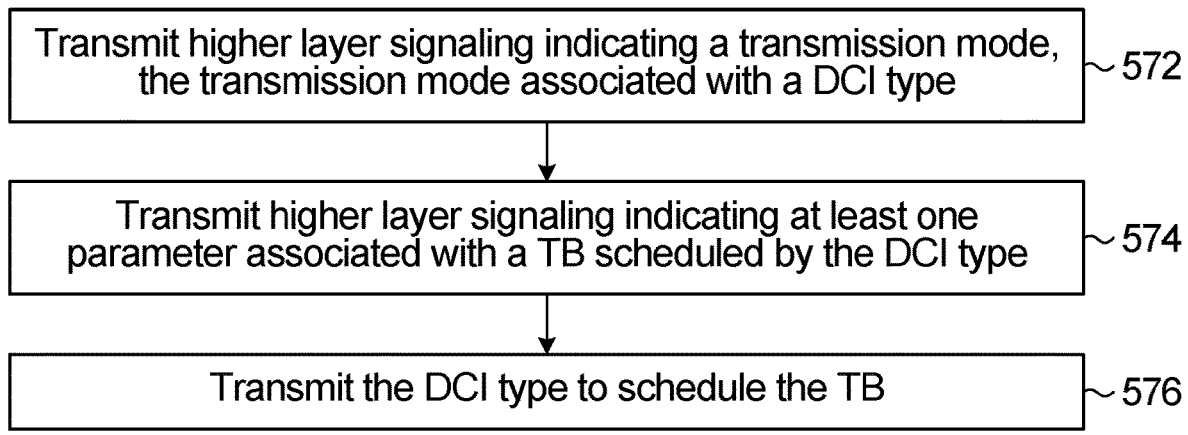
FIG. 22 illustrates a method performed by an apparatus, according to one embodiment.

FIG. 22 is a method performed by an apparatus, e.g. a network, according to one embodiment. In step 572, first higher layer signaling to a UE. The first higher layer signaling indicates a transmission mode. The transmission mode is associated with at least a DCI type, e.g. a light DCI. The DCI type has a format that does not explicitly indicate at least one parameter associated with a TB scheduled by the DCI type. The at least one parameter not explicitly indicated in the DCI type may be one or more of parameters (A) to (P) listed above. In one example, the at least one parameter not explicitly indicated in the DCI type includes at least one of: time resources on which the TB is transmitted, frequency resources on which the TB is transmitted, an MCS of the TB; an RV of the TB; and a TBS of the TB. In another example, the at least one parameter not explicitly indicated in the DCI type includes at least one of: time resources on which the TB is transmitted, frequency resources on which the TB is transmitted, an MCS of the TB; an RV of the TB; a TBS of the TB; a HARQ timing indicator, an uplink control channel resource indicator (e.g. a PUCCH resource indicator); an ACK/NACK channel resource index, a downlink assignment index, and a power control command for the uplink control channel (e.g. for the PUCCH). In another example, the at least one parameter not explicitly indicated in the DCI type includes one or any subset of the parameters mentioned in this paragraph. The parameter(s) not explicitly indicated in the DCI type is/are associated with the TB scheduled by the DCI type in that the parameter(s) are used to process the TB. For example, if the DCI type is used to schedule a downlink transmission of the TB to the UE, then the UE may require the parameters to receive the TB, e.g. to demodulate and/or decode the TB. As another example, if the DCI type is used to schedule an uplink transmission of the TB to the UE, then the UE may require the parameters to transmit the TB, e.g. to modulate and/or encode the TB.

In step 574, second higher layer signaling is transmitted to the UE. The second higher layer signaling indicates to the UE the at least one parameter associated with the TB, which will not be explicitly indicated in the DCI type dynamically scheduling the TB. As discussed above, e.g. in the specific example in FIGS. 11 and 12, the UE can then use this at least one parameter indicated in the higher layer signaling when the DCI type is used. Other parameters explicitly indicated in the DCI type may also be used by the UE.

The first and second higher layer signaling may be the same or different higher layer signaling sent at the same time (e.g. same downlink burst) or at different times (e.g. in different downlink bursts)

In step 576, the DCI type is transmitted to the UE in order to schedule the TB.

In some embodiments, the DCI type is a first DCI type, and the transmission mode is further associated with a second DCI type. For example, the first DCI type may be a light DCI, and the second DCI type may be a standard DCI. The second DCI type (e.g. the standard DCI) may have a format that explicitly indicates the at least one parameter that is not explicitly indicated in the first DCI type (e.g. that is not explicitly indicated in the light DCI). Although not necessary, prior to encoding by an error correction code, the first DCI type may have fewer bits than the second DCI type. Examples are shown in FIG. 9, e.g. the first DCI type may only include a CRC.

In some embodiments, the transmission mode is a first transmission mode, the DCI type is a first DCI type (e.g. a light DCI), and the format of the first DCI type further does not explicitly indicate at least one second parameter. The at least one second parameter may include one, some, or all of the parameters mentioned herein, e.g. one, some, or all of parameters (A) to (P) in the list above. In one example, the at least one second parameter includes at least one of: a HARQ timing indicator, an uplink control channel resource indicator (e.g. a PUCCH resource indicator), an ACK/NACK channel resource index, a downlink assignment index, and a power control command for an uplink control channel (e.g. a PUCCH). Optionally, in some embodiments, the at least one second parameter is explicitly indicated in a format of a second DCI type associated with a second transmission mode different from the first transmission mode.

In some embodiments, the DCI type comprises a field for indicating an index. The index is associated with a corresponding preconfigured set of one or more parameters that includes the at least one parameter. The corresponding preconfigured set of one or more parameters is preconfigured using higher layer signaling, e.g. in the second higher layer signaling. Examples are described earlier, e.g. in relation to FIG. 10. The second higher layer signaling may include a table associating the index with a value of each one of the corresponding preconfigured set of one or more parameters. As an example, a table conveying the mapping between index values and parameter values shown in box 352 of FIG. 10 may be sent to the UE in higher layer signaling, e.g. in the second higher layer signaling.

Figure 23:
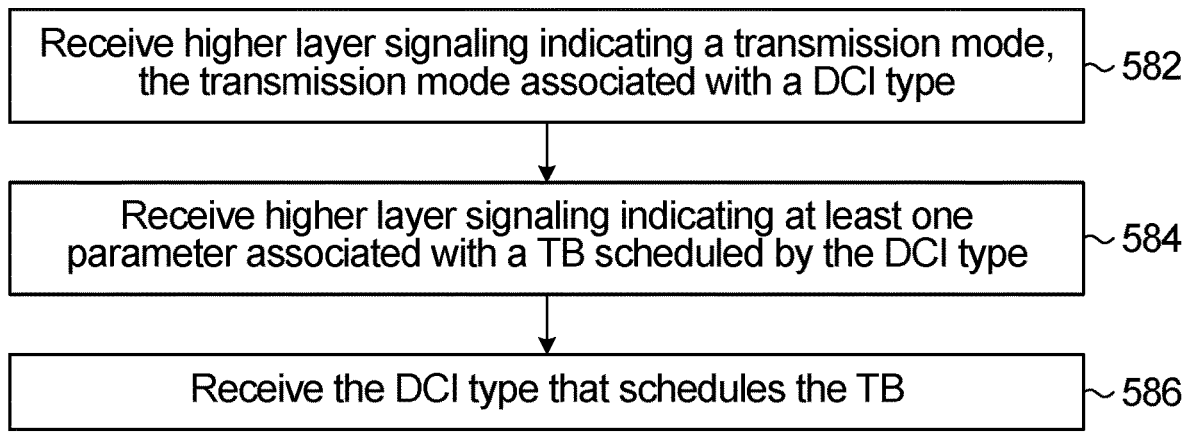
FIG. 23 illustrates a method performed by a UE, according to one embodiment.

FIG. 23 is a method performed by a UE, according to one embodiment. In step 582, first higher layer signaling is received at the UE. The first higher layer signaling indicates a transmission mode. The transmission mode is associated with at least a DCI type, e.g. a light DCI. The DCI type has a format that does not explicitly indicate at least one parameter associated with a TB scheduled by the DCI type. The at least one parameter not explicitly indicated in the DCI type may be one or more of parameters (A) to (P) listed above. In one example, the at least one parameter not explicitly indicated in the DCI type includes at least one of: time resources on which the TB is transmitted, frequency resources on which the TB is transmitted, an MCS of the TB; an RV of the TB; and a TBS of the TB. In another example, the at least one parameter not explicitly indicated in the DCI type includes at least one of: time resources on which the TB is transmitted, frequency resources on which the TB is transmitted, an MCS of the TB; an RV of the TB; a TBS of the TB; a HARQ timing indicator, an uplink control channel resource indicator (e.g. a PUCCH resource indicator); an ACK/NACK channel resource index, a downlink assignment index, and a power control command for the uplink control channel (e.g. for the PUCCH). In another example, the at least one parameter not explicitly indicated in the DCI type includes one or any subset of the parameters mentioned in this paragraph. The parameter(s) not explicitly indicated in the DCI type is/are associated with the TB scheduled by the DCI type in that the parameter(s) are used to process the TB. For example, if the DCI type is used to schedule a downlink transmission of the TB to the UE, then the UE may require the parameters to receive the TB, e.g. to demodulate and/or decode the TB. As another example, if the DCI type is used to schedule an uplink transmission of the TB to the UE, then the UE may require the parameters to transmit the TB, e.g. to modulate and/or encode the TB.

In step 584, second higher layer signaling is received at the UE. The second higher layer signaling indicates to the UE the at least one parameter associated with the TB, which will not be explicitly indicated in the DCI type dynamically scheduling the TB. As discussed above, e.g. in the specific example in FIGS. 11 and 12, the UE can then use this at least one parameter indicated in the higher layer signaling when the DCI type is used. Other parameters explicitly indicated in the DCI type may also be used by the UE.

The first and second higher layer signaling may be the same or different higher layer signaling sent at the same time (e.g. same downlink burst) or at different times (e.g. in different downlink bursts)

In step 586, the DCI type is received at the UE to schedule the TB.

In some embodiments, the DCI type is a first DCI type, and the transmission mode is further associated with a second DCI type. For example, the first DCI type may be a light DCI, and the second DCI type may be a standard DCI. The second DCI type (e.g. the standard DCI) may have a format that explicitly indicates the at least one parameter that is not explicitly indicated in the first DCI type (e.g. that is not explicitly indicated in the light DCI). Although not necessary, prior to encoding by an error correction code, the first DCI type may have fewer bits than the second DCI type. Examples are shown in FIG. 9, e.g. the first DCI type may only include a CRC.

In some embodiments, the transmission mode is a first transmission mode, the DCI type is a first DCI type (e.g. a light DCI), and the format of the first DCI type further does not explicitly indicate at least one second parameter. The at least one second parameter may include one, some, or all of the parameters mentioned herein, e.g. one, some, or all of parameters (A) to (P) in the list above. In one example, the at least one second parameter includes at least one of: a HARQ timing indicator, an uplink control channel resource indicator (e.g. a PUCCH resource indicator), an ACK/NACK channel resource index, a downlink assignment index, and a power control command for an uplink control channel (e.g. a PUCCH). Optionally, in some embodiments, the at least one second parameter is explicitly indicated in a format of a second DCI type associated with a second transmission mode different from the first transmission mode.

In some embodiments, the DCI type comprises a field for indicating an index. The index is associated with a corresponding preconfigured set of one or more parameters that includes the at least one parameter. The corresponding preconfigured set of one or more parameters is preconfigured using higher layer signaling, e.g. in the second higher layer signaling. Examples are described earlier, e.g. in relation to FIG. 10. The second higher layer signaling may include a table associating the index with a value of each one of the corresponding preconfigured set of one or more parameters. As an example, a table conveying the mapping between index values and parameter values shown in box 352 of FIG. 10 may be sent to the UE in higher layer signaling, e.g. in the second higher layer signaling.

Some additional specific examples will now be provided.

Example 1

A method performed by an apparatus, e.g. a network. First higher layer signaling is transmitted to a UE. The first higher layer signaling indicates a transmission mode. The transmission mode is associated with at least a first DCI type and a second DCI type. The first DCI type has a format that explicitly indicates at least one parameter for a TB scheduled by the first DCI type. The second DCI type has a format that does not explicitly indicate the at least one parameter for a TB scheduled by the second DCI type. The first DCI type may be a standard DCI, and the second DCI type may be a light DCI. The light DCI may have any one of the formats described herein. Second higher layer signaling is also transmitted to the UE. The second higher layer signaling indicates to the UE the at least one parameter for the TB scheduled by the second DCI type. The second DCI type is transmitted to the UE to schedule the TB by the second DCI type.

Example 2

The method of example 1, wherein prior to encoding by an error correction code, the second DCI type may have fewer bits than the first DCI type.

Example 3

The method of example 1 or example 2, wherein the at least one parameter comprises at least one of: a time-frequency region on which the TB is transmitted; a MCS of the TB; a RV of the TB; a TBS of the TB; a HARQ process ID of the TB; an indication of whether the transmission is an initial transmission of the TB or a retransmission of the TB; a carrier indication.

Example 4

The method of any one of examples 1 to 3, wherein the TB scheduled by the second DCI type is a downlink data transmission, and the method further comprises transmitting the TB using the at least one parameter indicated in the second higher layer signaling.

Example 5

The method of any one of examples 1 to 3, wherein the TB scheduled by the second DCI type is an uplink data transmission, and the method further comprises receiving the TB using the at least one parameter indicated in the second higher layer signaling.

Example 6

The method of any one of examples 1 to 5, wherein the at least one parameter comprises at least a time-frequency region on which the TB is transmitted.

Example 7

The method of any one of examples 1 to 6, wherein the second DCI type includes the HARQ process ID of the TB.

Example 8

The method of any one of examples 1 to 5, wherein all parameters for the TB scheduled by the second DCI type are transmitted in the second higher layer signaling.

Example 9

The method of example 8, wherein prior to error correction coding, the second DCI type only includes a CRC (e.g. the last example in FIG. 9).

Example 10

The method of any one of examples 1 to 9, wherein the second DCI type is transmitted to the UE when a wireless communication link to the UE has a SNR ratio below a particular threshold.

Example 11

The method of any one of examples 1 to 5, wherein the TB scheduled by the first DCI type is a first TB, the TB scheduled by the second DCI type is a second TB, and the method comprises: transmitting the first DCI type to schedule the first TB, the first DCI type indicating a first time-frequency region used to transmit the first TB; transmitting, in the second higher layer signaling, an indication of a second time-frequency region used to transmit the second TB; wherein the second time-frequency region is different from the first time-frequency region, and wherein the indication of the second time-frequency region is not present in the second DCI type.

Example 12

The method of any one of examples 1 to 11, but from the UE side. For example, first higher layer signaling is received at the UE. The first higher layer signaling indicates a transmission mode. The transmission mode is associated with at least a first DCI type and a second DCI type. The first DCI type has a format that explicitly indicates at least one parameter for a TB scheduled by the first DCI type. The second DCI type has a format that does not explicitly indicate the at least one parameter for a TB scheduled by the second DCI type. For example, the first DCI type may be a standard DCI, and the second DCI type may be a light DCI. The light DCI may have any one of the formats described herein. Second higher layer signaling is also received at the UE. The second higher layer signaling indicates to the UE the at least one parameter for the TB scheduled by the second DCI type. The second DCI type is received by the UE to schedule the TB by the second DCI type.

Example 13

A method comprising: transmitting first higher layer signaling to a UE, the first higher layer signaling indicating a transmission mode, wherein the transmission mode is associated with at least a DCI type; the DCI type having a format that does not explicitly indicate at least one parameter associated with a transport block (TB) scheduled by the DCI type, wherein the at least one parameter comprises at least one of: time resources on which the TB is transmitted, frequency resources on which the TB is transmitted, a modulation and coding scheme (MCS) of the TB; a redundancy version (RV) of the TB; and a transport block size (TBS) of the TB; transmitting second higher layer signaling to the UE, the second higher layer signaling indicating to the UE the at least one parameter associated with the TB; and transmitting the DCI type to the UE to schedule the TB.

Example 14

The method of example 13, wherein the at least one parameter associated with the TB is for demodulating and/or decoding the TB.

Example 15

The method of example 13 or 14, wherein the DCI type is a first DCI type (e.g. a. light DCI), and the transmission mode is further associated with a second DCI type (e.g. a standard DCI), the second DCI type having a format that explicitly indicates the at least one parameter. Although not necessary, prior to encoding by an error correction code, the first DCI type may have fewer bits than the second DCI type.

Example 16

The method of any one of examples 13 to 15, wherein the TB scheduled by the DCI type is a downlink data transmission, and the method further comprises transmitting the TB using the at least one parameter indicated in the second higher layer signaling.

Example 17

The method of any one of examples 13 to 15, wherein the TB scheduled by the DCI type is an uplink data transmission, and the method further comprises receiving the TB using the at least one parameter indicated in the second higher layer signaling.

Example 18

The method of any one of examples 13 to 17, wherein the transmission mode is a first transmission mode, the DCI type is a first DCI type, and wherein the format of the first DCI type further does not explicitly indicate at least one second parameter, the at least one second parameter comprising at least one of: a HARQ timing indicator, a physical uplink control channel (PUCCH) resource indicator, an acknowledgement/negative acknowledgement (ACK/NACK) channel resource index, a downlink assignment index, and a power control command for PUCCH; and wherein the at least one second parameter is explicitly indicated in a format of a second DCI type associated with a second transmission mode different from the first transmission mode.

Example 19

The method of any one of examples 13 to 18, wherein the DCI type comprises a field for indicating an index, the index associated with a corresponding preconfigured set of one or more parameters that includes the at least one parameter, and wherein the corresponding preconfigured set of one or more parameters is preconfigured using higher layer signaling.

Example 20

The method of example 19, wherein the second higher layer signaling includes a table associating the index with a value of each one of the corresponding preconfigured set of one or more parameters.

Example 21

A method comprising: receiving first higher layer signaling at a UE, the first higher layer signaling indicating a transmission mode, wherein the transmission mode is associated with at least a DCI type; the DCI type having a format that does not explicitly indicate at least one parameter associated with a transport block (TB) scheduled by the DCI type, wherein the at least one parameter comprises at least one of: time resources on which the TB is transmitted, frequency resources on which the TB is transmitted, a modulation and coding scheme (MCS) of the TB; a redundancy version (RV) of the TB; and a transport block size (TBS) of the TB; receiving second higher layer signaling at the UE, the second higher layer signaling indicating to the UE the at least one parameter associated with the TB; and receiving the DCI type at the UE.

Example 22

The method of example 21, wherein the DCI type is a first DCI type, and the transmission mode is further associated with a second DCI type, the second DCI type having a format that explicitly indicates the at least one parameter. Although not necessary, prior to encoding by an error correction code, the first DCI type may have fewer bits than the second DCI type.

Example 23

The method of example 21 or 22, wherein the TB scheduled by the DCI type is a downlink data transmission, and the method further comprises receiving the TB, and demodulating and decoding the TB using the at least one parameter indicated in the second higher layer signaling.

Example 24

The method of example 21 or 22, wherein the TB scheduled by the DCI type is an uplink data transmission, and the method further comprises transmitting the TB using the at least one parameter indicated in the second higher layer signaling.

Example 25

The method of any one of examples 21 to 24, wherein the transmission mode is a first transmission mode, the DCI type is a first DCI type, and wherein the format of the first DCI type further does not explicitly indicate at least one second parameter, the at least one second parameter comprising at least one of: a HARQ timing indicator, a physical uplink control channel (PUCCH) resource indicator, an acknowledgement/negative acknowledgement (ACK/NACK) channel resource index, a downlink assignment index, and a power control command for PUCCH; and wherein the at least one second parameter is explicitly indicated in a format of a second DCI type associated with a second transmission mode different from the first transmission mode.

Example 26

The method of any one of examples 21 to 25, wherein the DCI type comprises a field for indicating an index, the index associated with a corresponding preconfigured set of one or more parameters that includes the at least one parameter, and wherein the corresponding preconfigured set of one or more parameters is preconfigured using higher layer signaling.

Example 27

The method of example 26, wherein the second higher layer signaling includes a table associating the index with a value of each one of the corresponding preconfigured set of one or more parameters.

Example 28

An apparatus comprising: a higher layer signaling generator to generate first higher layer signaling for a UE, the first higher layer signaling indicating a transmission mode, wherein the transmission mode is associated with at least a downlink control information (DCI) type; the DCI type having a format that does not explicitly indicate at least one parameter associated with a transport block (TB) scheduled by the DCI type, wherein the at least one parameter comprises at least one of: time resources on which the TB is transmitted, frequency resources on which the TB is transmitted, a modulation and coding scheme (MCS) of the TB; a redundancy version (RV) of the TB; and a transport block size (TBS) of the TB; a transmitter to transmit the first higher layer signaling to the UE; the higher layer signaling generator to further generate second higher layer signaling for the UE, the second higher layer signaling indicating to the UE the at least one parameter associated with the TB; the transmitter to also transmit the second higher layer signaling to the UE; a DCI generator to generate the DCI type to schedule the TB; the transmitter to also transmit the DCI type to the UE.

Example 29

The apparatus of example 28, wherein the at least one parameter associated with the TB is for demodulating and/or decoding the TB.

Example 30

The apparatus of example 28 or 29, wherein the DCI type is a first DCI type, and the transmission mode is further associated with a second DCI type, the second DCI type having a format that explicitly indicates the at least one parameter. Although not necessary, prior to encoding by an error correction code, the first DCI type may have fewer bits than the second DCI type.

Example 31

The apparatus of any one of examples 28 to 30, wherein the TB scheduled by the DCI type is a downlink data transmission, and the transmitter is further to transmit the TB using the at least one parameter indicated in the second higher layer signaling.

Example 32

The apparatus of any one of examples 28 to 30, wherein the TB scheduled by the DCI type is an uplink data transmission, and the apparatus further comprises a receiver to receive the TB using the at least one parameter indicated in the second higher layer signaling.

Example 33

The apparatus of any one of examples 28 to 32, wherein the transmission mode is a first transmission mode, the DCI type is a first DCI type, and wherein the format of the first DCI type further does not explicitly indicate at least one second parameter, the at least one second parameter comprising at least one of: a HARQ timing indicator, a physical uplink control channel (PUCCH) resource indicator, an acknowledgement/negative acknowledgement (ACK/NACK) channel resource index, a downlink assignment index, and a power control command for PUCCH; and wherein the at least one second parameter is explicitly indicated in a format of a second DCI type associated with a second transmission mode different from the first transmission mode.

Example 34

The apparatus of any one of examples 28 to 33, wherein the DCI type comprises a field for indicating an index, the index associated with a corresponding preconfigured set of one or more parameters that includes the at least one parameter, and wherein the corresponding preconfigured set of one or more parameters is preconfigured using higher layer signaling.

Example 35

The apparatus of example 34, wherein the second higher layer signaling includes a table associating the index with a value of each one of the corresponding preconfigured set of one or more parameters.

Example 36

A UE comprising: a receiver to: receive first higher layer signaling at a user equipment (UE), the first higher layer signaling indicating a transmission mode, wherein the transmission mode is associated with at least a DCI type; the DCI type having a format that does not explicitly indicate at least one parameter associated with a transport block (TB) scheduled by the DCI type, wherein the at least one parameter comprises at least one of: time resources on which the TB is transmitted, frequency resources on which the TB is transmitted, a modulation and coding scheme (MCS) of the TB; a redundancy version (RV) of the TB; and a transport block size (TBS) of the TB; receive second higher layer signaling at the UE, the second higher layer signaling indicating to the UE the at least one parameter associated with the TB; and receive the DCI type at the UE; a downlink message processor to decode the DCI type.

Example 37

The UE of example 36, wherein the DCI type is a first DCI type, and the transmission mode is further associated with a second DCI type, the second DCI type having a format that explicitly indicates the at least one parameter. Although not necessary, prior to encoding by an error correction code, the first DCI type may have fewer bits than the second DCI type Example 38

The UE of example 36 or 37, wherein the TB scheduled by the DCI type is a downlink data transmission, and wherein the receiver is configured to receive the TB, and the downlink message processor is configured to demodulate and decode the TB using the at least one parameter indicated in the second higher layer signaling.

Example 39

The UE of example 36 or 37, wherein the TB scheduled by the DCI type is an uplink data transmission, and the UE further comprises a transmitter to transmit the TB using the at least one parameter indicated in the second higher layer signaling.

Example 40

The UE of any one of examples 36 to 38, wherein the transmission mode is a first transmission mode, the DCI type is a first DCI type, and wherein the format of the first DCI type further does not explicitly indicate at least one second parameter, the at least one second parameter comprising at least one of: a HARQ timing indicator, a physical uplink control channel (PUCCH) resource indicator, an acknowledgement/negative acknowledgement (ACK/NACK) channel resource index, a downlink assignment index, and a power control command for PUCCH; and wherein the at least one second parameter is explicitly indicated in a format of a second DCI type associated with a second transmission mode different from the first transmission mode.

Example 41

The UE of any one of examples 36 to 40, wherein the DCI type comprises a field for indicating an index, the index associated with a corresponding preconfigured set of one or more parameters that includes the at least one parameter, and wherein the corresponding preconfigured set of one or more parameters is preconfigured using higher layer signaling.

Example 42

The UE of example 41, wherein the second higher layer signaling includes a table associating the index with a value of each one of the corresponding preconfigured set of one or more parameters.

Example 43

An apparatus comprising: a memory having processor-executable instructions stored thereon; a processor configured to execute the processor-executable instructions in order to cause the apparatus to perform operations comprising: transmitting first higher layer signaling to a UE, the first higher layer signaling indicating a transmission mode, wherein the transmission mode is associated with at least a DCI type; the DCI type having a format that does not explicitly indicate at least one parameter associated with a transport block (TB) scheduled by the DCI type, wherein the at least one parameter comprises at least one of: time resources on which the TB is transmitted, frequency resources on which the TB is transmitted, a modulation and coding scheme (MCS) of the TB; a redundancy version (RV) of the TB; and a transport block size (TBS) of the TB; transmitting second higher layer signaling to the UE, the second higher layer signaling indicating to the UE the at least one parameter associated with the TB; and transmitting the DCI type to the UE to schedule the TB.

Example 44

The apparatus of example 43, wherein the at least one parameter associated with the TB is for demodulating and/or decoding the TB.

Example 45

The apparatus of example 43 or 44, wherein the DCI type is a first DCI type, and the transmission mode is further associated with a second DCI type, the second DCI type having a format that explicitly indicates the at least one parameter.

Example 46

The apparatus of any one of examples 43 to 45, wherein the TB scheduled by the DCI type is a downlink data transmission, and the operations further comprise transmitting the TB using the at least one parameter indicated in the second higher layer signaling.

Example 47

The apparatus of any one of examples 43 to 45, wherein the TB scheduled by the DCI type is an uplink data transmission, and the operations further comprise receiving the TB using the at least one parameter indicated in the second higher layer signaling.

Example 48

The apparatus of any one of examples 43 to 47, wherein the transmission mode is a first transmission mode, the DCI type is a first DCI type, and wherein the format of the first DCI type further does not explicitly indicate at least one second parameter, the at least one second parameter comprising at least one of: a HARQ timing indicator, a physical uplink control channel (PUCCH) resource indicator, an acknowledgement/negative acknowledgement (ACK/NACK) channel resource index, a downlink assignment index, and a power control command for PUCCH; and wherein the at least one second parameter is explicitly indicated in a format of a second DCI type associated with a second transmission mode different from the first transmission mode.

Example 49

The apparatus of any one of examples 43 to 48, wherein the DCI type comprises a field for indicating an index, the index associated with a corresponding preconfigured set of one or more parameters that includes the at least one parameter, and wherein the corresponding preconfigured set of one or more parameters is preconfigured using higher layer signaling.

Example 50

The apparatus of example 49, wherein the second higher layer signaling includes a table associating the index with a value of each one of the corresponding preconfigured set of one or more parameters.

Example 51

An UE comprising: a memory having processor-executable instructions stored thereon; a processor configured to execute the processor-executable instructions in order to cause the UE to perform operations comprising: receiving first higher layer signaling at the UE, the first higher layer signaling indicating a transmission mode, wherein the transmission mode is associated with at least a DCI type; the DCI type having a format that does not explicitly indicate at least one parameter associated with a transport block (TB) scheduled by the DCI type, wherein the at least one parameter comprises at least one of: time resources on which the TB is transmitted, frequency resources on which the TB is transmitted, a modulation and coding scheme (MCS) of the TB; a redundancy version (RV) of the TB; and a transport block size (TBS) of the TB; receiving second higher layer signaling at the UE, the second higher layer signaling indicating to the UE the at least one parameter associated with the TB; and receiving the DCI type at the UE.

Example 52

The UE of example 51, wherein the DCI type is a first DCI type, and the transmission mode is further associated with a second DCI type, the second DCI type having a format that explicitly indicates the at least one parameter.

Example 53

The UE of example 51 or 52, wherein the TB scheduled by the DCI type is a downlink data transmission, and the operations further comprise receiving the TB, and demodulating and decoding the TB using the at least one parameter indicated in the second higher layer signaling.

Example 54

The UE of example 51 or 52, wherein the TB scheduled by the DCI type is an uplink data transmission, and the operations further comprises transmitting the TB using the at least one parameter indicated in the second higher layer signaling.

Example 55

The UE of any one of examples 51 to 54, wherein the transmission mode is a first transmission mode, the DCI type is a first DCI type, and wherein the format of the first DCI type further does not explicitly indicate at least one second parameter, the at least one second parameter comprising at least one of: a HARQ timing indicator, a physical uplink control channel (PUCCH) resource indicator, an acknowledgement/negative acknowledgement (ACK/NACK) channel resource index, a downlink assignment index, and a power control command for PUCCH; and wherein the at least one second parameter is explicitly indicated in a format of a second DCI type associated with a second transmission mode different from the first transmission mode.

Example 56

The UE of any one of examples 51 to 55, wherein the DCI type comprises a field for indicating an index, the index associated with a corresponding preconfigured set of one or more parameters that includes the at least one parameter, and wherein the corresponding preconfigured set of one or more parameters is preconfigured using higher layer signaling.

Example 57

The UE of example 56, wherein the second higher layer signaling includes a table associating the index with a value of each one of the corresponding preconfigured set of one or more parameters.

Example 58

An apparatus comprising a memory and at least one processor, wherein instructions are stored in the memory that, when executed by the at least one processor, cause the apparatus to perform any one of the apparatus/network method examples outlined above.

Example 59

A UE comprising a memory and at least one processor, wherein instructions are stored in the memory that, when executed by the at least one processor, cause the UE to perform any one of the UE method examples outlined above.

Configuration of an Uplink Feedback Channel

In some embodiments, an uplink time-frequency resource may be configured such that a UE may use the resource to send, to the network, feedback triggering TRP cooperation. The UE may therefore act as a helper, e.g. by using the feedback to indicate to the network that there are poor downlink channel conditions and that TRP cooperation should be activated. TRP coordination may include different TRPs working in a coordinated manner to deliver downlink control information and/or downlink traffic data to the UE. For example, data duplication may be performed, e.g. different TRPs having an active link with the UE may each send a same TB transmission to the UE if the TRPs have data available.

The feedback that is used to trigger the TRP cooperation will be referred to as a "flag". The flag may be one bit. In some embodiments, the flag may include additional information, e.g. HARQ process ID information, such as which HARQ process failed to decode, and/or scheduling assignment information. The flag may be transmitted in a physical uplink control channel (PUCCH), and/or on grant-free uplink resources (i.e., resources used without receiving any uplink grant), and/or as part of a physical uplink shared channel (PUSCH), and/or in a separately configured uplink channel. The configured uplink time-frequency resource available to send the flag may be common to all of the TRPs associated with the UE, or specific to a serving TRP.

In some embodiments, the UE may be configured by higher layer signaling to support or activate the flag functionality. The higher layer signaling may be RRC signaling.

In some embodiments, the network may switch to a light DCI format upon receipt of the flag from the UE. In some embodiments, the opposite occurs: the UE sends the flag to the network upon receipt of a light DCI.

In some embodiments, a downlink/uplink grant or DCI or PDCCH may include an indicator/flag that activates the operation of the UE, e.g., the network requests the UE to send the flag upon meeting certain conditions, for example, when the link quality is poor or interference measured is high.

In one example, a PUCCH format can be configured for a UE to support transmission of the flag as part of the PUCCH message.

In some existing solutions, a channel state information (CSI) request flag is used in uplink grant, by which the network requests an aperiodic channel state report from the UE, and the report is transmitted on an uplink data channel. However, the UE may not always have uplink traffic, and hence a flag in uplink grant may not always ensure that fast feedback from the UE is received corresponding to a poor quality of downlink transmission. Hence, the UE may receive a flag/indicator as part of a downlink grant which may trigger aperiodic/on-demand feedback from the UE on the channel condition.

In some embodiments, the UE transmits the flag in response to poor downlink channel conditions. The UE may measure a quality of a downlink transmission received by the UE in order to determine that there are poor downlink channel conditions. The downlink transmission used to make the measurement may be a channel state information (CSI) reference signal (RS), synchronization sequence (SS), or a demodulation reference signal (DMRS), e.g. a DMRS received in a downlink control channel (e.g. a PDCCH) or a downlink data channel (e.g. a PDSCH). These are only examples. Any downlink transmission may be used for measurement purposes to determine whether a flag should be transmitted.

In one example, a flag or indicator may be included in a downlink grant which may trigger an aperiodic channel status report over one or more of multiple carriers or multiple bandwidth parts. For example, if there are K carriers and/or bandwidth parts configured for a UE, in a first option: the indicator triggers channel status report over one of K carrier and/or bandwidth parts; in a second option: the indicator triggers channel status report over more than one of K carriers and/or bandwidth parts. For the second option, a K-bit bitmap may be used for the flag to identify which one or group of carriers or bandwidth parts are indicated. In one example, the network may transmit CSI-RS over the indicated carrier(s) or bandwidth part(s) following the grant that provides the flag/indicator. This triggers the UE to receive the CSI-RS over the indicated carrier(s) and/or bandwidth part(s). The UE may then send the report via a configured uplink channel. Out of the K carrier(s) or bandwidth part(s), the UE may have a primary carrier or bandwidth part, over which the DCI is received. The flag with channel status report may be transmitted over a configured uplink carrier or bandwidth part. In case of carrier aggregation, the flag with status report may be transmitted over the primary uplink carrier. Alternatively, the UE may be configured for carrier aggregation over downlink only, not over the uplink. In that case, status report of multiple downlink carriers or bandwidth parts may be sent over a common uplink carrier or bandwidth part. Feedback from the UE would facilitate choosing one or more carriers or bandwidth parts for subsequent transmission by the network.

In one example, the flag transmitted by the UE maybe a bitmap. The bitmap may indicate which one or more carrier(s) or bandwidth part(s) are good in terms of link quality or link quality above a threshold. The threshold may be pre-configured. Alternatively, the flag may be a bitmap or a collection of bits where a group of bits may be used for each carrier or bandwidth part to convey channel status report over that carrier or bandwidth part. For example, the flag may be M≥1 bits, where there are K≥1 bit-groups. Each bit-group may consist of L≥1 bits, where L≤M, K≤M. Each bit-group is used for a carrier or bandwidth part.

In some embodiments, the flag may be received by multiple TRPs, which may engage later for either independent or coordinated scheduling. For example, if all TRPs in a group have the downlink data available, then data duplication may be performed. The MAC or HARQ entity may be the same for the downlink data transmissions of coordinated TRPs, e.g. the same HARQ process ID transmission may be made by one or more TRPs if they have a common MAC or scheduler and the data available.

As one example, and with reference to FIG. 6, a flag generator 270 in UE 116 may measure a quality of a downlink transmission received by the UE 116. If the measurement indicates poor downlink channel conditions (e.g. a SNR below a certain threshold or interference above threshold), then the flag generator 270 may generate the flag. The flag is then included in an uplink message generated by uplink message generator 262. The uplink message is then transmitted to one or more TRPs using transmitter 252. The uplink message is received at least at TRP 108 by receiver 204 and forwarded to sever 200. Decoder 222 decodes the message to obtain the flag. The flag is forwarded to a TRP coordinator 236. In response to receipt of the flag, the TRP coordinator 236 instructs downlink data for the UE to be duplicated, e.g sent by both TRP 108 and another TRP (not shown in FIG. 6) that also has an active downlink with the UE 116.

Figure 24:
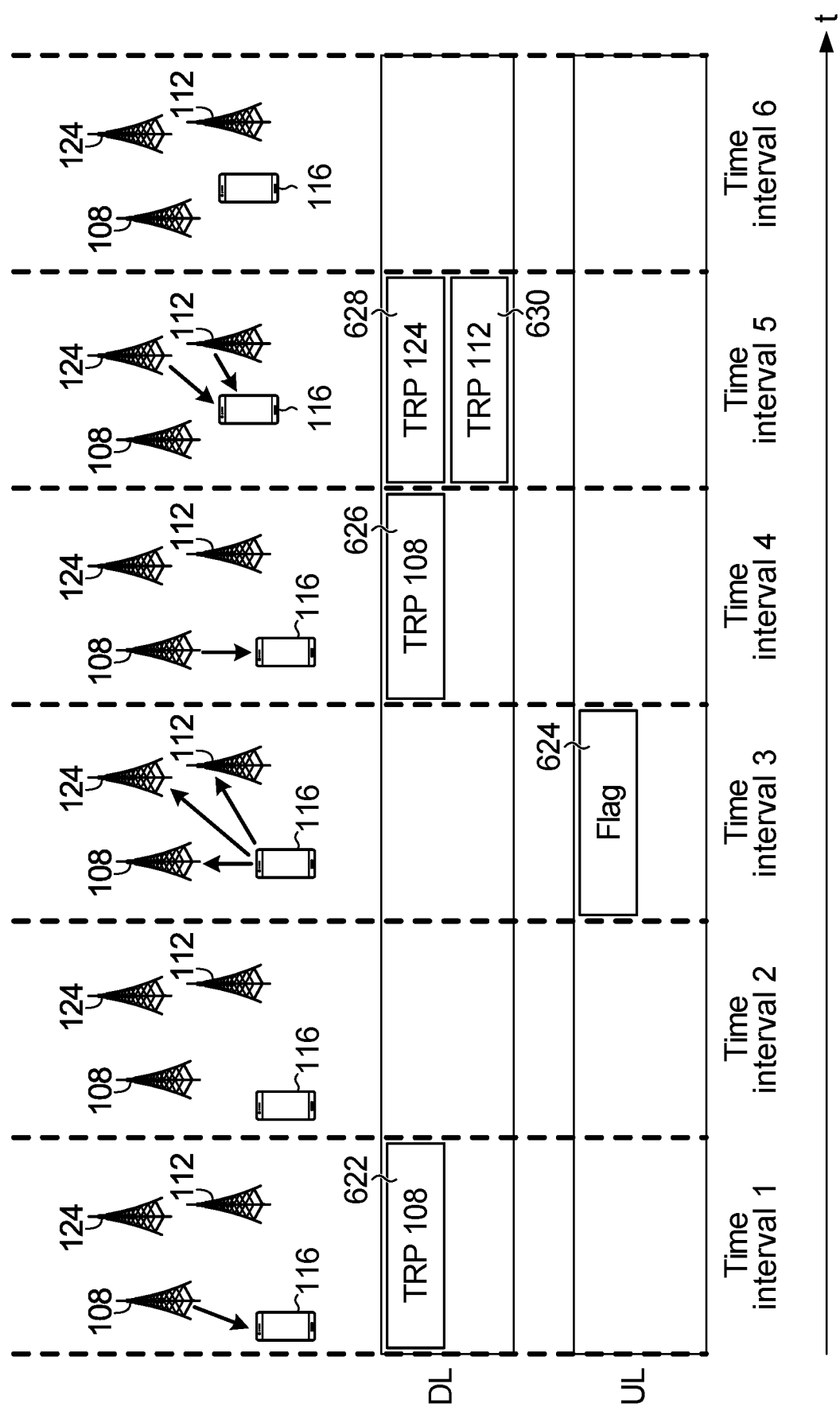
FIGS. 24 to 26 illustrate examples of TRP coordination.

FIG. 24 illustrates an example of TRP coordination. Vertical lines separate a time axis into intervals, e.g. subframes. The time intervals are labelled "1" to "6" to assist in referencing the time intervals. Example downlink ("DL") and uplink ("UL") time-frequency resources are also illustrated. In time interval 1, TRP 108 sends a downlink transmission to UE 116 using downlink time-frequency resources 622. The UE 116 uses the downlink transmission to measure a quality of the downlink channel and determines that the downlink channel quality is poor. Therefore, in time interval 3 the UE 116 sends a flag to TRPs 108, 124, and 112 on uplink time-frequency resources 624. Uplink time-frequency resources 624 are configured to be available for sending the flag, and TRPs 108, 124, and 112 are configured to monitor these resources 624 for the transmission of a flag. Time-frequency resource 624 may be part of a periodic pattern of uplink time-frequency resources that are configured for sending any flags. For example, there may be a time-frequency region in every uplink subframe available for sending a flag. The periodicity at which an uplink time-frequency resource is available for sending a flag may also be configured. Alternatively, a higher-layer configured or dynamically indicated time-frequency resource can be used for sending the flag on aperiodic/on-demand basis or when triggered by the network in a downlink control channel.

After receiving the flag sent in time interval 3, the TRP 108 transmits a downlink transmission on time-frequency resources 626 in time interval 4. The downlink transmission sent in time interval 4 may be a transmission of a TB that will be duplicated by TRPs 124 and 112. In time interval 5, TRP 124 repeats the transmission of the TB, e.g. at a same or different RV, and sends the repeat transmission on time-frequency resources 628. In time interval 5, the TRP 112 also repeats the transmission of the TB, e.g. at a same or different RV, and sends the repeat transmission on time-frequency resources 630.

Figure 25:
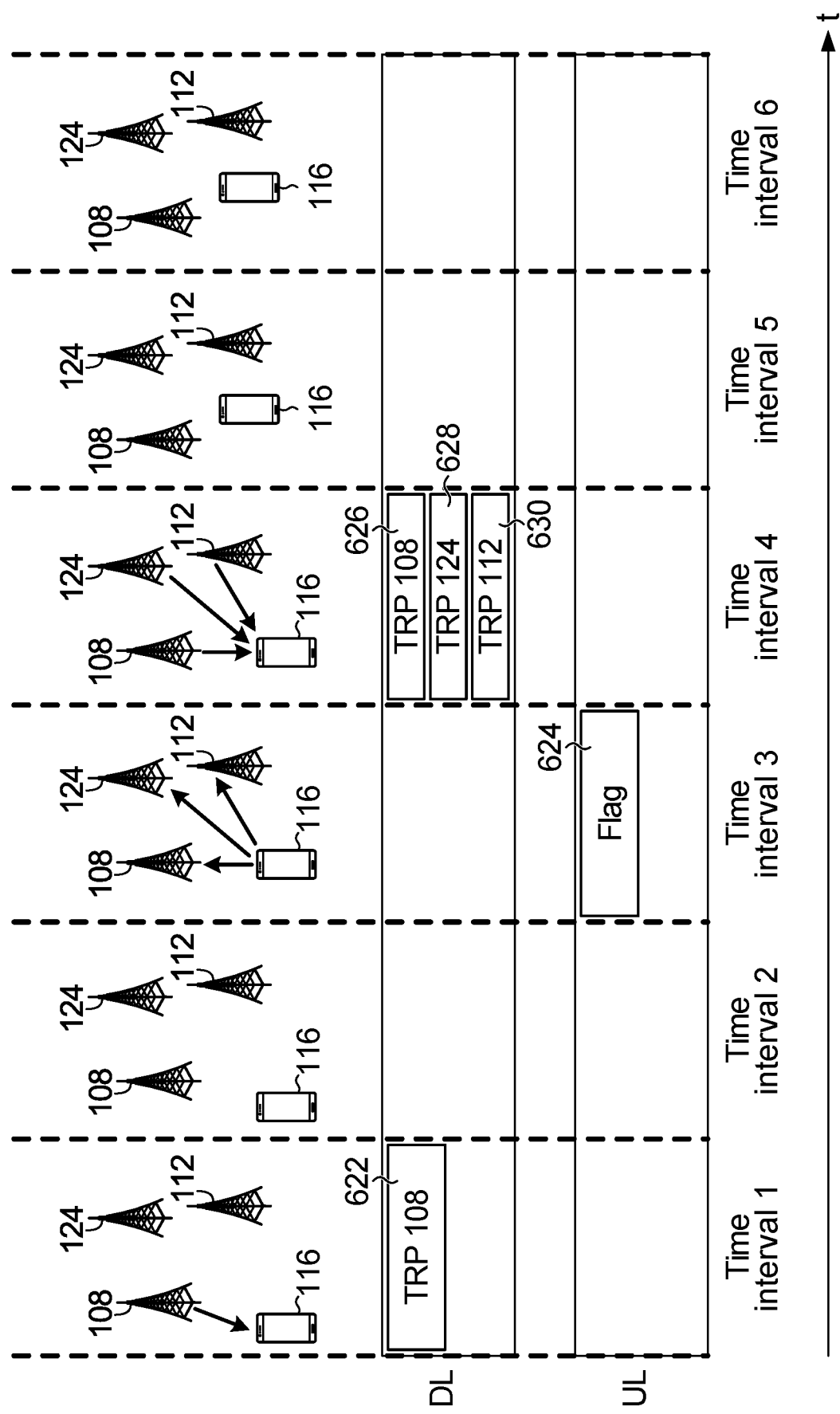
Figure 26:
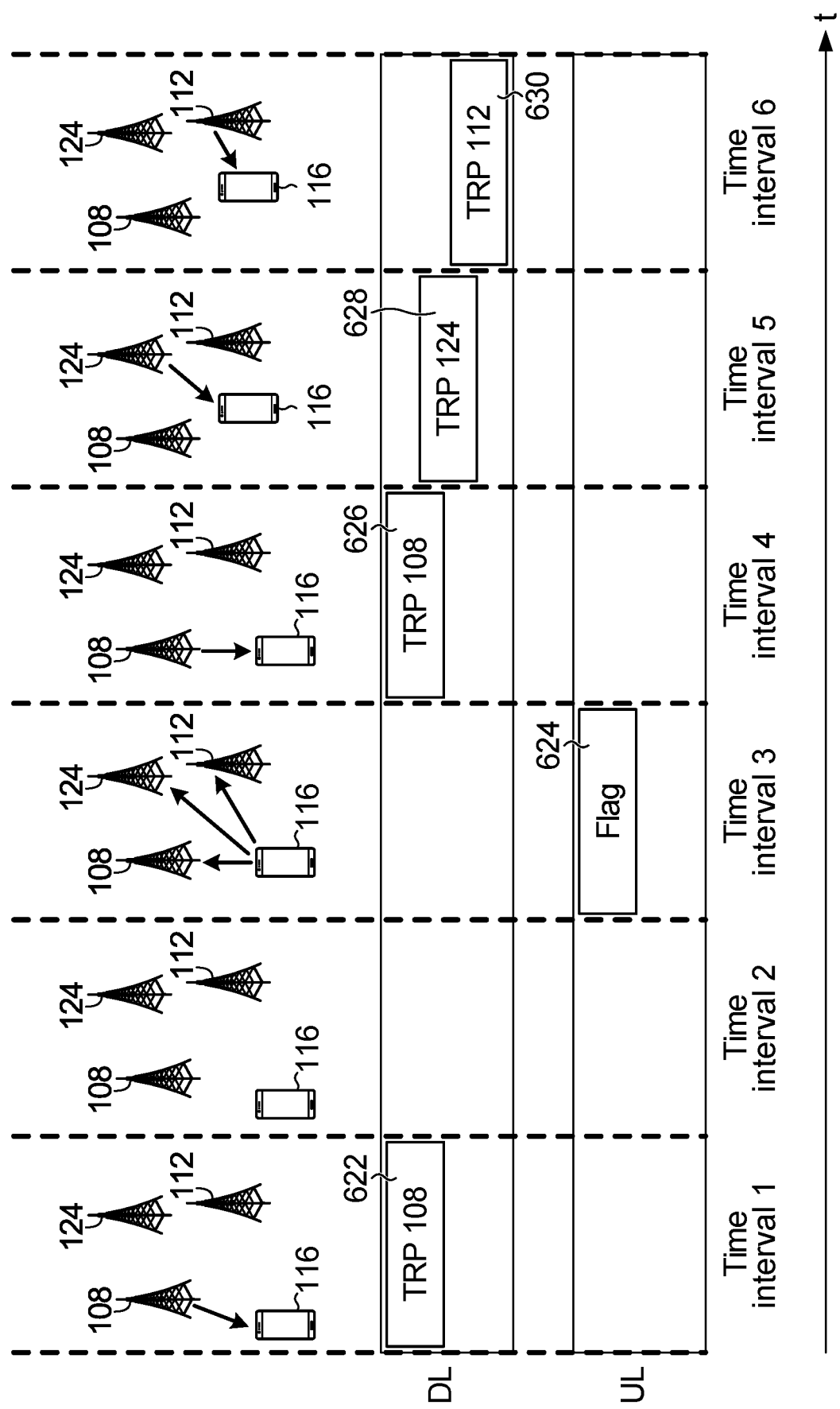

FIG. 25 illustrates a variation of FIG. 24 in which TRPs 108, 124, and 112 all send their downlink transmission in time interval 4. FIG. 26 illustrates a variation of FIG. 24 in which TRP 108 sends its downlink transmission in time interval 4, TRP 124 sends its downlink transmission in time interval 5, and TRP 112 sends its downlink transmission in time interval 6.

In some embodiments, after a flag triggering TRP cooperation is received by the network, multiple TRPs may transmit on the downlink control channel (e.g. the PDCCH) and/or the downlink data channel (e.g. the PDSCH) simultaneously in time. The same CORESET or a different CORESET may be used for the different downlink transmissions from the different TRPs. For example, a same or different CORESET may be used for the downlink transmissions from TRP 124 and TRP 112 in time interval 5 of FIG. 24. A same CORESET may have multiple DCIs, where each one of the multiple DCIs corresponds to a respective TRP. If the HARQ process ID of the multiple DCIs is the same, then the multiple TRPs are performing data duplication. If the HARQ process ID of the multiple DCIs is different, then the multiple TRPs are transmitting different TBs. A prior configuration may be notified to the UE when same HARQ process number used by different TRPs indicate transmission of same TB.

A CORESET association may be configured so that if a UE receives multiple DCIs (e.g. multiple PDCCHs) in a same CORESET after a flag is sent, then the UE may assume the DCIs are scheduling for a same HARQ process. The UE may perform HARQ combining if the downlink transmissions have the same HARQ process ID.

In some embodiments, multiple TRPs may transmit on the downlink control channel (e.g. the PDCCH) and/or the downlink data channel (e.g. the PDSCH) at different times, e.g. if the UE has CORESET or blind detection limitations.

In embodiments above, the availability of a flag that is used to coordinate TRP transmissions may provide a more efficient enabling mechanism for a multi-link connection. The UE may be used as a helper to feedback a trigger (the flag), which the network may use to engage more resources for subsequent transmissions to the UE. The UE may be configured with an uplink time-frequency resource in an uplink channel to send a flag. The uplink time-frequency resource may be common to the TRPs or specific to the serving TRP. The measurement made by the UE to determine whether to send the flag may be based on different downlink transmissions that may vary over time, e.g., CSI-RS, DMRS, SS etc. In some embodiments, the DMRS of a PDCCH or a PDSCH may be used for the measurement. The flag may be considered as pseudo-NACK feedback from the UE, which is sent if the estimated downlink quality is not good. Other TRPs, which have data available, would engage in subsequent transmissions. The joint transmission may be in a carrier aggregation (CA) implementation (different carriers, same schedulers) or a dual connectivity implementation (different schedulers). The CORESET association of subsequent PDCCHs from the TRPs may schedule the same TB.

Example Handover Procedures

In some embodiments, handover procedures for UEs operating in grant-free and/or grant-based mode may be enhanced by using data duplication. A UE may have multiple active links, with each active link between the UE and a respective different TRP. Grant-free uplink transmissions may be performed on all of the links, or grant-based uplink transmissions may be performed on all of the links, or some of the links may be used for grant-free uplink transmissions and other ones of the links may be used for grant-based uplink transmissions, depending on the implementation. For grant-free uplink transmissions, different links may have the same or different configured uplink time-frequency resources used for sending the grant-free uplink transmissions. In some embodiments, the UE may switch from grant-free to grant-based mode during a handover. Grant-based transmissions may be more reliable. In some embodiments, a UE operating in grant-free mode begins to monitor for a grant during the handover. The grant may be sent via a light DCI. For example, the UE may monitor for a light DCI format after the UE sends a trigger for a handover. The light DCI format is then used to perform the grant-free to grant-based switch. The UE may be configured by the serving cell to monitor for a grant during a handover.

When a UE is operating in grant-free mode (i.e., transmit without grant), there may be multiple configured resources for performing grant-free uplink transmissions, e.g. multiple configured time-frequency resources. Dynamic selection of configured resources, by the UE, may be possible, e.g. based on a CSI-RS and SS block measurement. The UE may therefore dynamically select which configured resources to use when the UE has a grant-free uplink transmission to send to the network. In some embodiments, to try to increase the reliability of an uplink transmission, e.g. during a handover, the UE may use all of the configured resources for duplication to send an uplink transmission. For example, an uplink transmission of the same TB may be sent on each one of multiple time-frequency resources. Assuming a same transport block size (TBS), the transmission parameters may be the same or different in the multiple configured resources. For example, each uplink transmission may have a same or different RV. In some embodiments, multiple configured resources may be used in a same time interval in frequency division multiplexing (FDM), and the UE may perform power control. In some embodiments, multiple configured resources may be used in different time intervals in time division multiplexing (TDM). Duplication over multiple configured resources during handover is an example. More generally, UE may be configured to use multiple configured resources in this manner in other circumstances whenever there is benefit or high reliability is required.

Figure 27:
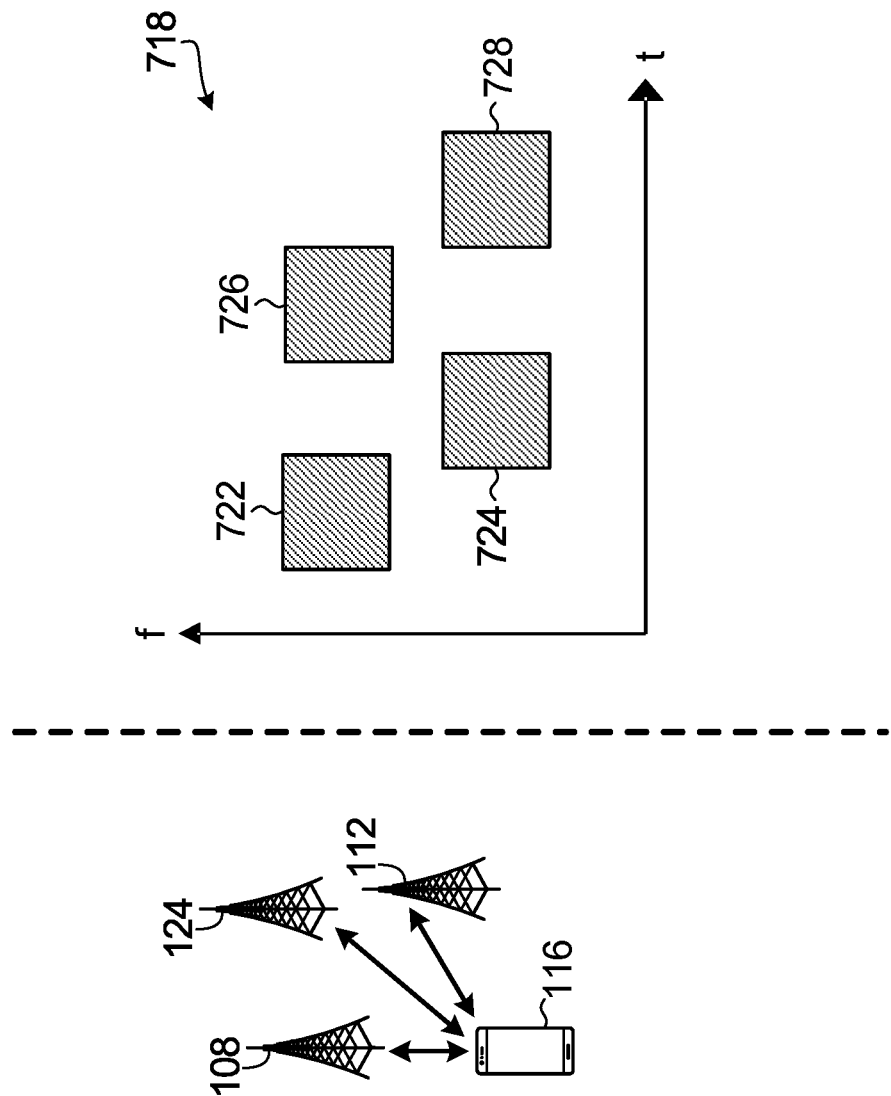
FIG. 27 illustrates the use of preconfigured time-frequency resources, according to one embodiment.

As an example, FIG. 27 illustrates the use of preconfigured time-frequency resources, according to one embodiment. UE 116 has an active link with each of TRPs 108, 122, and 124, and therefore UE 116 may communicate with the network via one, some, or all of TRPs 108, 122, and 124. A set of time-frequency resources 718 is illustrated, which has four preconfigured time-frequency regions 722, 724, 726, and 728. The preconfigured time-frequency regions 722, 724, 726, and 728 may be used for uplink and/or downlink communications, and are known to both the UE 116 and the TRPs 108, 122, and 124. The TRPs 108, 122, and 124 may monitor the preconfigured time-frequency regions 722, 724, 726, and 728 for possible uplink transmissions from UE 116. In one example, when the UE 116 has data to send to the network, the UE 116 dynamically selects one of the preconfigured time-frequency regions and sends the data using the selected time-frequency region. The time-frequency region may be selected based on channel quality, e.g. based on a channel quality measurement made by the UE 116. As one example, if the UE 116 determines that region 724 has a better uplink channel quality than regions 722, 726, and 728, then the UE 116 sends the data in region 724. In another example, when UE 116 has data to send to the network, the UE 116 performs data duplication by sending the same data on each of regions 722, 724, 726, and 728. In another example, when the network has data to send to the UE 116, the network performs data duplication by sending the same data in the downlink in each of regions 722, 724, 726, and 728.

Figure 28:
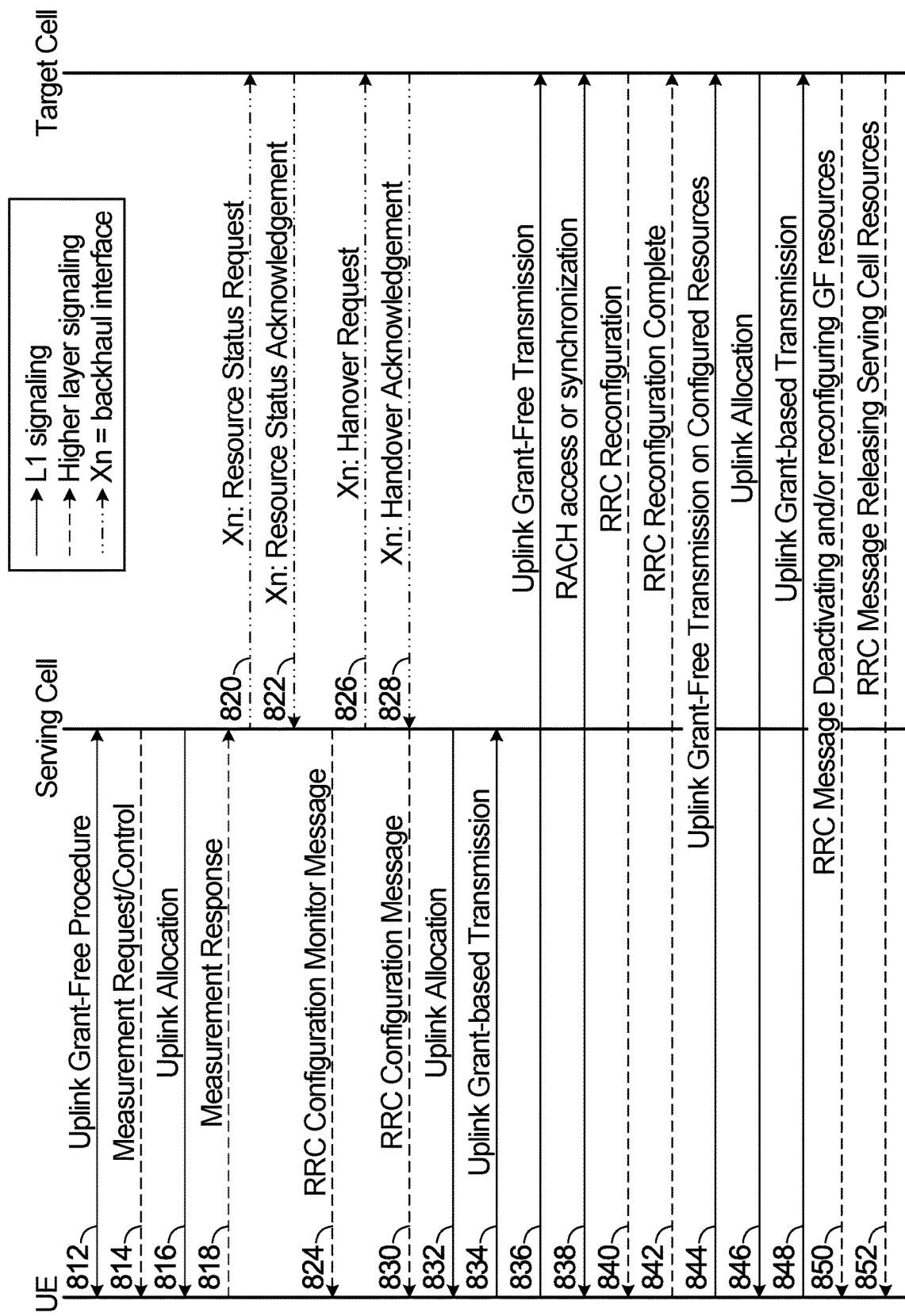
FIG. 28 is an example call flow for handing over a UE from a serving cell to a target cell.

FIG. 28 is an example call flow for handing over a UE from a serving cell to a target cell. Higher layer signaling (e.g. RRC signaling) is illustrated using arrows having stippled lines. The solid arrows (not stippled lines) indicate layer 1 signaling, i.e. control messages in a control channel (e.g. DCI). "Xn" designates a message that is sent on a backhaul interface between a serving cell and a target cell.

The UE is assumed to be operating in grant-free mode in the serving cell. In step 812, the UE has an ongoing uplink grant-free procedure with at least one TRP of the serving cell. The uplink grant-free procedure is used for sending data between the network and the UE. For example, the UE sends a grant-free uplink transmission to the TRP of the serving cell by transmitting the uplink data on configured grant-free uplink time-frequency resources. The uplink grant-free procedure of step 812 is ongoing during at least some of the handover for data duplications purposes. For example, the uplink grant-free procedure of step 812 may be released after a particular number of milliseconds after handover begins or after handover is completed, or the release may occur via step 852 described below.

In step 814, the serving cell transmits a measurement request to the UE. In step 816, the serving cell sends a grant to the UE, i.e. an uplink resource allocation. The uplink data channel resources are used for transmitting measurement report by the UE. At step 818, the UE sends a measurement response to the serving cell. Based on the measurement response, it is determined that a handover should be performed at the serving cell. In step 820, a resource status request message is sent on the backhaul from the serving cell to the target cell. The resource status request message queries whether the target cell has the resources to accommodate the UE. In step 822, a resource status acknowledgement message is sent on the backhaul from the target cell to the serving cell, and confirms that the target cell has the resources to accommodate the UE. Optionally, in step 824, a RRC message is sent from the serving cell to the UE. The RRC message configures the UE to begin monitoring for an uplink grant from the serving cell. In step 826, a handover request message is sent on the backhaul from the serving cell to the target cell, and the target cell responds in step 828 with a handover acknowledgement message. Note that the timing of message 824 can be before or after messages 820, 822, 826, 828.

In step 830, a RRC message is sent from the serving cell to the UE. The RRC message sent at step 830 may have multiple purposes. One RRC message may combine an indication of multiple parameters, or alternatively, separate RRC messages can be sent for each set of parameters. As a first option, the serving cell may convey a handover command to the UE and layer½ parameters may be provided to the UE so that the UE may obtain synchronization with the target cell at a later stage. The parameters may include a dedicated random access pre-amble or dedicated C-RNTI (or grant-free RNTI) to be used in the target cell. Moreover, the RRC message may indicate to the UE what uplink time-frequency resources are configured to be used if the UE sends a grant-free uplink transmission to the target cell. The DMRS used in the transmission may be masked by the RNTI received. The indication of the time-frequency resources may be received in the handover acknowledgement message from the target cell in 828, and forwarded to the UE by the serving cell in step 830. Alternatively, additional grant-free resources are not configured for communicating with the target cell, and instead existing grant-free transmission with serving cell is also received by the target cell.

Optionally, in step 832 an uplink grant is sent from the serving cell to the UE, in which case a grant-based uplink transmission may be sent in step 834.

In step 836, a grant-free uplink transmission is sent to the target cell using the uplink time-frequency resources indicated in step 830, if configured separately from the grant-free resources used for communicating with serving cell. This step is optional.

In step 838, a random access channel (RACH) procedure is performed, which may include configuring time-frequency resources. In step 840, an RRC connection reconfiguration message is sent from the target cell to the UE, and provides a C-RNTI for the UE for use with the target cell. In step 842, an RRC connection reconfiguration complete message is returned to the target cell. If a dedicated C-RNTI was provided to the UE as part of message 830, the UE only needs to perform timing synchronization with the target cell and further RRC communication in message 840 and/or 842 may not be required. In step 844, an uplink grant-free transmission is sent from the UE to the target cell on configured resources. The configured time-frequency resource may be obtained as part of the RACH procedure, i.e., 838 or message 840. 844 is an optional step.

Optionally, in step 846, an uplink grant is sent from the target cell to the UE, in which case a grant-based uplink transmission may be sent in step 848.

In step 850, an RRC configuration message is sent to the UE from the target cell. The RRC configuration message deactivates and/or reconfigures the grant-free uplink time-frequency resources. In step 852, the target cell transmits, to the UE, an RRC message that releases the serving cell resources. Step 852 may be optional, e.g. the step may be omitted if the serving cell resources are automatically released at the end of a preconfigured time period after handover.

In one example, in step 836 or 844, the UE may continue grant-free transmission/repetitions instead of single transmission or until stopped by a trigger from serving/target cell.

The uplink messages transmitted by the UE may be generated in an uplink message generator (e.g. uplink message generator 262 in FIG. 6) and transmitted by a transmitter (e.g. transmitter 252 in FIG. 6). The downlink messages received by the UE may be received by a receiver (e.g. receiver 254 in FIG. 6) and processed by the UE (e.g. decoded via decoder 268 in FIG. 6). A TRP in the network may receive messages from the UE by a receiver (e.g. receiver 204 in FIG. 6) and transmit messages to the UE by a transmitter (e.g. transmitter 202 in FIG. 6).

An asynchronous grant-free uplink transmission refers to a grant-free uplink transmission that does not follow any pre-configured timeline or without obtaining timing synchronization. The network may have to blindly detect for an asynchronous grant-free uplink transmission at every possible location at which it may be sent. In the example call flow in FIG. 28, the UE may transmit asynchronous grant-free uplink transmissions to the target cell in the configured resource (in step 836) once the handover decision is made and once the UE receives the time-frequency resource configuration for the target cell in RRC signaling in step 830. Therefore, it may be possible for the UE to communicate with the target cell even before the RACH procedure or synchronization procedure. The UE may receive the RRC time-frequency resource configuration of the target cell (in step 830) from serving cell. The grant-free transmission at step 836 may use a long cyclic prefix (CP), e.g., 60 kHz subcarrier spacing with extended CP (ECP). The serving cell may provide, to the UE, the configuration details of the target cell, which may be obtained when the target cell acknowledges the handover request from the serving cell. This can be conveyed at step 830. For example, in FIG. 28, the handover acknowledgement in step 828 may indicate, to the serving cell, the uplink time-frequency resources configured for the UE to send a grant-free uplink transmission to the target cell. This configuration information is then provided by the serving cell to the UE in step 830. The UE then sends an uplink grant-free transmission to the target cell in step 836. However, the UE may still keep the original grant-free uplink connection to the serving cell during the handover. Alternatively, the UE may switch to grant-based mode with the serving cell after the handover request made, e.g. as in optional steps 832 and 834. After the RACH process is complete, the UE may switch to grant-based transmission mode in the target cell, which may be more reliable. This is shown in optional steps 846 and 848. Alternatively, the UE may switch to a synchronous grant-free transmission mode with RRC re-configuration, e.g. as in steps 840 to 844. After the UE is fully connected and operational with the target cell, the UE may still perform grant-free transmissions with the serving cell for X ms and/or for n slots/symbols, e.g. for data duplication purposes. By keeping multiple links active (one in the serving cell and one in the target cell), data duplication may be performed, which may increase communication reliability. The connection to the serving cell may be released based on an RRC configuration or based on a deactivation signal (e.g. steps 850 and 852 of FIG. 28).

In embodiments above, data duplication may be used during handover to try to increase reliability. For uplink grant-free handover, the UE may initiate early grant-free transmission to the target cell if configured resources are common between the serving cell and the target cell, or if information on the configured resources for the target cell or C-RNTI or grant-free RNTI at target cell is available. The UE may keep the uplink grant-free link with the last serving cell for a configured duration even after handover is complete. Asynchronous grant-free handover may be performed, i.e. handover in which there is misalignment between adjacent cells for grant-free uplink transmissions. The UE may transmit in grant-free mode to the target cell before RACH and keep the grant-free link with the last serving TRP for a configured duration after handover.

Other Example Operating Environments

Figure 29:
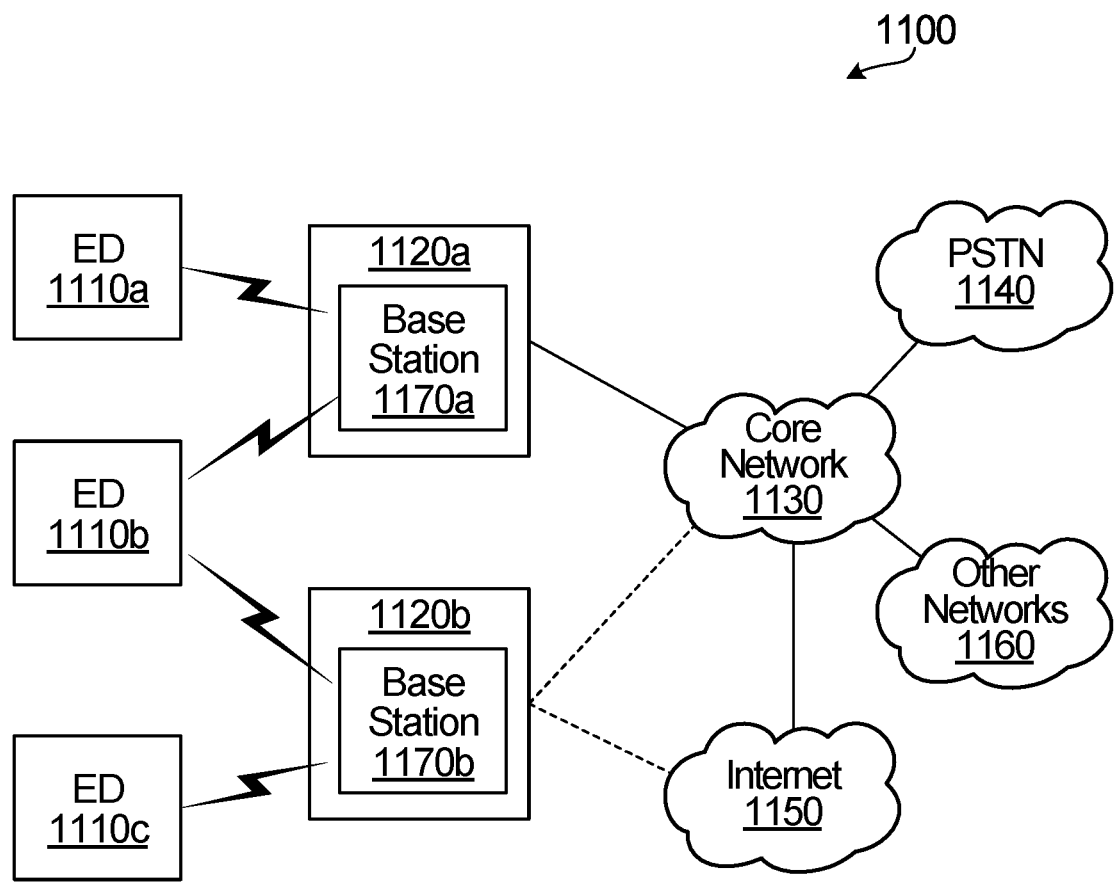
FIG. 29 illustrates an example communication system in which embodiments of the present disclosure could be implemented.

FIG. 29 illustrates an example communication system 1100 in which embodiments of the present disclosure could be implemented. In general, the system 1100 enables multiple wireless or wired elements to communicate data and other content. The purpose of the system 1100 may be to provide content (voice, data, video, text) via broadcast, narrowcast, user device to user device, etc. The system 1100 may operate efficiently by sharing resources such as bandwidth.

In this example, the communication system 1100 includes electronic devices (ED) 1110a-1110c, radio access networks (RANs) 1120a-1120b, a core network 1130, a public switched telephone network (PSTN) 1140, the Internet 1150, and other networks 1160. While certain numbers of these components or elements are shown in FIG. 29, any reasonable number of these components or elements may be included in the system 1100.

The EDs 1110a-1110c are configured to operate, communicate, or both, in the system 1100. For example, the EDs 1110a-1110c are configured to transmit, receive, or both via wireless communication channels. Each ED 1110a-1110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device. The UE 116 described earlier is an example of an ED. Any UE described earlier may instead be an ED.

In FIG. 29, the RANs 1120a-1120b include base stations 1170a-1170b, respectively. Each base station 1170a-1170b is configured to wirelessly interface with one or more of the EDs 1110a-1110c to enable access to any other base station 1170a-1170b, the core network 1130, the PSTN 1140, the Internet 1150, and/or the other networks 1160. For example, the base stations 1170a-1170b may include (or be) one or more of several well-known devices, such as a base transceiver station (BTS), a Node-B (NodeB), an evolved NodeB (eNodeB), a Home eNodeB, a gNodeB (sometimes called a "gigabit" NodeB), a transmission point (TP), a transmit/receive point (TRP), a site controller, an access point (AP), or a wireless router. A TRP is an example of a base station, and the TRPs described earlier may instead be base stations.

Any ED 1110a-1110c may be alternatively or jointly configured to interface, access, or communicate with any other base station 1170a-1170b, the internet 1150, the core network 1130, the PSTN 1140, the other networks 1160, or any combination of the preceding. Optionally, the system may include RANs, such as RAN 1120b, wherein the corresponding base station 1170b accesses the core network 1130 via the internet 1150, as shown.

The EDs 1110a-1110c and base stations 1170a-1170b are examples of communication equipment that can be configured to implement some or all of the functionality and/or embodiments described herein. In the embodiment shown in FIG. 29, the base station 1170a forms part of the RAN 1120a, which may include other base stations, base station controller(s) (BSC), radio network controller(s) (RNC), relay nodes, elements, and/or devices. Any base station 1170a, 1170b may be a single element, as shown, or multiple elements, distributed in the corresponding RAN, or otherwise. Also, the base station 1170b forms part of the RAN 1120b, which may include other base stations, elements, and/or devices. Each base station 1170a-1170b may be configured to operate to transmit and/or receive wireless signals within a particular geographic region or area, sometimes referred to as a coverage area. A cell may be further divided into cell sectors, and a base station 1170a-1170b may, for example, employ multiple transceivers to provide service to multiple sectors. In some embodiments a base station 1170a-1170b may be implemented as pico or femto nodes where the radio access technology supports such. In some embodiments, multiple-input multiple-output (MIMO) technology may be employed having multiple transceivers for each coverage area. The number of RAN 1120a-1120b shown is exemplary only. Any number of RAN may be contemplated when devising the system 1100.

The base stations 1170a-1170b communicate with one or more of the EDs 1110a-1110c over one or more air interfaces 1190 using wireless communication links e.g. RF, μWave, IR, etc. The air interfaces 1190 may utilize any suitable radio access technology. For example, the system 1100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 1190.

A base station 1170a-1170b may implement Universal Mobile Telecommunication System (UMTS) Terrestrial Radio Access (UTRA) to establish an air interface 1190 using wideband CDMA (WCDMA). In doing so, the base station 1170a-1170b may implement protocols such as HSPA, HSPA+ optionally including HSDPA, HSUPA or both. Alternatively, a base station 1170a-1170b may establish an air interface 1190 with Evolved UTMS Terrestrial Radio Access (E-UTRA) using LTE, LTE-A, and/or LTE-B. It is contemplated that the system 1100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 1120a-1120b are in communication with the core network 1130 to provide the EDs 1110a-1110c with various services such as voice, data, and other services. Understandably, the RANs 1120a-1120b and/or the core network 1130 may be in direct or indirect communication with one or more other RANs (not shown), which may or may not be directly served by core network 1130, and may or may not employ the same radio access technology as RAN 120a, RAN 120b or both. The core network 1130 may also serve as a gateway access between (i) the RANs 1120a-1120b or EDs 1110a-1110c or both, and (ii) other networks (such as the PSTN 1140, the Internet 1150, and the other networks 1160). In addition, some or all of the EDs 1110a-1110c may include functionality for communicating with different wireless networks over different wireless links using different wireless technologies and/or protocols. PSTN 1140 may include circuit switched telephone networks for providing plain old telephone service (POTS). Internet 1150 may include a network of computers and subnets (intranets) or both, and incorporate protocols, such as IP, TCP, UDP. EDs 1110a-1110c may be multimode devices capable of operation according to multiple radio access technologies, and incorporate multiple transceivers necessary to support such.

It is contemplated that the communication system 1100 as illustrated in FIG. 29 may support a New Radio (NR) cell, which also may be referred to as hyper cell. Each NR cell includes one or more TRPs using the same NR cell ID. The NR cell ID is a logical assignment to all physical TRPs of the NR cell and may be carried in a broadcast synchronization signal. The NR cell may be dynamically configured. The boundary of the NR cell may be flexible and the system dynamically adds or removes TRPs to from the NR cell. The serving and target cells described earlier (e.g. 110 and 114 in FIG. 1) may be examples of NR cells.

In one embodiment, a NR cell may have one or more TRPs within the NR cell transmitting a UE-specific data channel, which serves a UE. The one or more TRPs associated with the UE specific data channel are also UE specific and are transparent to the UE. Multiple parallel data channels within a single NR cell may be supported, each data channel serving a different UE.

In another embodiment, a broadcast common control channel and a dedicated control channel may be supported. The broadcast common control channel may carry common system configuration information transmitted by all or partial TRPs sharing the same NR cell ID. Each UE can decode information from the broadcast common control channel in accordance with information tied to the NR cell ID. One or more TRPs within a NR cell may transmit a UE specific dedicated control channel, which serves a UE and carries UE-specific control information associated with the UE. Multiple parallel dedicated control channels within a single NR cell may be supported, each dedicated control channel serving a different UE. The demodulation of each dedicated control channel may be performed in accordance with a UE-specific reference signal (RS), the sequence and/or location of which are linked to the UE ID or other UE specific parameters.

In some embodiments, one or more of these channels, including the dedicated control channels and the data channels, may be generated in accordance with a UE specific parameter, such as a UE ID, and/or an NR cell ID. Further, the UE specific parameter and/or the NR cell ID can be used to differentiate transmissions of the data channels and control channels from different NR cells.

An ED, such as a UE, may access the communication system 1100 through at least one of the TRP within a NR cell using a UE dedicated connection ID, which allows one or more physical TRPs associated with the NR cell to be transparent to the UE. The UE dedicated connection ID is an identifier that uniquely identifies the UE in the NR cell. For example, the UE dedicated connection ID may be identified by a sequence. In some implementations, the UE dedicated connection ID is assigned to the UE after an initial access. The UE dedicated connection ID, for example, may be linked to other sequences and randomizers which are used for PHY channel generation.

In some embodiments, the UE dedicated connection ID remains the same as long as the UE is communicating with a TRP within the NR cell. In some embodiments, the UE can keep original UE dedicated connection ID when crossing NR cell boundary. For example, the UE can only change its UE dedicated connection ID after receiving signaling from the network.

In some embodiments, any number of NR cells may be implemented in the communication system 1100. For example, FIG. 30 illustrates two neighboring NR cells in an example communication system, in accordance with an embodiment of the present disclosure.

Figure 30:
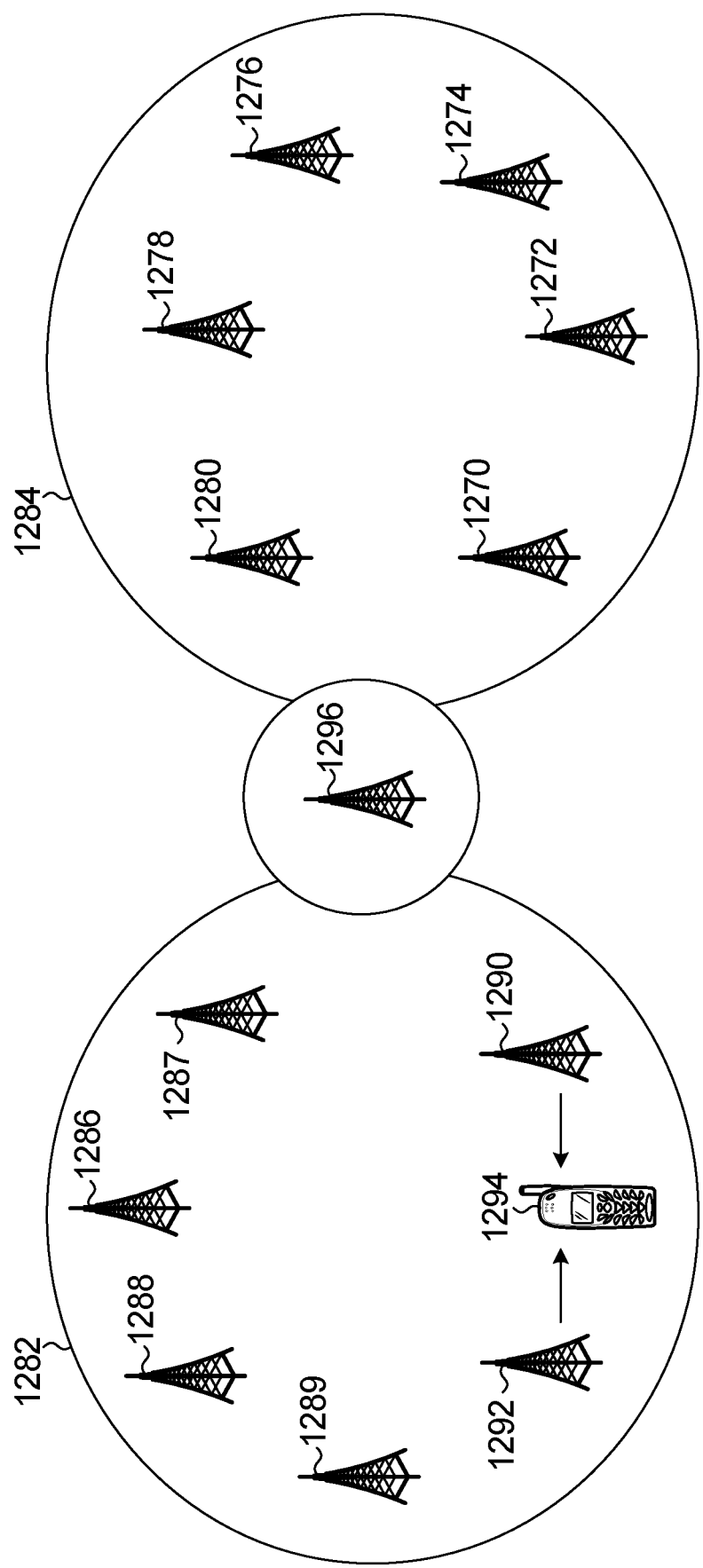
FIG. 30 illustrates two neighboring new radio (NR) cells of an example communication system in which embodiments of the present disclosure could be implemented.

As illustrated in FIG. 30, NR cells 1282, 1284 each includes multiple TRPs that are assigned the same NR cell ID. For example, NR cell 1282 includes TRPs 1286, 1287, 1288, 1289, 1290, and 1292, where TRPs 1290, 1292 communicates with an ED, such as UE 1294. It is obviously understood that other TRPs in NR cell 1282 may communicate with UE 1294. NR cell 1284 includes TRPs 1270, 1272, 1274, 1276, 1278, and 1280. TRP 1296 is assigned to NR cells 1282, 1284 at different times, frequencies or spatial directions and the system may switch the NR cell ID for transmit point 1296 between the two NR cells 1282 and 1284. It is contemplated that any number (including zero) of shared TRPs between NR cells may be implemented in the system.

In one embodiment, the system dynamically updates the NR cell topology to adapt to changes in network topology, load distribution, and/or UE distribution. In some implementations, if the concentration of UEs increases in one region, the system may dynamically expand the NR cell to include TRPs near the higher concentration of UEs. For example, the system may expand NR cell to include other TRPs if the concentration of UEs located at the edge of the NR cell increases above a certain threshold. As another example, the system may expand NR cell to include a greater concentration of UEs located between two hyper cells. In some implementations, if the traffic load increases significantly at one region, the system may also expand the NR cell associated with the region to include TRPs for the increased traffic load. For example, if the traffic load of a portion of the network exceeds a predetermined threshold, the system may change the NR cell ID of one or more TRPs that are transmitting to the impacted portion of the network.

In another embodiment, the system may change the NR cell ID associated with TRP 1296 from the NR cell ID of NR cell 1282 to the NR cell ID of NR cell 1284. In one implementation, the system can change the association of a TRP with different NR cells periodically, such as every 1 millisecond. With such a flexible NR cell formation mechanism, all UEs can be served by the best TRPs so that virtually there are no cell edge UEs.

In yet another embodiment, the shared TRP 1296 can reduce interference for UEs located at the boundary between the two NR cells 1282, 1284. UEs that are located near the boundaries of two NR cells 1282, 1284 experience fewer handovers because the shared TRP is associated with either NR cell at different times, frequencies or spatial directions. Further, as a UE moves between the NR cells 1282, 1284, the transition is a smoother experience for the user. In one embodiment, the network changes the NR cell ID of the TRP 1296 to transition a UE moving between NR cells 1282, 1284.

Figure 31:
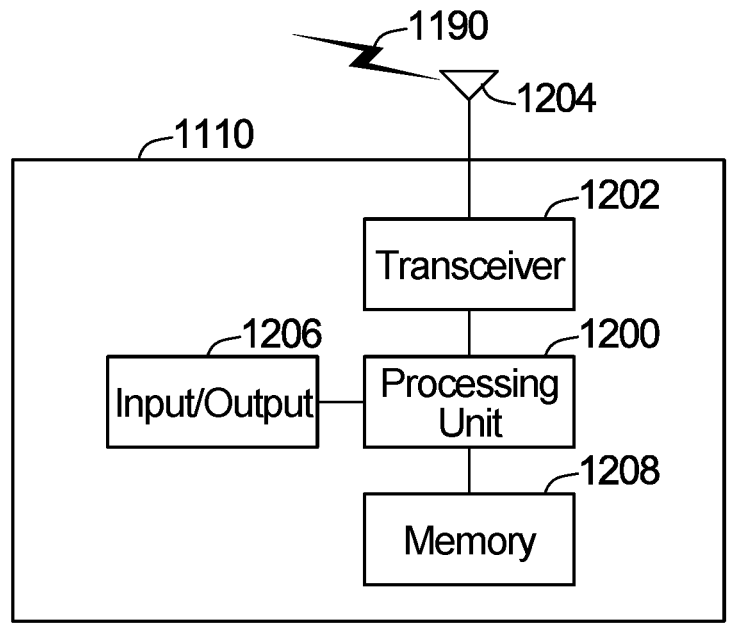
FIGS. 31 and 32 illustrate example devices that may implement the methods and teachings according to this disclosure.
Figure 32:
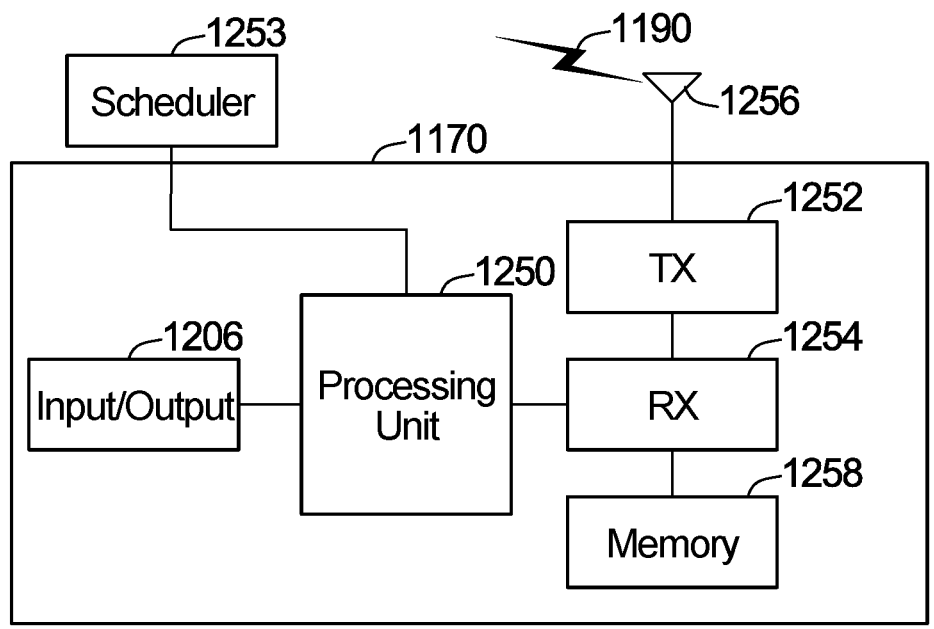

FIGS. 31 and 32 illustrate other example devices that may implement the methods and teachings according to this disclosure. In particular, FIG. 31 illustrates an example ED 1110 (e.g UE 116 in FIG. 1), and FIG. 32 illustrates an example base station 1170 (e.g. TRP 108 in FIG. 1). These components could be used in the system 1100 or in any other suitable system.

As shown in FIG. 31, the ED 1110 includes at least one processing unit 1200. The processing unit 1200 implements various processing operations of the ED 1110. For example, the processing unit 1200 could perform signal coding, data processing, power control, input/output processing, or any other functionality enabling the ED 1110 to operate in the system 1100. The processing unit 1200 may also be configured to implement some or all of the functionality and/or embodiments described in more detail above. Each processing unit 1200 includes any suitable processing or computing device configured to perform one or more operations. Each processing unit 1200 could, for example, include a microprocessor, microcontroller, digital signal processor, field programmable gate array, or application specific integrated circuit.

The ED 1110 also includes at least one transceiver 1202. The transceiver 1202 is configured to modulate data or other content for transmission by at least one antenna or NIC (Network Interface Controller) 1204. The transceiver 1202 is also configured to demodulate data or other content received by the at least one antenna 1204. Each transceiver 1202 includes any suitable structure for generating signals for wireless transmission and/or processing signals received wirelessly or by wire. Each antenna 1204 includes any suitable structure for transmitting and/or receiving wireless signals. One or multiple transceivers 1202 could be used in the ED 1110, and one or multiple antennas 1204 could be used in the ED 1110. Although shown as a single functional unit, a transceiver 1202 could also be implemented using at least one transmitter and at least one separate receiver.

The ED 1110 further includes one or more input/output devices 1206 or interfaces. The input/output devices 1206 facilitate interaction with a user or other devices (network communications) in the network. Each input/output device 1206 includes any suitable structure for providing information to or receiving/providing information from a user, such as a speaker, microphone, keypad, keyboard, display, or touch screen, including network interface communications.

In addition, the ED 1110 includes at least one memory 1208. The memory 1208 stores instructions and data used, generated, or collected by the ED 1110. For example, the memory 1208 could store software instructions or modules configured to implement some or all of the functionality and/or embodiments described above and that are executed by the processing unit(s) 1200. Each memory 1208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 32, the base station 1170 includes at least one processing unit 1250, at least one transmitter 1252, at least one receiver 1254, one or more antennas 1256, at least one memory 1258, and one or more input/output devices or interfaces 1266. A transceiver, not shown, may be used instead of the transmitter 1252 and receiver 1254. A scheduler 1253 may be coupled to the processing unit 1250. The scheduler 1253 may be included within or operated separately from the base station 1170. The processing unit 1250 implements various processing operations of the base station 1170, such as signal coding, data processing, power control, input/output processing, or any other functionality. The processing unit 1250 can also be configured to implement some or all of the functionality and/or embodiments described in more detail above. Each processing unit 1250 includes any suitable processing or computing device configured to perform one or more operations. Each processing unit 1250 could, for example, include a microprocessor, microcontroller, digital signal processor, field programmable gate array, or application specific integrated circuit.

Each transmitter 1252 includes any suitable structure for generating signals for wireless transmission to one or more EDs or other devices. Each receiver 1254 includes any suitable structure for processing signals received wirelessly or by wire from one or more EDs or other devices. Although shown as separate components, at least one transmitter 1252 and at least one receiver 1254 could be combined into a transceiver. Each antenna 1256 includes any suitable structure for transmitting and/or receiving wireless signals. While a common antenna 1256 is shown here as being coupled to both the transmitter 1252 and the receiver 1254, one or more antennas 1256 could be coupled to the transmitter(s) 1252, and one or more separate antennas 1256 could be coupled to the receiver(s) 1254. Each memory 1258 includes any suitable volatile and/or non-volatile storage and retrieval device(s) such as those described above in connection to the ED 1110. The memory 1258 stores instructions and data used, generated, or collected by the base station 1170. For example, the memory 1258 could store software instructions or modules configured to implement some or all of the functionality and/or embodiments described above and that are executed by the processing unit(s) 1250.

Each input/output device 1266 facilitates interaction with a user or other devices (network communications) in the network. Each input/output device 1266 includes any suitable structure for providing information to or receiving/providing information from a user, including network interface communications.

It should be appreciated that one or more steps of the embodiment methods provided herein may be performed by corresponding units or modules, e.g. the units or modules shown in FIGS. 6, 31, and/or 32. For example, a signal may be transmitted by a transmitting unit or a transmitting module. A signal may be received by a receiving unit or a receiving module. A signal may be processed by a processing unit or a processing module. Other steps may be performed by the transmitter 202, receiver 204, decoder 222, the downlink message generator 224, the encoder 226, the DCI generator 228, the SNR detector 230, the higher layer signal generator 234, the TRP coordinator 236, the transmitter 252, the receiver 254, the uplink message generator 262, encoder 264, downlink message processor 266, decoder 268, flag generator 270, transceiver 1202, processing unit 1200, transmitter 1252, receiver 1254, scheduler 1253, and/or processing unit 1250 described herein. The respective units/modules may be hardware, software, or a combination thereof. For instance, one or more of the units/modules may be an integrated circuit, such as FPGAs or ASICs. It will be appreciated that where the modules are software, they may be retrieved by a processor, in whole or part as needed, individually or together for processing, in single or multiple instances as required, and that the modules themselves may include instructions for further deployment and instantiation.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method comprising:
transmitting higher layer signaling to a user equipment (UE), the higher layer signaling indicating to the UE at least one time domain resource associated with a transport block (TB) of a dynamic-grant-based transmission to be scheduled by downlink control information (DCI), the higher layer signaling being at a higher layer than the DCI, wherein the at least one time domain resource includes a preconfigured set of one or more time domain resources, wherein the DCI comprises a field for indicating an index, the index associated with one of the preconfigured set of one or more time domain resources, wherein the higher layer signaling includes a table associating the index with a value of each one of the preconfigured set of one or more time domain resources, wherein the table has a single entry, and wherein the field in the DCI is empty; and
transmitting the DCI to the UE to schedule the TB.

2. The method of claim 1, wherein the higher layer signaling further indicates information for demodulating and/or decoding the TB.

3. The method of claim 1, wherein the TB scheduled by the DCI is a dynamic-grant-based downlink data transmission, and the method further comprises transmitting the TB in accordance with the at least one time domain resource indicated in the higher layer signaling.

4. The method of claim 1, wherein the TB scheduled by the DCI is a dynamic-grant-based uplink data transmission, and the method further comprises receiving the TB in accordance with the at least one time domain resource indicated in the higher layer signaling.

5. The method of claim 1, wherein the DCI does not explicitly indicate at least one of: a HARQ timing indicator, a physical uplink control channel (PUCCH) resource indicator, an acknowledgement/negative acknowledgement (ACK/NACK) channel resource index, a downlink assignment index, and a power control command for PUCCH.

6. A method comprising:
receiving higher layer signaling at a user equipment (UE), the higher layer signaling indicating to the UE at least one time domain resource associated with a transport block (TB) of a dynamic-grant-based transmission to be scheduled by downlink control information (DCI), the higher layer signaling being at a higher layer than the DCI, wherein the DCI comprises a field for indicating an index, the index associated with the at least one time domain resource, wherein the higher layer signaling includes a table associating the index with a value of each one of the at least one time domain resource, wherein the table has a single entry, and wherein the field in the DCI is empty; and
receiving the DCI at the UE.

7. The method of claim 6, wherein the TB scheduled by the DCI is a dynamic-grant-based downlink data transmission, and the method further comprises receiving the TB in accordance with the at least one time domain resource indicated in the higher layer signaling.

8. The method of claim 6, wherein the TB scheduled by the DCI is a dynamic-grant-based uplink data transmission, and the method further comprises transmitting the TB in accordance with the at least one time domain resource indicated in the higher layer signaling.

9. The method of claim 6, wherein the DCI does not explicitly indicate at least one of: a HARQ timing indicator, a physical uplink control channel (PUCCH) resource indicator, an acknowledgement/negative acknowledgement (ACK/NACK) channel resource index, a downlink assignment index, and a power control command for PUCCH.

10. An apparatus comprising:
a higher layer signaling generator to generate higher layer signaling for a user equipment (UE), the higher layer signaling indicating to the UE at least one time domain resource associated with a transport block (TB) of a dynamic-grant-based transmission to be scheduled by downlink control information (DCI), the higher layer signaling being at a higher layer than the DCI, wherein the DCI comprises a field for indicating an index, the index associated with the at least one time domain resource, wherein the higher layer signaling includes a table associating the index with a value of each one of the at least one time domain resource, wherein the table has a single entry, and wherein the field in the DCI is empty;
a transmitter to transmit the higher layer signaling to the UE;
a DCI generator to generate the DCI to schedule the TB; and
the transmitter to also transmit the DCI to the UE.

11. The apparatus of claim 10, wherein the higher layer signaling further indicates information for demodulating and/or decoding the TB.

12. The apparatus of claim 10, wherein the TB scheduled by the DCI is a dynamic-grant-based downlink data transmission, and the transmitter is further to transmit the TB in accordance with the at least one time domain resource indicated in the higher layer signaling.

13. The apparatus of claim 10, wherein the TB scheduled by the DCI is a dynamic-grant-based uplink data transmission, and the apparatus further comprises a receiver to receive the TB in accordance with the at least one time domain resource indicated in the higher layer signaling.

14. The apparatus of claim 10, wherein the DCI does not explicitly indicate at least one of: a HARQ timing indicator, a physical uplink control channel (PUCCH) resource indicator, an acknowledgement/negative acknowledgement (ACK/NACK) channel resource index, a downlink assignment index, and a power control command for PUCCH.

15. A user equipment (UE) comprising:
a receiver to:
receive higher layer signaling at, the higher layer signaling indicating to the UE at least one time domain resource associated with a transport block (TB) of a dynamic-grant-based transmission to be scheduled by downlink control information (DCI), the higher layer signaling being at a higher layer than the DCI, wherein the DCI comprises a field for indicating an index, the index associated with the at least one time domain resource, wherein the higher layer signaling includes a table associating the index with a value of each one of the at least one time domain resource, wherein the table has a single entry, and wherein the field in the DCI is empty; and
receive the DCI at the UE; and
a downlink message processor to decode the DCI.

16. The UE of claim 15, wherein the TB scheduled by the DCI is a dynamic-grant-based downlink data transmission, and wherein the receiver is configured to receive the TB in accordance with the at least one time domain resource indicated in the higher layer signaling.

17. The UE of claim 15, wherein the TB scheduled by the DCI is a dynamic-grant-based uplink data transmission, and the UE further comprises a transmitter to transmit the TB in accordance with the at least one time domain resource indicated in the higher layer signaling.

18. The UE of claim 15, wherein the DCI does not explicitly indicate at least one of: a HARQ timing indicator, a physical uplink control channel (PUCCH) resource indicator, an acknowledgement/negative acknowledgement (ACK/NACK) channel resource index, a downlink assignment index, and a power control command for PUCCH.

19. The method of claim 1, wherein the DCI has a format that does not explicitly indicate a time domain resource on which the TB is transmitted.

20. The method of claim 1, wherein the DCI indicates a time domain resource on which the TB is transmitted, the time domain resource on which the TB is transmitted belonging to the at least one time domain resource indicated in the higher layer signaling.

21. The method of claim 6, wherein the DCI has a format that does not explicitly indicate a time domain resource on which the TB is transmitted.

22. The method of claim 6, wherein the DCI indicates a time domain resource on which the TB is transmitted, the time domain resource on which the TB is transmitted belonging to the at least one time domain resource indicated in the higher layer signaling.

* * * * *